United States Patent
Sasaki et al.

(10) Patent No.: US 8,810,963 B1
(45) Date of Patent: Aug. 19, 2014

(54) MAGNETIC HEAD FOR PERPENDICULAR MAGNETIC RECORDING HAVING TWO COILS

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/934,977

(22) Filed: Jul. 3, 2013

(51) Int. Cl.
*G11B 5/127* (2006.01)
*G11B 5/17* (2006.01)

(52) U.S. Cl.
CPC .................................... *G11B 5/17* (2013.01)
USPC .................................................... 360/125.02

(58) Field of Classification Search
CPC .. G11B 5/1278; G11B 5/3116; G11B 5/3163; G11B 5/3146; G11B 5/315; G11B 5/3136

USPC ............ 360/125.02, 125.03, 125.04, 125.08, 360/125.12, 319
See application file for complete search history.

(56) References Cited

U.S. PATENT DOCUMENTS

| | | | |
|---|---|---|---|
| 6,954,340 B2 | 10/2005 | Shukh et al. | |
| 7,933,095 B2 * | 4/2011 | Sasaki et al. | 360/125.12 |
| 8,077,433 B2 * | 12/2011 | Sasaki et al. | 360/123.15 |
| 8,416,528 B1 * | 4/2013 | Sasaki et al. | 360/125.02 |
| 2005/0128637 A1 | 6/2005 | Johnston et al. | |
| 2008/0112080 A1 * | 5/2008 | Lengsfield et al. | 360/125.04 |
| 2010/0061015 A1 * | 3/2010 | Tanida | 360/125.02 |
| 2010/0134922 A1 * | 6/2010 | Yamada et al. | 360/123.01 |
| 2013/0075359 A1 * | 3/2013 | Lee et al. | 216/22 |

FOREIGN PATENT DOCUMENTS

JP  A-2009-48719  3/2009

* cited by examiner

*Primary Examiner* — Angel Castro
(74) *Attorney, Agent, or Firm* — Oliff PLC

(57) ABSTRACT

A magnetic head includes first and second coils, a main pole, a write shield, a return path section, and a yoke. The return path section is located on the front side in the direction of travel of a recording medium relative to the main pole. The yoke is located on the rear side in the direction of travel of the recording medium relative to the main pole. The first coil is wound around the main pole. The second coil is located on the rear side in the direction of travel of the recording medium relative to the main pole so as to pass between the main pole and the yoke.

13 Claims, 50 Drawing Sheets

MAGNETIC HEAD FOR PERPENDICULAR MAGNETIC RECORDING HAVING TWO COILS

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has two coils.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on the top surface of a substrate. The write head unit includes a coil and a main pole. The coil produces a magnetic field corresponding to data to be written on a recording medium. The main pole allows a magnetic flux corresponding to the magnetic field produced by the coil to pass, and produces a write magnetic field in the direction perpendicular to the plane of the recording medium. The main pole has an end face located in a medium facing surface facing the recording medium.

A magnetic head for use in a magnetic disk drive such as a hard disk drive is typically in the form of a slider. The slider has the medium facing surface. The medium facing surface has the air inflow end (the leading end) and the air outflow end (the trailing end). The slider is configured to slightly fly over the surface of the recording medium by means of an airflow that comes from the leading end into the space between the medium facing surface and the recording medium.

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

As a technique for preventing unwanted erasure induced by the skew, U.S. Pat. No. 6,954,340 B2 and U.S. Patent Application Publication No. 2005/0128637 A1, for example, each disclose a magnetic head including a write shield having an end face that is located in the medium facing surface and wraps around the end face of the main pole.

The magnetic head including the write shield is typically provided with one or more return path sections for connecting the write shield and part of the main pole located away from the medium facing surface to each other. The one or more return path sections are configured to form one or more spaces between the main pole and the one or more return path sections. The coil is provided to pass through the one or more spaces. The write shield and the one or more return path sections have the function of capturing a magnetic flux that is produced from the end face of the main pole and spreads in directions other than the direction perpendicular to the plane of the recording medium, and thereby preventing the magnetic flux from reaching the recording medium. The write shield and the one or more return path sections also have the function of allowing a magnetic flux that has been produced from the end face of the main pole and has magnetized the recording medium to flow back to the main pole. Thus, the magnetic head including the write shield allows for preventing unwanted erasure, and also allows for a further improvement in recording density.

U.S. Pat. No. 6,954,340 B2 and U.S. Patent Application Publication No. 2005/0128637 A1 each disclose a magnetic head including, as the aforementioned one or more return path sections, a return path section located on the trailing side relative to the main pole and a return path section located on the leading side relative to the main pole.

Further, JP-A-2009-48719 discloses a magnetic head including a main pole, a first coil of helical shape for energizing the main pole, a leading-side shield located on the leading side relative to the main pole, a trailing-side shield located on the trailing side relative to the main pole, and a second coil for energizing the leading-side shield and the trailing-side shield. In this magnetic head, the main pole is coupled to neither of the leading-side shield and the trailing-side shield. The leading-side shield and the trailing-side shield form respective magnetic paths coupled to each other. The leading-side shield and the trailing-side shield are energized in opposite polarities to each other, whereas the main pole and the leading-side shield are energized in the same polarity.

The position of an end of a record bit to be recorded on a recording medium depends on the position of the trailing-side end of the end face of the main pole located in the medium facing surface. To define the position of the end of the record bit with high accuracy, it is therefore effective to form the end face of the write shield to include an end face portion located on the trailing side relative to the end face of the main pole.

With increases in frequency of write signals for higher recording densities, it is required of the magnetic head to provide an improved rate of change in the direction of the magnetic flux produced from the end face of the main pole. To satisfy this requirement in the magnetic head having the write shield, it is effective to form the end face of the write shield to include an end face portion located on the trailing side relative to the end face of the main pole, as mentioned above. In addition to this, it is effective to provide a return path section that is located on the trailing side relative to the main pole, which will hereinafter be referred to as the trailing-side return path section, and to reduce the length of the trailing-side return path section. To that end, it is effective to reduce the number of turns of the coil passing through the space formed between the main pole and the trailing-side return path section.

Coils used in magnetic heads for perpendicular magnetic recording are broadly classified into two types. A coil of a first type is in the form of being wound about an axis parallel to the direction of travel of the recording medium, and not around the main pole. For example, the coil of the first type can be in the form of being wound around a portion of a return path section. A coil of a second type is in the form of being wound around the main pole.

Each of the coils of the first and second types has advantages and disadvantages as discussed below. The coil of the first type is not wound around the main pole. The coil of the first type thus has a disadvantage that a high proportion of the magnetic flux produced by the coil of the first type tends to fail to pass through the main pole. On the other hand, the coil of the first type has an advantage that it is possible to enhance the magnetomotive force on the return path section to allow the write shield and the return path section to perform the above-described functions effectively.

The coil of the second type is wound around the main pole. The coil of the second type thus has an advantage that most of the magnetic flux produced by the coil of the second type is able to pass through the main pole. On the other, the coil of the second type has a disadvantage that it is not possible to enhance the magnetomotive force on the return path section, so that the write shield and the return path section may become unable to perform their functions effectively.

We now turn to the problem with reducing the number of turns of the coil passing through the space between the main pole and the trailing-side return path section to reduce the length of the trailing-side return path section in order to address the trend toward higher frequencies of write signals. First, where the coil passing through the aforementioned space is of the first type, reducing the number of turns of the coil can result in a reduction of magnetic flux passing through the main pole, and may thus cause the main pole to become unable to produce a write magnetic field of sufficient magnitude. On the other hand, where the coil passing through the aforementioned space is of the second type, reducing the number of turns of the coil may cause the write shield to be degraded in its capability of capturing magnetic flux, and may thus result in the occurrence of unwanted erasure.

Thus, it has conventionally been difficult to produce a write magnetic field of sufficient magnitude from the main pole and make full use of the function of the write shield while reducing the length of the trailing-side return path section.

Note that in the magnetic head disclosed in JP-A-2009-48719, the main pole and the trailing-side shield are not coupled to each other. Thus, this magnetic head has no trailing-side return path section. Accordingly, for this magnetic head, it is impossible to reduce the length of a trailing-side return path section in order to address the trend toward higher frequencies of write signals. Further, in this magnetic head, since the main pole and the leading-side shield are energized in the same polarity, the magnetic flux produced by the leading-side shield may induce unwanted erasure.

OBJECT AND SUMMARY OF THE INVENTION

It is an object of the present invention to provide a magnetic head for perpendicular magnetic recording that allows the main pole to produce a write magnetic field of sufficient magnitude and allows for making full use of the function of the write shield while reducing the length of a return path section that is located on the front side in the direction of travel of the recording medium relative to the main pole and connects the write shield and part of the main pole located away from the medium facing surface to each other.

A magnetic head for perpendicular magnetic recording of the present invention includes a medium facing surface facing a recording medium, first and second coils, a main pole, a write shield, a gap part, a return path section, and a yoke. The first and second coils produce magnetic fields corresponding to data to be written on the recording medium. The main pole has an end face located in the medium facing surface, allows magnetic fluxes corresponding to the magnetic fields produced by the first and second coils to pass, and produces a write magnetic field for writing the data on the recording medium by means of a perpendicular magnetic recording system. The write shield is formed of a magnetic material and has an end face located in the medium facing surface. The gap part is formed of a nonmagnetic material and located between the main pole and the write shield. The return path section is formed of a magnetic material and located on the front side in the direction of travel of the recording medium relative to the main pole. The yoke is formed of a magnetic material and located on the rear side in the direction of travel of the recording medium relative to the main pole.

The end face of the write shield includes a first end face portion located on the front side in the direction of travel of the recording medium relative to the end face of the main pole. The return path section connects the write shield and part of the main pole located away from the medium facing surface to each other so as to define a first space enclosed by the main pole, the gap part, the write shield, and the return path section. The first coil is wound around the main pole so as to pass through the first space. The second coil is located on the rear side in the direction of travel of the recording medium relative to the main pole so as to pass between the main pole and the yoke. A magnetic field that is produced in the main pole by the second coil and a magnetic field that is produced in the yoke by the second coil are in directions opposite to each other.

The magnetic head for perpendicular magnetic recording of the present invention may further include a coupling portion located away from the medium facing surface and coupling the main pole and the yoke to each other magnetically. In such a case, the second coil may be wound around the coupling portion.

In the magnetic head for perpendicular magnetic recording of the present invention, the end face of the write shield may further include a second end face portion located on the rear side in the direction of travel of the recording medium relative to the end face of the main pole. In such a case, the yoke may be magnetically connected to the write shield.

In the magnetic head for perpendicular magnetic recording of the present invention, the yoke may have an end face located in the medium facing surface.

The magnetic head for perpendicular magnetic recording of the present invention may further include a magnetic layer formed of a magnetic material and having an end face located on the rear side in the direction of travel of the recording medium relative to the end face of the main pole. In such a case, the yoke may be magnetically connected to the magnetic layer.

In the magnetic head for perpendicular magnetic recording of the present invention, the main pole may have a top surface lying at a front end in the direction of travel of the recording medium, and the write shield may have an inclined surface facing toward the top surface of the main pole. The inclined surface has a first end located in the medium facing surface and a second end opposite to the first end. The second end is located on the front side in the direction of travel of the recording medium relative to the first end. The first coil may include a coil element extending to pass through the first space. The coil element includes a portion that is located closer to the medium facing surface than is the second end and that lies between the top surface of the main pole and the inclined surface.

In the magnetic head for perpendicular magnetic recording of the present invention, the first coil may include a coil element extending to pass through the first space, and no portion of the first coil other than the coil element may be present in the first space.

In the magnetic head for perpendicular magnetic recording of the present invention, the end face of the write shield may further include a second end face portion located on the rear side in the direction of travel of the recording medium relative to the end face of the main pole. In such a case, the magnetic head may further include a first coupling portion coupling the write shield and the yoke to each other magnetically, and a second coupling portion located away from the medium facing surface and coupling the main pole and the yoke to each other magnetically. The main pole, the gap part, the write shield, the yoke, the first coupling portion, and the second coupling portion define a second space enclosed by these components. The first coil may pass through the second space. The second coil may be wound around the second coupling portion so as to pass through the second space.

The first coupling portion may include a coupling layer in contact with the write shield. The coupling layer has an end face located in the medium facing surface. The first coil may pass between the coupling layer and the second coupling portion.

In the second space, the first coil may pass between the second coil and the main pole. In such a case, the first coil may be thinner than the second coil in the second space.

Where the magnetic head includes the first coupling portion and the second coupling portion, a first interface is formed between the return path section and the main pole, and a second interface is formed between the second coupling portion and the main pole. The first interface has a first end closest to the medium facing surface. The second interface has a second end closest to the medium facing surface. The first end may be located closer to the medium facing surface than is the second end. In this case, the end face of the write shield may further include third and fourth end face portions. The third and fourth end face portions are located on opposite sides of the end face of the main pole in the track width direction.

For the magnetic head for perpendicular magnetic recording of the present invention, the provision of the first coil wound around the main pole allows for producing a write magnetic field of sufficient magnitude from the main pole while reducing the length of the return path section located on the front side in the direction of travel of the recording medium relative to the main pole and connecting the write shield and part of the main pole located away from the medium facing surface to each other. Further, in the present invention, the second coil produces magnetic fields in the main pole and the yoke in opposite directions. The yoke is thus capable of capturing a magnetic flux that flows in a direction opposite to the direction of a magnetic flux flowing through the main pole. This allows for preventing flux saturation in the write shield, and thus makes it possible to make full use of the function of the write shield. Further, since the second coil is located on the rear side in the direction of travel of the recording medium relative to the main pole, the presence of the second coil never increases the length of the return path section. Consequently, the present invention allows the main pole to produce a write magnetic field of sufficient magnitude and allows for making full use of the function of the write shield while reducing the length of the aforementioned return path section.

Other and further objects, features and advantages of the present invention will appear more fully from the following description.

DETAILED DESCRIPTION OF THE PREFERRED EMBODIMENTS

First Embodiment

Figure 1:
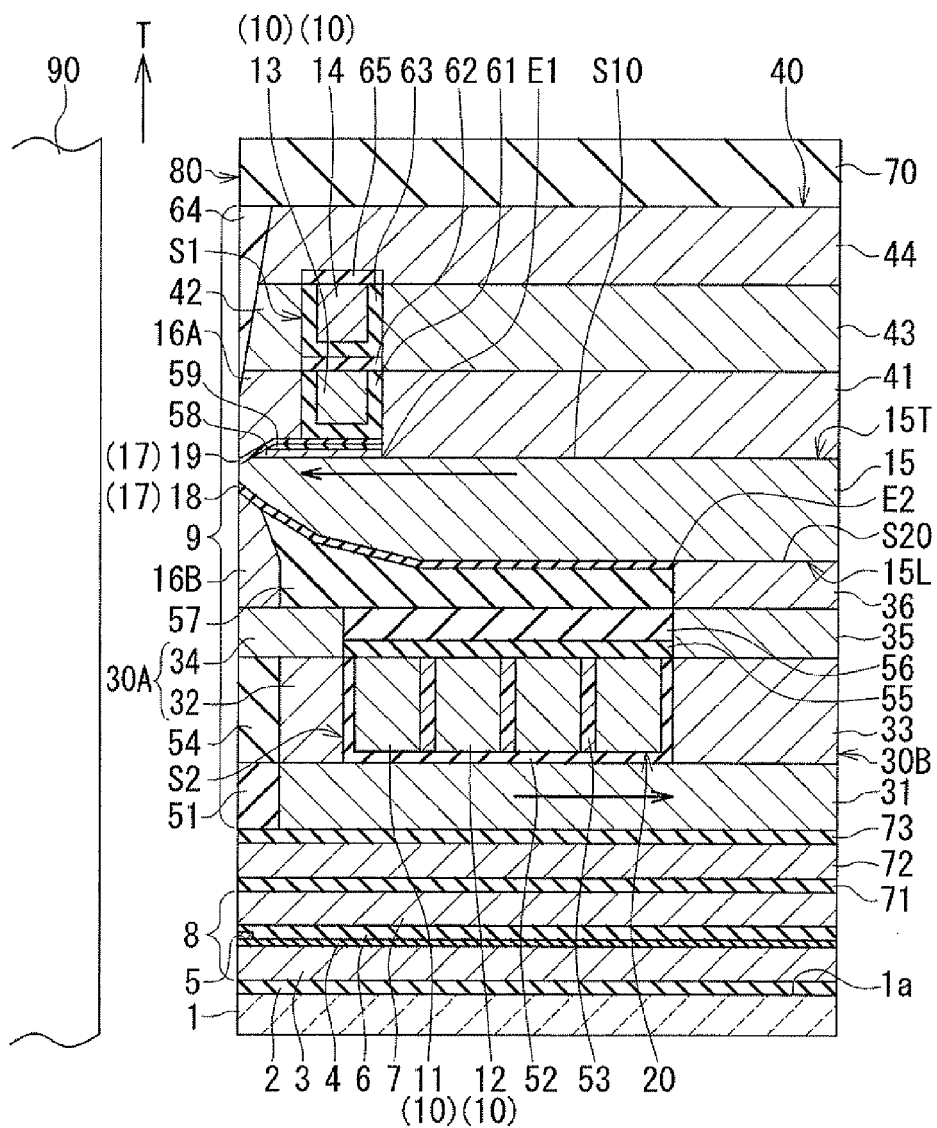
FIG. 1 is a cross-sectional view of a magnetic head according to a first embodiment of the invention.
Figure 2:
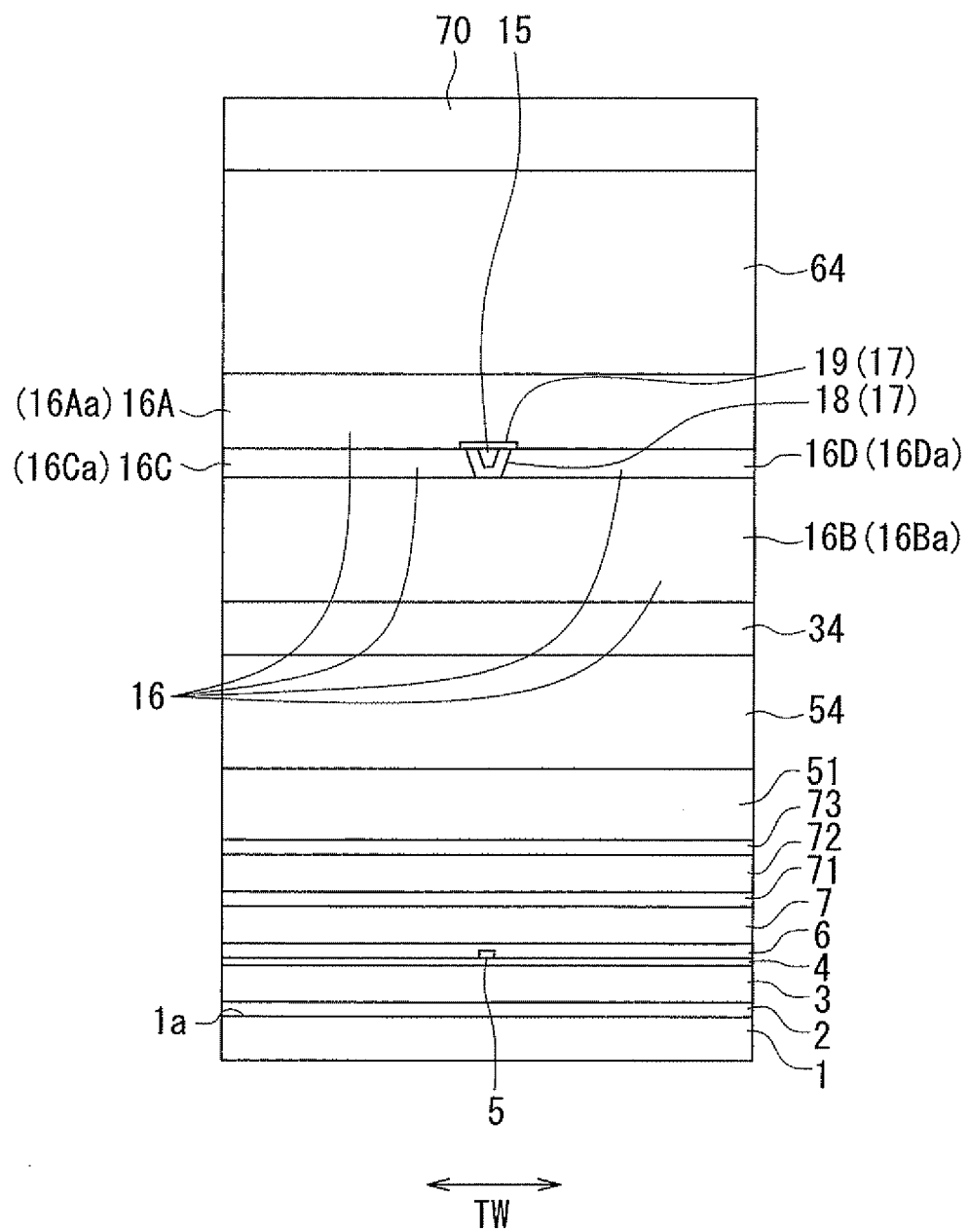
FIG. 2 is a front view showing the medium facing surface of the magnetic head according to the first embodiment of the invention.
Figure 3:
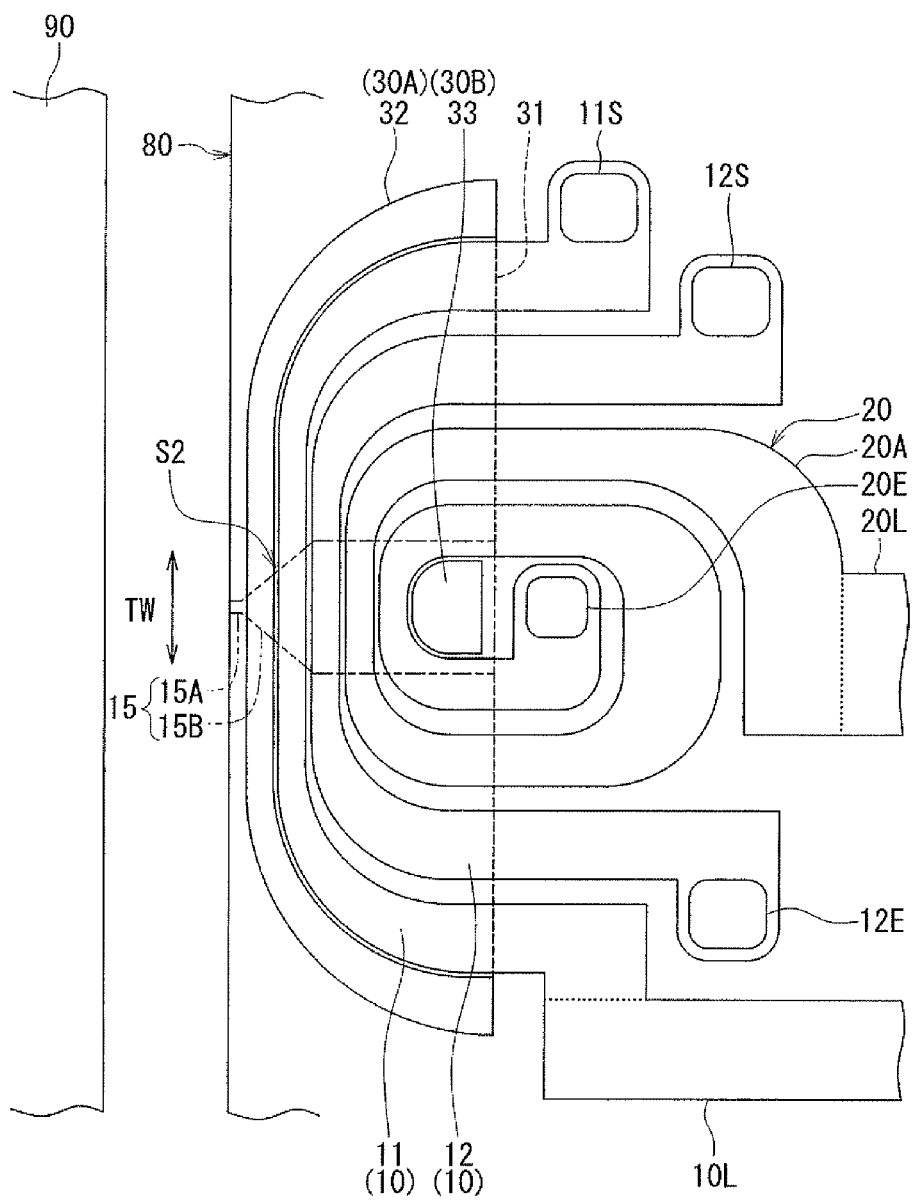
FIG. 3 is a plan view showing coil portions of the magnetic head according to the first embodiment of the invention.
Figure 4:
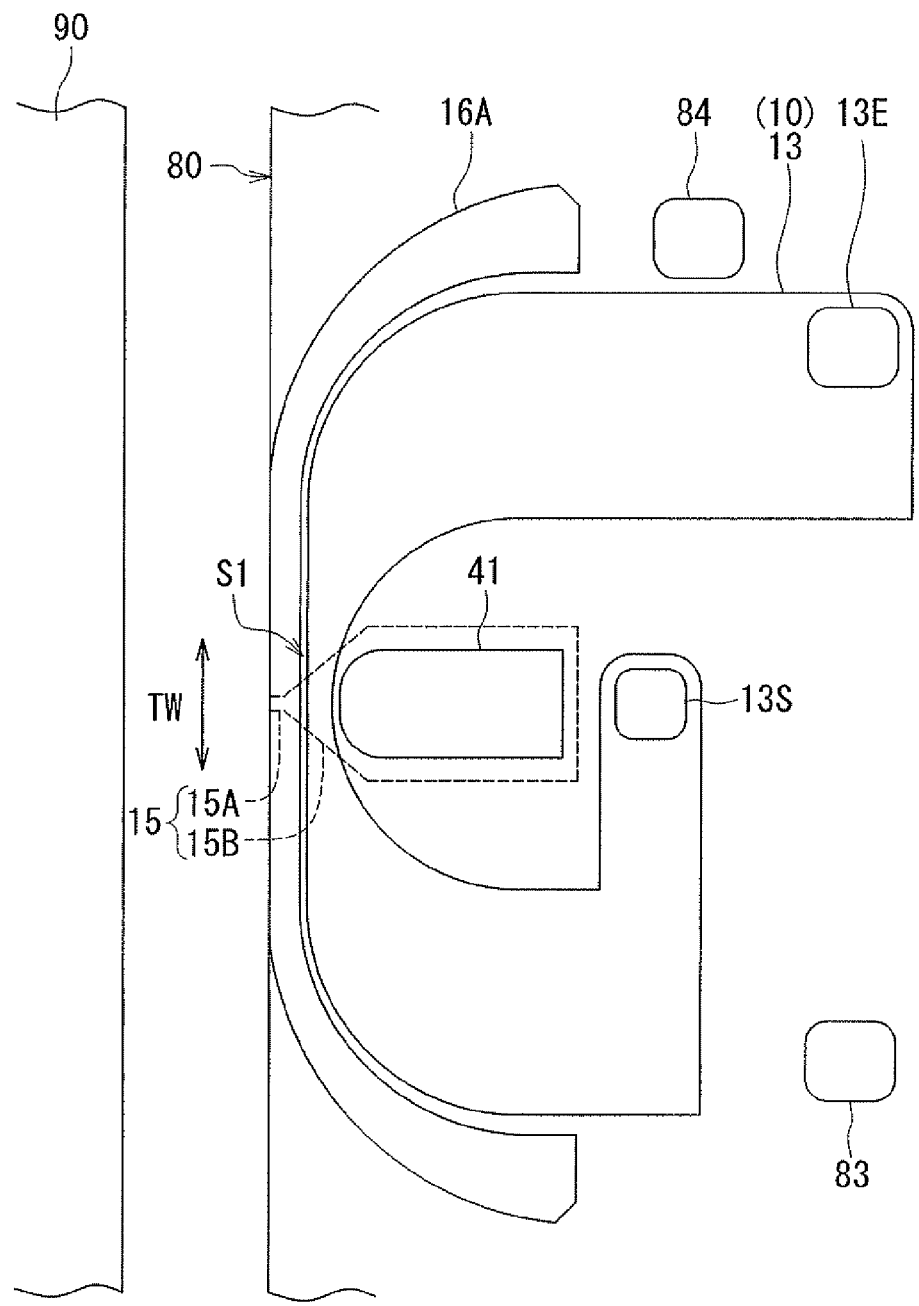
FIG. 4 is a plan view showing another coil portion of the magnetic head according to the first embodiment of the invention.
Figure 5:
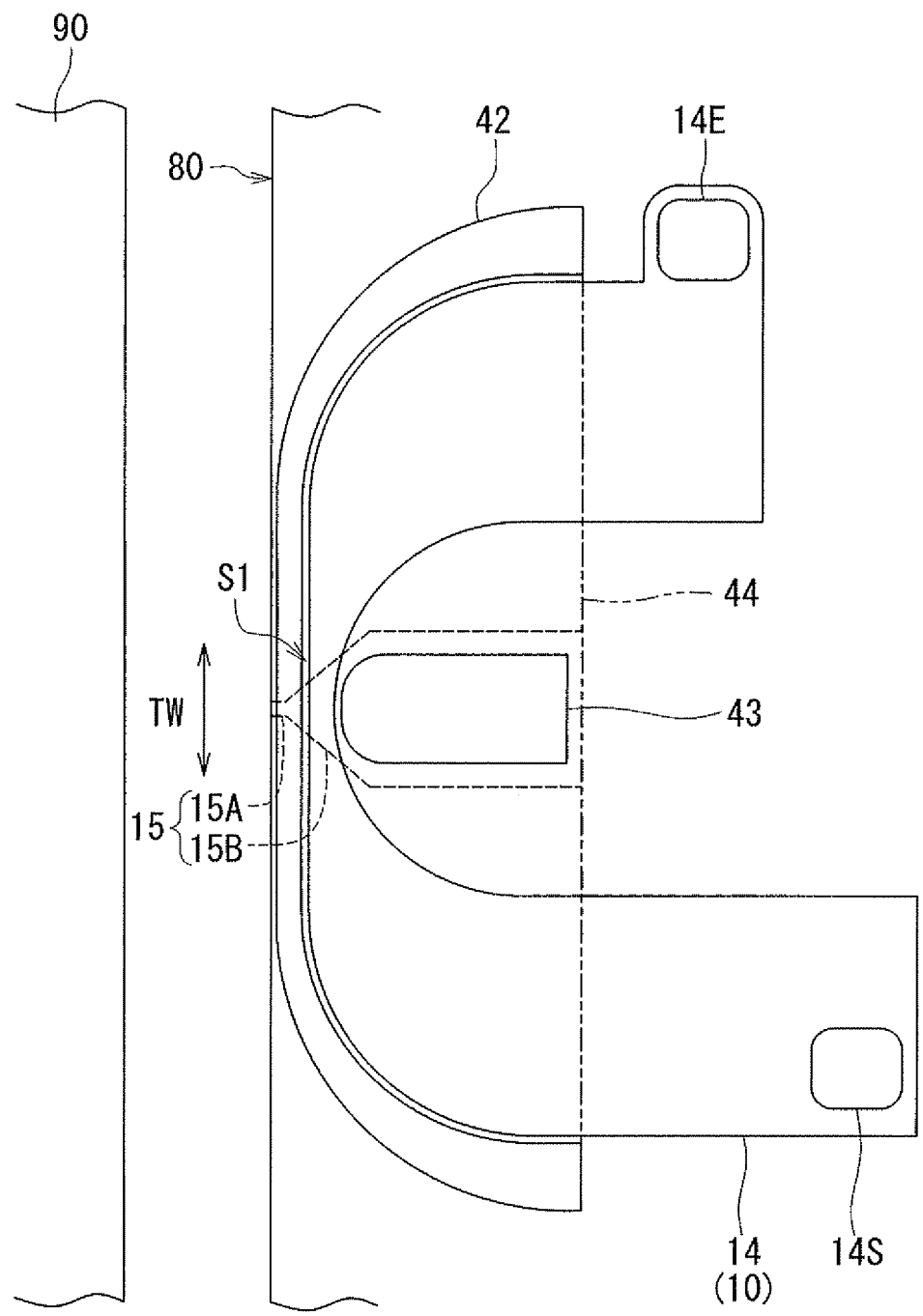
FIG. 5 is a plan view showing still another coil portion of the magnetic head according to the first embodiment of the invention.

Preferred embodiments of the present invention will now be described in detail with reference to the drawings. First, reference is made to FIG. 1 to FIG. 5 to describe the configuration of a magnetic head according to a first embodiment of the invention. FIG. 1 is a cross-sectional view of the magnetic head according to the present embodiment. FIG. 1 shows a cross section perpendicular to the medium facing surface and to the top surface of the substrate. The arrow with the symbol T in FIG. 1 indicates the direction of travel of a recording medium. FIG. 2 is a front view showing the medium facing surface of the magnetic head according to the present embodiment. FIG. 3 is a plan view showing coil portions of the magnetic head according to the present embodiment. FIG. 4 is a plan view showing another coil portion of the magnetic head according to the present embodiment. FIG. 5 is a plan view showing still another coil portion of the magnetic head according to the present embodiment. In each of FIG. 2 to FIG. 5, the arrow with the symbol TW indicates the track width direction.

As shown in FIG. 1, the magnetic head for perpendicular magnetic recording (hereinafter simply referred to as the magnetic head) according to the present embodiment has a medium facing surface 80 facing a recording medium 90. Further, as shown in FIG. 1 and FIG. 2, the magnetic head includes a substrate 1 formed of a ceramic material such as aluminum oxide-titanium carbide ($Al_2O_3$—TiC) and having a top surface 1a, an insulating layer 2 formed of an insulating material such as alumina ($Al_2O_3$) and disposed on the top surface 1a of the substrate 1, a first read shield layer 3 formed of a magnetic material and disposed on the insulating layer 2, a first read shield gap film 4 which is an insulating film disposed to cover the first read shield layer 3, a magnetoresistive (MR) element 5 serving as a read element disposed on the first read shield gap film 4, a second read shield gap film 6 which is an insulating film disposed on the MR element 5, and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR)

element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the first read shield layer 3 to the second read shield layer 7 constitute a read head unit 8. The magnetic head further includes a nonmagnetic layer 71 formed of a nonmagnetic material and disposed on the second read shield layer 7, a middle shield layer 72 formed of a magnetic material and disposed on the nonmagnetic layer 71, a nonmagnetic layer 73 formed of a nonmagnetic material and disposed on the middle shield layer 72, and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes first and second coils 10 and 20, a main pole 15, a write shield 16, and a gap part 17. The first and second coils 10 and 20 produce magnetic fields corresponding to data to be written on the recording medium 90. Each of the first and second coils 10 and 20 is formed of a conductive material such as copper. The first coil 10 and the second coil 20 are connected in series or in parallel. The main pole 15 has an end face located in the medium facing surface 80. The main pole 15 allows magnetic fluxes corresponding to the magnetic fields produced by the first and second coils 10 and 20 to pass, and produces a write magnetic field for writing data on the recording medium 90 by means of a perpendicular magnetic recording system. FIG. 1 shows a cross section that intersects the end face of the main pole 15 located in the medium facing surface 80 and that is perpendicular to the medium facing surface 80 and to the top surface 1a of the substrate 1 (the cross section will hereinafter be referred to as the main cross section).

The write shield 16 has an end face located in the medium facing surface 80. The end face of the write shield 16 includes first to fourth end face portions 16Aa, 16Ba, 16Ca, and 16Da. The first end face portion 16Aa is located on the front side in the direction T of travel of the recording medium 90 relative to the end face of the main pole 15. The second end face portion 16Ba is located on the rear side in the direction T of travel of the recording medium 90 relative to the end face of the main pole 15. The third and fourth end face portions 16Ca and 16Da are located on opposite sides of the end face of the main pole 15 in the track width direction TW. In the medium facing surface 80, the first to fourth end face portions 16Aa, 16Ba, 16Ca, and 16Da are arranged to wrap around the end face of the main pole 15.

The write shield 16 is formed of a magnetic material. The material employed for the write shield 16 may be CoFeN, CoNiFe, NiFe, or CoFe, for example.

The write head unit 9 further includes a return path section 40, a yoke 31, and magnetic layers 32, 33, 34, 35 and 36. The return path section 40, the yoke 31, and the magnetic layers 32 to 36 are each formed of a magnetic material. In the present embodiment, the magnetic material used to form the yoke 31 is different from that used to form each of the magnetic layers 32 to 36. The return path section 40, the yoke 31 and the magnetic layers 32 to 36 may each be formed of CoFeN, CoNiFe, NiFe, or CoFe, for example. The return path section 40 is located on the front side in the direction T of travel of the recording medium 90 relative to the main pole 15, and connects the write shield 16 and part of the main pole 15 located away from the medium facing surface 80 to each other, thereby magnetically coupling the write shield 16 and the main pole 15 to each other.

The yoke 31 lies on the nonmagnetic layer 73. The magnetic layers 32 and 33 both lie on the yoke 31. The magnetic layer 32 is located near the medium facing surface 80. The magnetic layer 33 is located farther from the medium facing surface 80 than is the magnetic layer 32. Each of the yoke 31 and the magnetic layer 32 has an end face that faces toward the medium facing surface 80 and that is located at a distance from the medium facing surface 80.

As shown in FIG. 3, the second coil 20 is wound approximately two turns around the magnetic layer 33. Further, as shown in FIG. 1 and FIG. 3 to FIG. 5, the first coil 10 includes four line-shaped portions 11, 12, 13 and 14. The line-shaped portions 11 and 12 are located between the magnetic layer 32 and the second coil 20. The line-shaped portions 11 and 12 are arranged in this order in a direction perpendicular to the medium facing surface 80, the line-shaped portion 11 being closer to the medium facing surface 80. The first coil 10 further includes a lead portion 10L, first and second connecting portions (not illustrated), a third connecting portion 83, and a fourth connecting portion 84. The lead portion 10L and the first to fourth connecting portions will be described later.

The magnetic head further includes: an insulating layer 51 formed of an insulating material, disposed on the nonmagnetic layer 73 and surrounding the yoke 31; an insulating film 52 formed of an insulating material and isolating the line-shaped portions 11 and 12 and the second coil 20 from the yoke 31 and the magnetic layers 32 and 33; an insulating layer 53 formed of an insulating material and disposed in the space between the line-shaped portions 11 and 12, in the space between the line-shaped portion 12 and the second coil 20, and in the space between adjacent turns of the second coil 20; and an insulating layer 54 formed of an insulating material and disposed around the line-shaped portions 11 and 12, the second coil 20 and the magnetic layer 32. The top surfaces of the line-shaped portions 11 and 12, the second coil 20, the magnetic layers 32 and 33, the insulating film 52, and the insulating layers 53 and 54 are even with each other. The insulating layers 51 and 54 and the insulating film 52 are formed of alumina, for example. The insulating layer 53 is formed of a photoresist, for example.

The magnetic layer 34 lies on the magnetic layer 32 and the insulating layer 54. The magnetic layer 35 lies on the magnetic layer 33. The magnetic layer 34 has an end face located in the medium facing surface 80. The magnetic head further includes an insulating layer 55 formed of an insulating material and disposed over the top surfaces of the line-shaped portions 11 and 12, the second coil 20, the insulating film 52 and the insulating layer 53 and 54, and an insulating layer 56 formed of an insulating material, disposed on the insulating layer 55 and surrounding the magnetic layers 34 and 35. The insulating layers 55 and 56 are formed of alumina, for example.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium 90 relative to the main pole 15. The second shield 16B is located on the rear side in the direction T of travel of the recording medium 90 relative to the main pole 15. The side shields 16C and 16D magnetically couple the first shield 16A and the second shield 16B to each other.

As shown in FIG. 1, the first shield 16A has the first end face portion 16Aa, an inclined surface facing toward the main pole 15, a top surface, and a connecting surface connecting the first end face portion 16Aa and the top surface to each other. The distance from the medium facing surface 80 to an arbitrary point on the connecting surface of the first shield 16A increases with increasing distance from the arbitrary point to the top surface 1a of the substrate 1. The second shield 16B has the second end face portion 16Ba, and an inclined surface facing toward the main pole 15. As shown in FIG. 2, the side shield 16C has the third end face portion 16Ca. The side shield 16D has the fourth end face portion 16Da.

The second shield 16B lies on the magnetic layer 34. The magnetic layer 36 lies on the magnetic layer 35. The magnetic head further includes a nonmagnetic layer 57 formed of a nonmagnetic material. The nonmagnetic layer 57 lies on the top surface of the insulating layer 56 and part of the top surface of the magnetic layer 34, and surrounds the second shield 16B and the magnetic layer 36. The nonmagnetic layer 57 is formed of alumina, for example. The magnetic layers 32 and 34 constitute a first coupling portion 30A coupling the write shield 16 and the yoke 31 to each other magnetically.

The main pole 15 has a top surface 15T (see FIG. 1) lying at the front end in the direction T of travel of the recording medium 90, a bottom end 15L (see FIG. 1) opposite to the top surface 15T, and first and second side parts (see FIG. 2) opposite to each other in the track width direction TW. The side shield 16C has a first sidewall opposed to the first side part of the main pole 15. The side shield 16D has a second sidewall opposed to the second side part of the main pole 15.

The gap part 17 is provided between the main pole 15 and the write shield 16. The magnetic head further includes a first gap layer 19 formed of a nonmagnetic material and a second gap layer 18 formed of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

The side shields 16C and 16D are disposed on the second shield 16B and in contact with the inclined surface of the second shield 16B. The second gap layer 18 is provided along the sidewalls of the side shields 16C and 16D, the inclined surface of the second shield 16B and the top surface of the nonmagnetic layer 57. The nonmagnetic material used to form the second gap layer 18 may be an insulating material or a nonmagnetic metal material. Alumina is an example of an insulating material that can be used to form the second gap layer 18. Ru is an example of a nonmagnetic metal material that can be used to form the second gap layer 18. The second gap layer 18 has an opening for exposing the top surface of the magnetic layer 36.

The main pole 15 is disposed over the second shield 16B and the nonmagnetic layer 57 such that the second gap layer 18 is interposed between the main pole 15 and each of the inclined surface of the second shield 16B and the top surface of the nonmagnetic layer 57. As shown in FIG. 2, the second gap layer 18 is interposed also between the main pole 15 and each of the side shields 16C and 16D.

At a position away from the medium facing surface 80, the bottom end 15L of the main pole 15 is in contact with the top surface of the magnetic layer 36. The magnetic layers 33, 35 and 36 constitute a second coupling portion 30B coupling the main pole 15 and the yoke 31 to each other magnetically. The main pole 15 is formed of a magnetic metal material. The material employed for the main pole 15 may be NiFe, CoNiFe, or CoFe, for example. The shape of the main pole 15 will be described in detail later.

The magnetic head further includes a first nonmagnetic layer (not illustrated) formed of a nonmagnetic material and disposed around the main pole 15 and the side shields 16C and 16D. In the present embodiment, the first nonmagnetic layer is formed of a nonmagnetic insulating material such as alumina, in particular.

The magnetic head further includes a nonmagnetic metal layer 58 formed of a nonmagnetic metal material, located at a distance from the medium facing surface 80 and lying on part of the top surface 15T of the main pole 15, and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina, for example.

The first gap layer 19 is disposed to cover the main pole 15, the nonmagnetic metal layer 58 and the insulating layer 59. The material used to form the first gap layer 19 may be a nonmagnetic insulating material such as alumina or a nonmagnetic conductive material such as Ru, NiCu, Ta, W, NiB, or NiP.

The first shield 16A is disposed over the side shields 16C and 16D and the first gap layer 19, and in contact with the top surfaces of the side shields 16C and 16D and the first gap layer 19. In the medium facing surface 80, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side adjacent to the first gap layer 19, and the side defines the track width.

The return path section 40 includes magnetic layers 41, 42, 43 and 44. The magnetic layer 41 is located away from the medium facing surface 80 and lies on the main pole 15.

As shown in FIG. 4, the line-shaped portion 13 of the first coil 10 is located between the first shield 16A and the magnetic layer 41. The magnetic head further includes an insulating film 61 formed of an insulating material and isolating the line-shaped portion 13 from the first shield 16A, the first gap layer 19 and the magnetic layer 41, and a second nonmagnetic layer (not illustrated) formed of a nonmagnetic material and disposed around the line-shaped portion 13, the first shield 16A and the magnetic layer 41. The insulating film 61 and the second nonmagnetic layer are formed of alumina, for example. The top surfaces of the first shield 16A, the line-shaped portion 13, the magnetic layer 41, the insulating film 61 and the second nonmagnetic layer are even with each other. The magnetic head further includes an insulating layer 62 formed of an insulating material and disposed over the top surfaces of the line-shaped portion 13 and the insulating film 61. The insulating layer 62 is formed of alumina, for example.

The magnetic layer 42 lies on the first shield 16A. The magnetic layer 42 has an end face that faces toward the medium facing surface 80 and that is located at a distance from the medium facing surface 80. The distance from the medium facing surface 80 to an arbitrary point on the end face of the magnetic layer 42 increases with increasing distance from the arbitrary point to the top surface 1a of the substrate 1.

The magnetic layer 43 lies on the magnetic layer 41. As shown in FIG. 5, the line-shaped portion 14 of the first coil 10 is located between the magnetic layer 42 and the magnetic layer 43. The magnetic head further includes an insulating film 63 formed of an insulating material and isolating the line-shaped portion 14 from the magnetic layers 42 and 43 and the insulating layer 62, and a third nonmagnetic layer (not illustrated) formed of a nonmagnetic material and disposed around the line-shaped portion 14 and the magnetic layers 42 and 43. The insulating film 63 and the third nonmagnetic layer are formed of alumina, for example. The top surfaces of the line-shaped portion 14, the magnetic layers 42 and 43, the insulating film 63 and the third nonmagnetic layer are even with each other. The magnetic head further includes an insulating layer 65 formed of an insulating material and disposed over the top surfaces of the line-shaped portion 14 and the insulating film 63. The insulating layer 65 is formed of alumina, for example.

The magnetic layer 44 lies on the magnetic layers 42 and 43 and the insulating layer 65, and connects the magnetic layer 42 to the magnetic layer 43. The magnetic layer 44 has an end face that faces toward the medium facing surface 80 and that is located at a distance from the medium facing surface 80. The distance from the medium facing surface 80 to an arbitrary point on the end face of the magnetic layer 44 increases with increasing distance from the arbitrary point to the top surface 1a of the substrate 1.

The magnetic head further includes a nonmagnetic layer 64 formed of a nonmagnetic material and disposed around the magnetic layer 44, and a protective layer 70 formed of a nonmagnetic material and disposed to cover the write head unit 9. Part of the nonmagnetic layer 64 is interposed between the medium facing surface 80 and each of the connecting surface of the first shield 16A and the respective end faces of the magnetic layers 42 and 44 facing toward the medium facing surface 80. The nonmagnetic layer 64 and the protective layer 70 are formed of alumina, for example.

As has been described, the magnetic head according to the present embodiment includes the medium facing surface 80, the read head unit 8, and write head unit 9. The read head unit 8 and the write head unit 9 are stacked on the substrate 1. The read head unit 8 is located on the rear side in the direction T of travel of the recording medium 90, i.e., the leading side, relative to the write head unit 9.

The write head unit 9 includes the first and second coils 10 and 20, the main pole 15, the write shield 16, the gap part 17, the return path section 40, the yoke 31, the first coupling portion 30A, and the second coupling portion 30B. The write shield 16 includes the first shield 16A, the second shield 16B, and the two side shields 16C and 16D. The gap part 17 is composed of part of the first gap layer 19 and part of the second gap layer 18.

The return path section 40 includes the magnetic layers 41 to 44, and is located on the front side in the direction T of travel of the recording medium 90 relative to the main pole 15. The return path section 40 connects the first shield 16A and part of the main pole 15 located away from the medium facing surface 80 to each other so as to define a first space S1 enclosed by the main pole 15, the gap part 17 (part of the gap layer 19), the write shield 16 and the return path section 40 (the magnetic layers 41 to 44).

The yoke 31 is located on the rear side in the direction T of travel of the recording medium 90 relative to the main pole 15. In the present embodiment, the yoke 31 is magnetically connected to the main pole 15 and the write shield 16. The first coupling portion 30A magnetically couples the write shield 16 and the yoke 31 to each other. The first coupling portion 30A includes the magnetic layer 34 in contact with the write shield 16, and the magnetic layer 32 connecting the magnetic layer 34 to the yoke 31. The magnetic layer 34 has an end face located in the medium facing surface 80. This end face is located on the rear side in the direction T of travel of the recording medium 90 relative to the end face of the main pole 15 and the second end face portion 16Ba of the second shield 16B. The second coupling portion 30B is located away from the medium facing surface 80 and magnetically couples the main pole 15 and the yoke 31 to each other. The second coupling portion 30B is composed of the magnetic layers 33, 35 and 36.

The main pole 15, the gap part 17 (part of the gap layer 18), the write shield 16, the yoke 31, the first coupling portion 30A and the second coupling portion 30B define a second space S2 enclosed by these components. The yoke 31, the first coupling portion 30A and the second coupling portion 30B constitute a second return path section located on the rear side in the direction T of travel of the recording medium 90 relative to the main pole 15. The second return path section connects the write shield 16 and part of the main pole 15 located away from the medium facing surface 80 to each other so that the aforementioned second space S2 is defined.

The first coil 10 is wound approximately two turns around the main pole 15 so as to pass through the first and second spaces S1 and S2. The second coil 20 is located on the rear side in the direction T of travel of the recording medium 90 relative to the main pole 15 so as to pass between the main pole 15 and the yoke 31. In the present embodiment, in particular, the second coil 20 is wound approximately two turns around the magnetic layer 33, which is part of the second coupling portion 30B, so as to pass through the second space S2.

The first and second coils 10 and 20 will now be described in detail with reference to FIG. 1 and FIG. 3 to FIG. 5. FIG. 3 is a plan view showing the line-shaped portions 11 and 12 of the first coil 10 and the second coil 20. FIG. 4 is a plan view showing the line-shaped portion 13 of the first coil 10. FIG. 5 is a plan view showing the line-shaped portion 14 of the first coil 10. As shown in FIG. 1, the two line-shaped portions 11 and 12 are located on the rear side in the direction T of travel of the recording medium 90 relative to the main pole 15. The two line-shaped portions 13 and 14 are located on the front side in the direction T of travel of the recording medium 90 relative to the main pole 15. As shown in FIG. 3, each of the line-shaped portions 11 and 12 includes a portion that extends to pass between the magnetic layer 32 and magnetic layer 33, in particular, within the second space S2. As shown in FIG. 4, the line-shaped portion 13 includes a portion that extends to pass between the first shield 16A and the magnetic layer 41, in particular, within the first space S1. As shown in FIG. 5, the line-shaped portion 14 includes a portion that extends to pass between the magnetic layer 42 and the magnetic layer 43, in particular, within the first space S1.

As shown in FIG. 3, the lead portion 10L of the first coil 10 is contiguous with the line-shaped portion 11. In FIG. 3, the boundary between the line-shaped portion 11 and the lead portion 10L is indicated by a dotted line. The line-shaped portion 11 has a coil connection 11S located near an end of the line-shaped portion 11 opposite from the boundary between the line-shaped portion 11 and the lead portion 10L. The line-shaped portion 12 has two coil connections 12S and 12E located near two ends of the line-shaped portion 12 that are opposite in the longitudinal direction. As shown in FIG. 4, the line-shaped portion 13 has two coil connections 13S and 13E located near two ends of the line-shaped portion 13 that are opposite in the longitudinal direction. As shown in FIG. 5, the line-shaped portion 14 has two coil connections 14S and 14E located near two ends of the line-shaped portion 14 that are opposite in the longitudinal direction.

The non-illustrated second connecting portion penetrates a plurality of layers interposed between the line-shaped portion 12 and the line-shaped portion 13. The third and fourth connecting portions 83 and 84 shown in FIG. 4 penetrate a plurality of layers interposed between the line-shaped portion 14 and the line-shaped portions 11, 12. The second to fourth connecting portions electrically connect the line-shaped portions 11-14 so as to form the first coil 10 wound helically around the main pole 15. More specifically, the second connecting portion electrically connects the coil connection 13E of the line-shaped portion 13 and the coil connection 12S of the line-shaped portion 12. The third connecting portion 83 electrically connects the coil connection 12E of the line-shaped portion 12 and the coil connection 14S of the line-shaped portion 14. The fourth connecting portion 84 electrically connects the coil connection 14E of the line-shaped portion 14 and the coil connection 11S of the line-shaped portion 11. When viewed from the medium facing surface 80, the first coil 10 is wound in a counterclockwise direction from the coil connection 13S of the line-shaped portion 13 to the boundary between the line-shaped portion 11 and the lead portion 10L.

As shown in FIG. 3, the second coil 20 includes a lead portion 20L, and a winding portion 20A contiguous with the lead portion 20L and wound around the magnetic layer 33 constituting part of the second coupling portion 30B. In FIG. 3, the boundary between the winding portion 20A and the lead portion 20L is indicated by a dotted line. The winding portion 20A is wound approximately two turns around the magnetic layer 33. The winding portion 20A has a coil connection 20E electrically connected to the first coil 10. When viewed from above, the winding portion 20A is wound in a counterclockwise direction from the boundary between the winding portion 20A and the lead portion 20L to the coil connection 20E.

The non-illustrated first connecting portion penetrates a plurality of layers interposed between the second coil 20 and the line-shaped portion 13, and electrically connects the coil connection 20E of the winding portion 20A of the second coil 20 and the coil connection 13S of the line-shaped portion 13. In the example shown in FIG. 3 to FIG. 5, the first coil 10 and the second coil 20 are connected in series.

Now, magnetic fields produced by the first and second coils 10 and 20 will be described. In the present embodiment, the first and second coils 10 and 20 are connected such that a magnetic flux corresponding to the magnetic field produced by the first coil 10 and a magnetic flux corresponding to the magnetic field produced by the second coil 20 flow in the same direction through the main pole 15. Where the direction of electric current flowing through the first coil 10 is counterclockwise when viewed from the medium facing surface 80, the magnetic field produced in the main pole 15 by the first coil 10 is in the direction of the arrow drawn within the main pole 15 in FIG. 1, that is, a first direction toward the medium facing surface 80. In this case, the direction of electric current flowing through the second coil 20 is counterclockwise when viewed from above, and the magnetic field produced in the main pole 15 by the second coil 20 is in the same direction as the direction of the magnetic field produced in the main pole 15 by the first coil 10, that is, the first direction. On the other hand, the magnetic field produced in the yoke 31 by the second coil 20 is in the direction of the arrow drawn within the yoke 31 in FIG. 1, that is, a second direction away from the medium facing surface 80. The first direction and the second direction are opposite to each other.

Where the direction of electric current flowing through the first coil 10 is clockwise when viewed from the medium facing surface 80 and the direction of electric current flowing through the second coil 20 is clockwise when viewed from above, the directions of the magnetic fields are opposite to the above-described directions.

The shapes of the first and second shields 16A and 16B, the yoke 31, and the magnetic layers 32 to 36 and 41 to 44 will now be described in detail with reference to FIG. 3 to FIG. 5. The first shield 16A has a central portion, and two side portions located on opposite sides of the central portion in the track width direction TW. The central portion includes the first end face portion 16Aa of the first shield 16A, and is disposed to intersect the main cross section. The two side portions are greater than the central portion in maximum length in the direction perpendicular to the medium facing surface 80. Like the first shield 16A, the magnetic layer 42 has a central portion intersecting the main cross section, and two side portions. However, the central portion of the magnetic layer 42 does not have a front end face located in the medium facing surface 80.

Although not illustrated, the second shield 16B has a central portion, and two side portions located on opposite sides of the central portion in the track width direction TW. The central portion includes the second end face portion 16Ba of the second shield 16B, and is disposed to intersect the main cross section. The two side portions are greater than the central portion in maximum length in the direction perpendicular to the medium facing surface 80. Like the second shield 16B, each of the magnetic layers 32 and 34 has a central portion intersecting the main cross section, and two side portions.

The first shield 16A and the magnetic layers 42 and 44 constitute a first coil surrounding portion shaped to surround a part of each of the line-shaped portions 13 and 14 of the first coil 10. The first coil surrounding portion has a first end face formed by the first end face portion 16Aa of the first shield 16. The first coil surrounding portion defines a space (hereinafter referred to as the first coil receiving space) whose width in the track width direction TW increases with increasing distance from the medium facing surface 80. As shown in FIG. 4 and FIG. 5, the width of the first end face (the first end face portion 16Aa) in the track width direction TW is smaller than the maximum width of the first coil receiving space in the track width direction TW.

Likewise, the second shield 16B, the yoke 31 and the magnetic layers 32 and 34 constitute a second coil surrounding portion shaped to surround a part of each of the line-shaped portions 11 and 12 of the first coil 10 and a part of the second coil 20. The second coil surrounding portion has a second end face formed by the second end face portion 16Ba of the second shield 16B and the end face of the magnetic layer 34. The second coil surrounding portion defines a space (hereinafter referred to as the second coil receiving space) whose width in the track width direction TW increases with increasing distance from the medium facing surface 80. Although not illustrated, the width of the second end face in the track width direction TW is smaller than the maximum width of the second coil receiving space in the track width direction TW.

The shape of the main pole 15 will now be described in detail with reference to FIG. 1 to FIG. 5. As shown in FIG. 3 to FIG. 5, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 1 and FIG. 2, the main pole 15 has the top surface 15T lying at the front end in the direction T of travel of the recording medium 90, the bottom end 15L opposite to the top surface 15T, the first side part, and the second side part. The top surface 15T of the main pole 15 includes the top surface of the track width defining portion 15A and the top surface of the wide portion 15B. The top surface of the wide portion 15B is greater than the top surface of the track width defining portion 15A in width in the track width direction TW.

The width of the top surface of the track width defining portion 15A in the track width direction TW is generally constant regardless of the distance from the medium facing surface 80. The width of the top surface of the wide portion 15B in the track width direction TW is, for example, equal to that of the top surface of the track width defining portion 15A at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 μm, for example. A zero neck height means that the track width defining portion 15A is not present and thus an end face of the wide portion 15B is located in the medium facing surface 80.

The top surface 15T includes a first inclined portion and a first flat portion, the first inclined portion being closer to the medium facing surface 80. The first inclined portion has a first end located in the medium facing surface 80 and a second end opposite to the first end. The first flat portion is connected to the second end of the first inclined portion. The first inclined portion is inclined such that its second end is located on the front side in the direction T of travel of the recording medium 90 relative to its first end. The first flat portion extends in a direction substantially perpendicular to the medium facing surface 80.

The bottom end 15L includes a second inclined portion and a second flat portion, the second inclined portion being closer to the medium facing surface 80. The second inclined portion has a first end located in the medium facing surface 80 and a second end opposite to the first end. The second inclined portion may be an edge formed by two intersecting planes, or may be a plane connecting two planes to each other. The second flat portion is a plane connected to the second end of the second inclined portion. The second inclined portion is inclined such that its second end is located on the rear side in the direction T of travel of the recording medium 90 relative to its first end. The second flat portion extends in a direction substantially perpendicular to the medium facing surface 80.

The end face of the main pole 15 located in the medium facing surface 80 has a first side adjacent to the first gap layer 19, a second side connected to one end of the first side, and a third side connected to the other end of the first side. The first side defines the track width. The position of an end of a record bit to be recorded on the recording medium 90 depends on the position of the first side. The end face of the main pole 15 located in the medium facing surface 80 decreases in width in the track width direction TW with increasing distance from the first side, that is, with increasing proximity to the top surface 1a of the substrate 1. Each of the second side and the third side forms an angle of, for example, 7° to 17°, or preferably 10° to 15°, relative to a direction perpendicular to the top surface 1a of the substrate 1. The first side has a length in the range of 0.05 to 0.20 μm, for example.

The function and effects of the magnetic head according to the present embodiment will now be described. The magnetic head writes data on the recording medium 90 by using the write head unit 9 and reads data stored on the recording medium 90 by using the read head unit 8. In the write head unit 9, the first and second coils 10 and 20 produce magnetic fields corresponding to data to be written on the recording medium 90. The main pole 15 allows magnetic fluxes corresponding to the magnetic fields produced by the first and second coils 10 and 20 to pass, and produces a write magnetic field for writing data on the recording medium 90 by means of the perpendicular magnetic recording system.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux that is produced from the end face of the main pole 15 and spreads in directions other than the direction perpendicular to the plane of the recording medium 90, and thereby preventing the magnetic flux from reaching the recording medium 90. Furthermore, the write shield 16, the return path section 40 (the magnetic layers 41 to 44) and the second return path section (the yoke 31, the first coupling portion 30A and the second coupling portion 30B) have the function of allowing a magnetic flux that has been produced from the end face of the main pole 15 and has magnetized the recording medium 90 to flow back.

In the medium facing surface 80, the end face of the write shield 16 is disposed to wrap around the end face of the main pole 15. The present embodiment thus makes it possible that, in regions on opposite sides of the end face of the main pole 15 in the track width direction TW and regions on the front and rear sides in the direction T of travel of the recording medium 90 relative to the end face of the main pole 15, a magnetic flux that is produced from the end face of the main pole 15 and spreads in directions other than the direction perpendicular to the plane of the recording medium 90 is captured and thereby prevented from reaching the recording medium 90. The present embodiment thereby allows for preventing unwanted erasure induced by a skew.

The position of an end of a record bit to be recorded on the recording medium 90 depends on the position of an end of the end face of the main pole 15 located in the medium facing surface 80, the end being located on the front side in the direction T of travel of the recording medium 90. To define the position of the end of the record bit with high accuracy, it is therefore effective that the end face of the write shield 16 includes the first end face portion 16Aa located on the front side in the direction T of travel of the recording medium 90 relative to the end face of the main pole 15.

With increases in frequency of write signals for higher recording densities, it is required of the magnetic head to provide an improved rate of change in the direction of the magnetic flux produced from the end face of the main pole 15. To satisfy this requirement, it is effective that the end face of the write shield 16 includes the first end face portion 16Aa as mentioned above. In addition to this, it is effective to provide the return path section 40 located on the front side in the direction T of travel of the recording medium 90 relative to the main pole 15 and connecting the write shield 16 to a part of the main pole 15 located away from the medium facing surface 80, and to reduce the length of the return path section 40. To that end, it is effective to reduce the number of turns of the coil passing through the first space S1 enclosed by the main pole 15, the gap part 17 (part of the gap layer 19), the write shield 16 and the return path section 40.

The magnetic head according to the present embodiment has the first coil 10 wound around the main pole 15 so as to pass through the first space S1. The first coil 10 allows most of the magnetic flux produced by the first coil 10 to pass through the main pole 15. Thus, the present embodiment allows for producing a write magnetic field of sufficient magnitude from the main pole 15 while reducing the number of turns of the first coil 10 to reduce the length of the return path section 40.

If the first coil 10 is the only one coil in the magnetic head, there is a possibility of occurrence of unwanted erasure due to degradation of the flux capturing capability of the write shield 16. In contrast to this, the magnetic head according to the present embodiment has also the second coil 20 located on the rear side in the direction T of travel of the recording medium 90 relative to the main pole 15 so as to pass between the main pole 15 and the yoke 31. The magnetic field produced in the main pole 15 by the second coil 20 and the magnetic field produced in the yoke 31 by the second coil 20 are in directions opposite to each other. The yoke 31 is thus capable of capturing a magnetic flux that flows in a direction opposite to the direction of a magnetic flux flowing through the main pole 15. This allows for preventing flux saturation in the write shield 16, and thereby makes it possible to make full use of the function of the write shield 16. The foregoing function and effects of the second coil 20 become noticeable where the yoke 31 is magnetically coupled to the write shield 16, or magnetically coupled to the main pole 15 at a position away from the medium facing surface 80. The foregoing function and effects of the second coil 20 are particularly noticeable where the yoke 31 is magnetically coupled to the write shield 16, and also magnetically coupled to the main pole 15 at a position away from the medium facing surface 80 as in the present embodiment. Since the second coil 20 is located on the rear side in the direction T of travel of the recording medium 90 relative to the main pole 15, the presence of the second coil 20 never increases the length of the return path section 40.

Consequently, the present embodiment makes it possible to produce a write magnetic field of sufficient magnitude from the main pole 15 and to make full use of the function of the write shield 16 while reducing the length of the return path section 40.

In the present embodiment, in particular, the yoke 31 is magnetically connected to the write shield 16 by the first coupling portion 30A. The yoke 31 is thus able to capture part of the magnetic flux captured into the write shield 16. Further, the yoke 31 is magnetically coupled to the main pole 15 by the second coupling portion 30B at a position away from the medium facing surface 80. This allows the magnetic flux captured into the yoke 31 to flow back to the main pole 15 and thereby allows the yoke 31 to capture more magnetic flux. Further, the second coil 20 is wound around the magnetic layer 33 constituting part of the second coupling portion 30B. This makes it possible to enhance the magnetomotive force of the second coil 20 on the yoke 31. Thus, the present embodiment allows the second coil 20 and the yoke 31 to exert the above-described function and effects more effectively.

In the present embodiment, as shown in FIG. 1, a first interface S10 is formed between the return path section 40 (the magnetic layer 41) and the main pole 15, and a second interface S20 is formed between the second coupling portion 30B (the magnetic layer 36) and the main pole 15. The first interface S10 has a first end E1 closest to the medium facing surface 80. The second interface S20 has a second end E2 closest to the medium facing surface 80. The first end E1 is located closer to the medium facing surface 80 than is the second end E2. This also serves to reduce the length of the return path section 40.

It should be noted that the number of turns of the second coil 20 is not restricted by the number of turns of the first coil 10. As will be described later in relation to other embodiments, the number of turns of the second coil 20 may be greater than that of the first coil 10. This allows for more effective exertion of the above-described function and effects of the second coil 20 and the yoke 31 while allowing for a reduction in length of the return path section 40.

The other effects provided by the present embodiment will now be described. If the first end face portion 16Aa or the first end face of the first coil surrounding portion composed of the first shield 16A and the magnetic layers 42 and 44 is exposed over a large area in the medium facing surface 80, part of the magnetic flux captured into the first coil surrounding portion through a portion of the first end face located near the end face of the main pole 15 may leak toward the recording medium 90 through another portion of the first end face. This may result in the occurrence of unwanted erasure. On the other hand, if the first coil surrounding portion is reduced in dimension in the track width direction, the first coil surrounding portion decreases in volume and thus becomes prone to flux saturation. This may result in leakage of magnetic flux from the first end face toward the recording medium 90, and may thereby induce unwanted erasure.

In the present embodiment, the first coil surrounding portion is shaped to form the first coil receiving space, that is, shaped to surround a part of each of the line-shaped portions 13 and 14 of the first coil 10. This allows the first coil surrounding portion to be large in volume. On the other hand, the width of the first end face (the first end face portion 16Aa) in the track width direction TW is smaller than the maximum width of the first coil receiving space in the track width direction TW. This allows the first end face to be small in area. The present embodiment thus makes it possible that the first coil surrounding portion is large in volume while the first end face is small in area.

Likewise, the second coil surrounding portion composed of the second shield 16B, the yoke 31 and the magnetic layers 32 and 34 is shaped to form the second coil receiving space, that is, shaped to surround a part of each of the line-shaped portions 11 and 12 of the first coil 10 and a part of the second coil 20. This allows the second coil surrounding portion to be large in volume. On the other hand, the width in the track width direction TW of the second end face of the second coil surrounding portion composed of the second end face portion 16Ba of the second shield 16B and the end face of the magnetic layer 34 is smaller than the maximum width in the track width direction TW of the second coil receiving space. This allows the second end face to be small in area. The present embodiment thus makes it possible that the second coil surrounding portion is large in volume while the second end face is small in area.

As discussed above, the present embodiment allows the first and second coil surrounding portions to be large in volume while allowing the first and second end faces exposed in the medium facing surface 80 to be small in area. Consequently, the present embodiment makes it possible to prevent leakage of magnetic flux from the first and second end faces that may occur in the case where the first and second end faces are exposed over a large area in the medium facing surface 80 or where the first and second coil surrounding portions are small in volume. The present embodiment thus allows for preventing unwanted erasure from occurring due to leakage of magnetic flux toward the recording medium 90 from the first and second end faces exposed in the medium facing surface 80.

A method of manufacturing the magnetic head according to the present embodiment will now be described. In the method of manufacturing the magnetic head according to the present embodiment, first, as shown in FIG. 1 and FIG. 2, the insulating layer 2, the first read shield layer 3, and the first read shield gap film 4 are formed in this order on the substrate 1. Next, the MR element 5 and leads (not illustrated) connected to the MR element 5 are formed on the first read shield gap film 4. The MR element 5 and the leads are then covered with the second read shield gap film 6. Then, the second read shield layer 7, the nonmagnetic layer 71, the middle shield layer 72, and the nonmagnetic layer 73 are formed in this order on the second read shield gap film 6.

Next, the yoke 31 is formed on the nonmagnetic layer 73. Then, the insulating layer 51 is formed over the entire top surface of the stack. The insulating layer 51 is then polished by, for example, chemical mechanical polishing (hereinafter referred to as CMP), until the yoke 31 is exposed. Next, the magnetic layers 32 and 33 are formed on the yoke 31. The insulating film 52 is then formed over the entire top surface of the stack. Next, the line-shaped portions 11 and 12 of the first coil 10 and the second coil 20 are formed by frame plating, for example. The insulating layer 53 is then formed in the space between the line-shaped portion 11 and the line-shaped portion 12, the space between the line-shaped portion 12 and the second coil 20, and the space between adjacent turns of the second coil 20. Next, the insulating layer 54 is formed over the entire top surface of the stack. The insulating layer 54 is then polished by, for example, CMP, until the line-shaped portions 11 and 12, the second coil 20, the magnetic layers 32 and 33 and the insulating layer 53 are exposed.

Next, the insulating layer 55 is formed over the entire top surface of the stack. The insulating layer 55 is then selectively etched to form therein two openings for exposing the top surfaces of the magnetic layers 32 and 33 and four openings for exposing the coil connections 11S, 12S, 12E and 20E (see FIG. 3). Then, the magnetic layer 34 is formed on the magnetic layer 32, and the magnetic layer 35 is formed on the magnetic layer 33. Further, a portion of the non-illustrated first connecting portion is formed on the coil connection 20E, a portion of the non-illustrated second connecting portion is formed on the coil connection 12S, a portion of the third connecting portion 83 (see FIG. 4) is formed on the coil connection 12E, and a portion of the fourth connecting portion 84 (see FIG. 4) is formed on the coil connection 11S. The portion of the first connecting portion disposed on the coil connection 20E will hereinafter be referred to as the first portion. The first connecting portion includes the first portion, and a second and a third portion stacked in this order on the first portion. Likewise, the second connecting portion includes a first portion disposed on the coil connection 12S, and a second and a third portion stacked in this order on the first portion. The third connecting portion 83 includes a first portion disposed on the coil connection 12E, and a second, a third and a fourth portion stacked in this order on the first portion. The fourth connecting portion 84 includes a first portion disposed on the coil connection 11S, and a second, a third and a fourth portion stacked in this order on the first portion.

Next, the insulating layer 56 is formed over the entire top surface of the stack. The insulating layer 56 is then polished by, for example, CMP, until the magnetic layers 34 and 35 and the respective first portions of the first to fourth connecting portions are exposed.

Reference is now made to FIG. 6A through FIG. 13B to describe a series of steps to be performed after the foregoing step up to the formation of the magnetic layer 44 and the nonmagnetic layer 64. FIG. 6A through FIG. 13B each show a stack of layers formed in the process of manufacturing the magnetic head. FIGS. 6A-13A each show the main cross section. FIGS. 6B-13B each show a cross section of the stack taken at the position at which the medium facing surface 80 is to be formed. Portions that are closer to the substrate 1 relative to the yoke 31 and the insulating layer 51 are omitted from these figures.

Figure 6A:
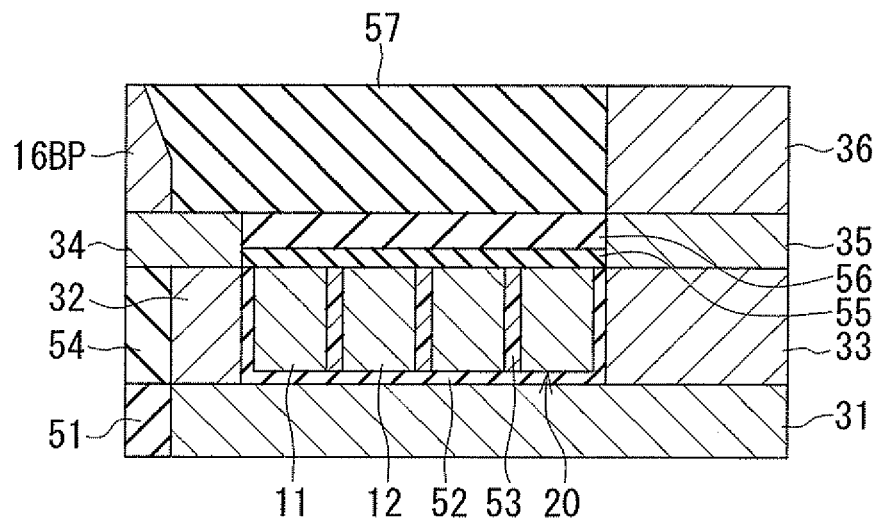
FIG. 6A and FIG. 6B are cross-sectional views showing a step of a method of manufacturing the magnetic head according to the first embodiment of the invention.
Figure 6B:
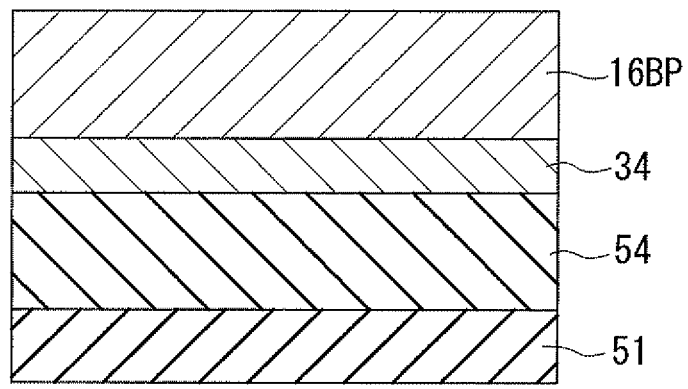

FIG. 6A and FIG. 6B show a step that follows the polishing of the insulating layer 56. In this step, first, a magnetic layer 16BP which later becomes the second shield 16B is formed on the magnetic layer 34, the magnetic layer 36 is formed on the magnetic layer 35, and the respective second portions of the first to fourth connecting portions are formed on the respective first portions of the first to fourth connecting portions. Next, a portion of the magnetic layer 16BP is taper-etched by, for example, reactive ion etching (hereinafter referred to as RIE). Then, the nonmagnetic layer 57 is formed over the entire top surface of the stack. The nonmagnetic layer 57 is then polished by, for example, CMP, until the magnetic layers 16BP and 36 and the respective second portions of the first to fourth connecting portions are exposed.

Figure 7A:
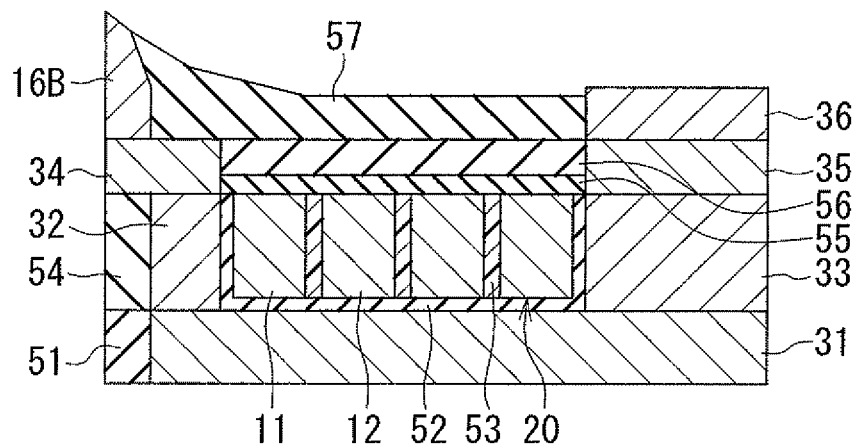
FIG. 7A and FIG. 7B are cross-sectional views showing a step that follows the step shown in FIG. 6A and FIG. 6B.
Figure 7B:
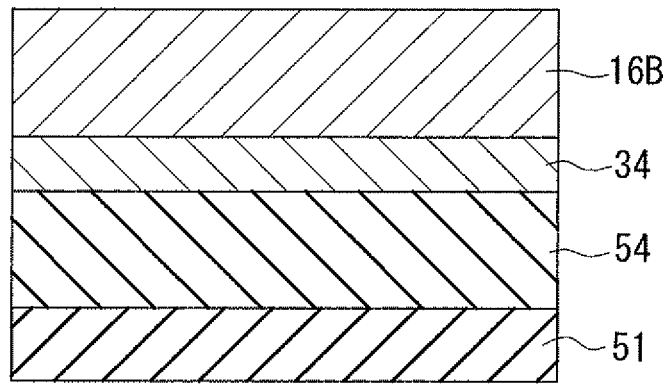

FIG. 7A and FIG. 7B show the next step. In this step, the magnetic layer 16BP and the nonmagnetic layer 57 are taper-etched in part by, for example, ion beam etching (hereinafter referred to as IBE). This makes the magnetic layer 16BP into the second shield 16B. This etching also etches part of the magnetic layer 36.

Figure 8A:
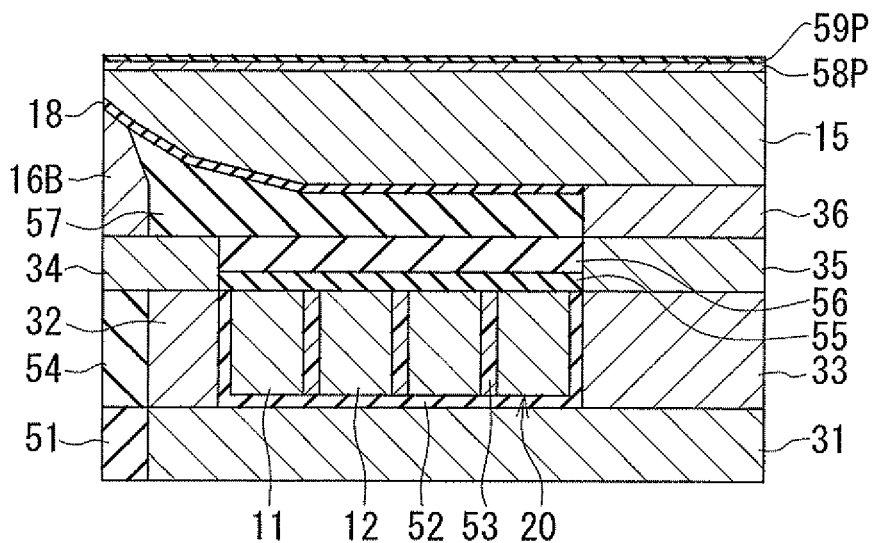
FIG. 8A and FIG. 8B are cross-sectional views showing a step that follows the step shown in FIG. 7A and FIG. 7B.
Figure 8B:
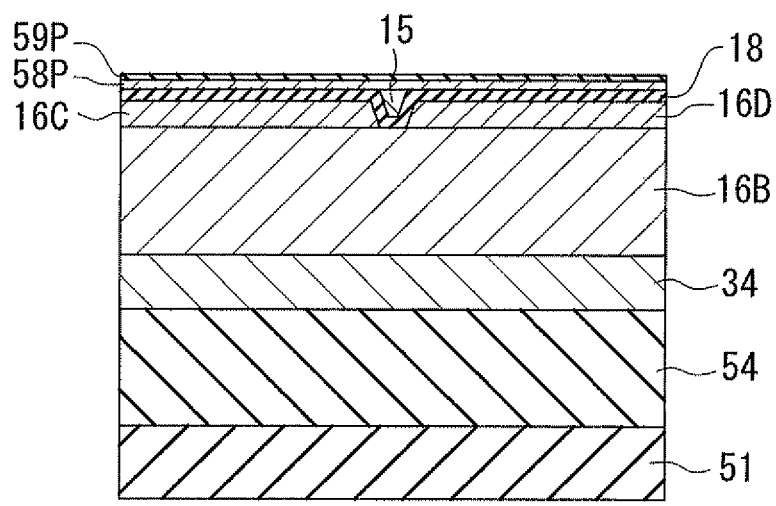

FIG. 8A and FIG. 8B show the next step. In this step, first, the side shields 16C and 16D are formed on the second shield 16B. Next, the second gap layer 18 is formed over the entire top surface of the stack. The second gap layer 18 is then selectively etched to form therein an opening for exposing the top surface of the magnetic layer 36 and four openings for exposing the top surfaces of the respective second portions of the first to fourth connecting portions. The main pole 15 is then formed. Further, the respective third portions of the first to fourth connecting portions are formed on the respective second portions thereof. The main pole 15 and the respective third portions of the first to fourth connecting portions are formed such that their top surfaces are higher in level than the top surfaces of portions of the second gap layer 18 lying on the side shields 16C and 16D.

Next, the non-illustrated first nonmagnetic layer is formed over the entire top surface of the stack. The first nonmagnetic layer, the main pole 15, and the respective third portions of the first to fourth connecting portions are then polished by, for example, CMP, until the portions of the second gap layer 18 lying on the side shields 16C and 16D are exposed. Next, a stack of mask layers 58P and 59P is formed over the main pole 15 and the side shields 16C and 16D. The mask layer 58P will later become the nonmagnetic metal layer 58. The mask layer 59P will later become the insulating layer 59.

Figure 9A:
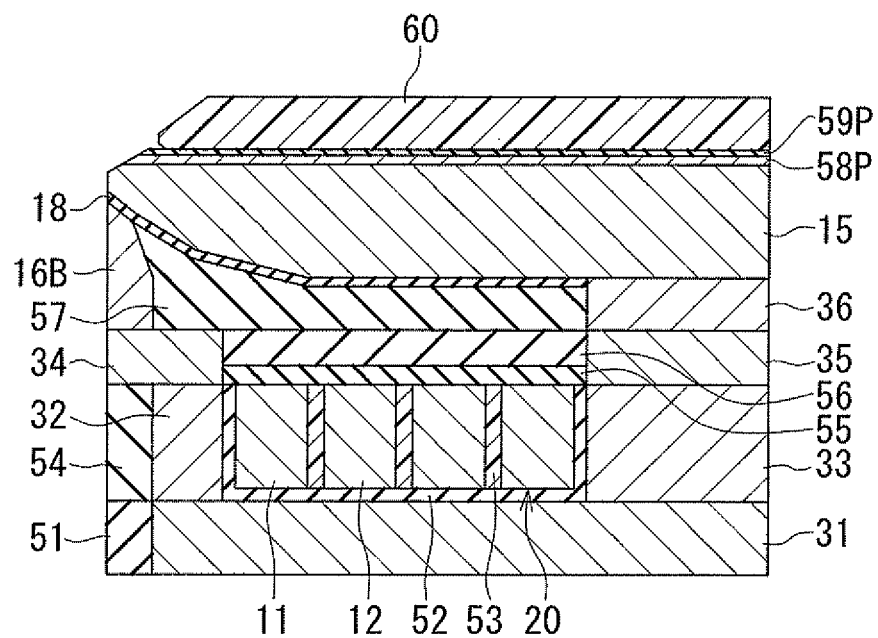
FIG. 9A and FIG. 9B are cross-sectional views showing a step that follows the step shown in FIG. 8A and FIG. 8B.
Figure 9B:
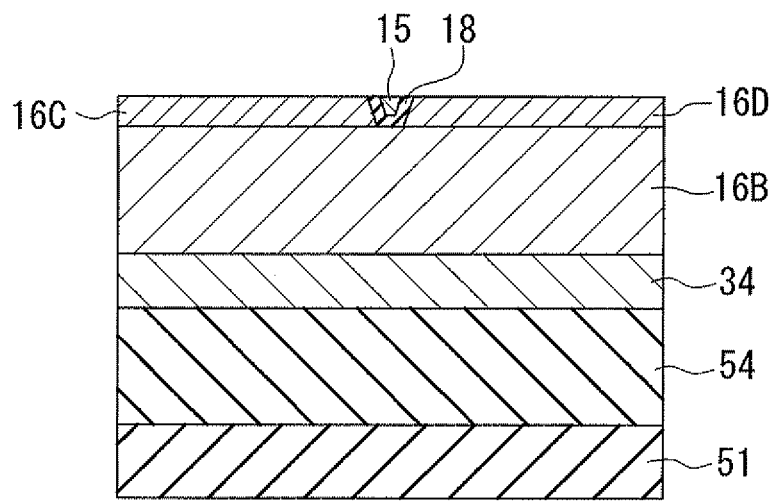

FIG. 9A and FIG. 9B show the next step. In this step, first, a photoresist mask 60 is formed on the mask layer 59P. The photoresist mask 60 is formed by patterning a photoresist layer. The photoresist mask 60 does not cover a portion of the top surface of the stack located near the position at which the medium facing surface 80 is to be formed. The main pole 15, the side shields 16C and 16D, the mask layers 58P and 59P, and the first nonmagnetic layer are then etched in part by, for example, IBE, using the photoresist mask 60 as the etching mask. The photoresist mask 60 is then removed.

Figure 10A:
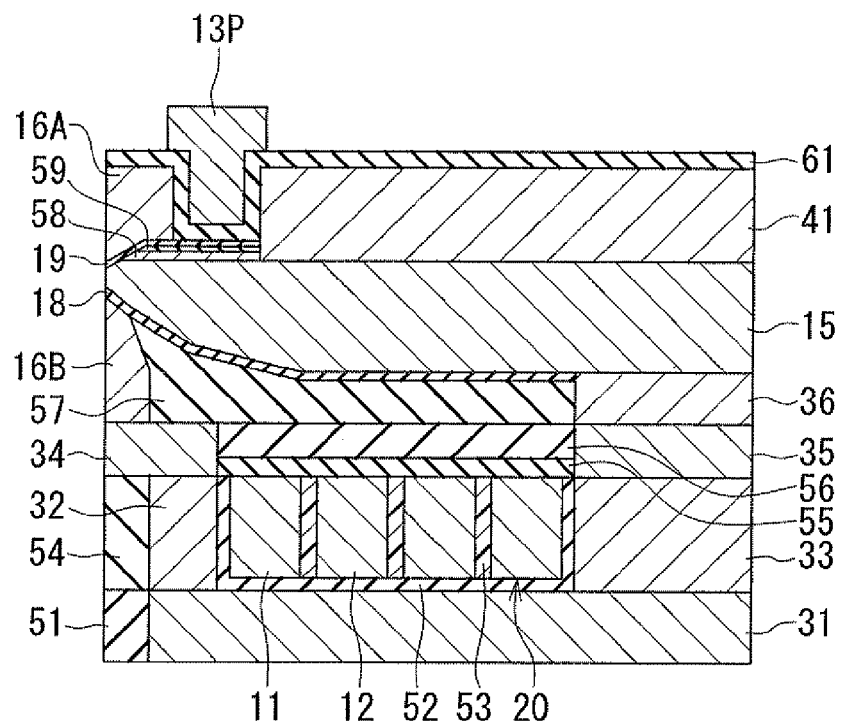
FIG. 10A and FIG. 10B are cross-sectional views showing a step that follows the step shown in FIG. 9A and FIG. 9B.
Figure 10B:
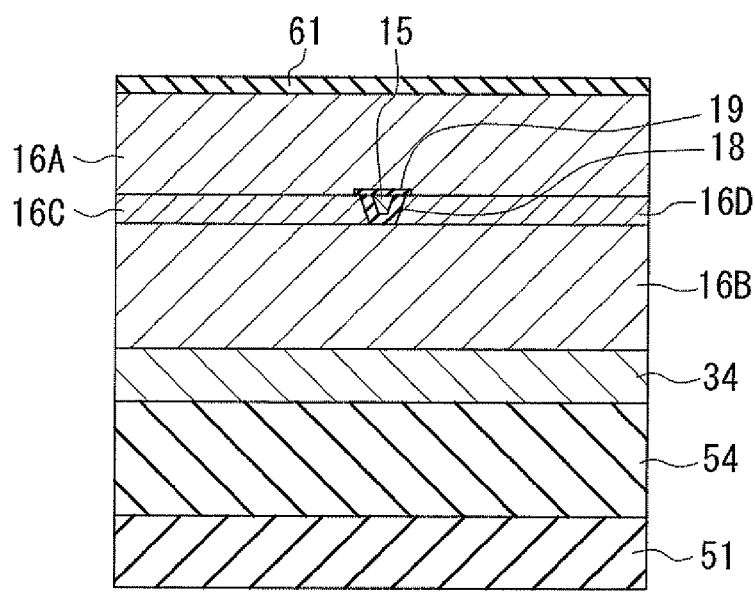

FIG. 10A and FIG. 10B show the next step. In this step, first, the first gap layer 19 is formed over the entire top surface of the stack. The first gap layer 19 and the mask layers 58P and 59P are then selectively etched by, for example, IBE, so that a portion of the top surface of the main pole 15, portions of the top surfaces of the side shields 16C and 16D, and the top surfaces of the respective third portions of the first to fourth connecting portions are exposed. This makes the mask layers 58P and 59P into the nonmagnetic metal layer 58 and the insulating layer 59, respectively. Then, the first shield 16A is formed over the side shields 16C and 16D and the first gap layer 19, and the magnetic layer 41 is formed on the main pole 15.

Next, the insulating film 61 is formed over the entire top surface of the stack. The insulating film 61 is then selectively etched to form therein four openings for exposing the top surfaces of the respective third portions of the first to fourth connecting portions. Next, a conductive layer 13P, which later becomes the line-shaped portion 13 of the first coil 10, is formed over the insulating film 61 and the respective third portions of the first and second connecting portions, and the respective fourth portions of the third and fourth connecting portions 83 and 84 are formed on the respective third portions thereof by, for example, frame plating. The conductive layer 13P and the respective fourth portions of the third and fourth connecting portions 83 and 84 are formed such that their top surfaces are higher in level than the top surfaces of portions of the insulating film 61 lying on the first shield 16A and the magnetic layer 41.

Figure 11A:
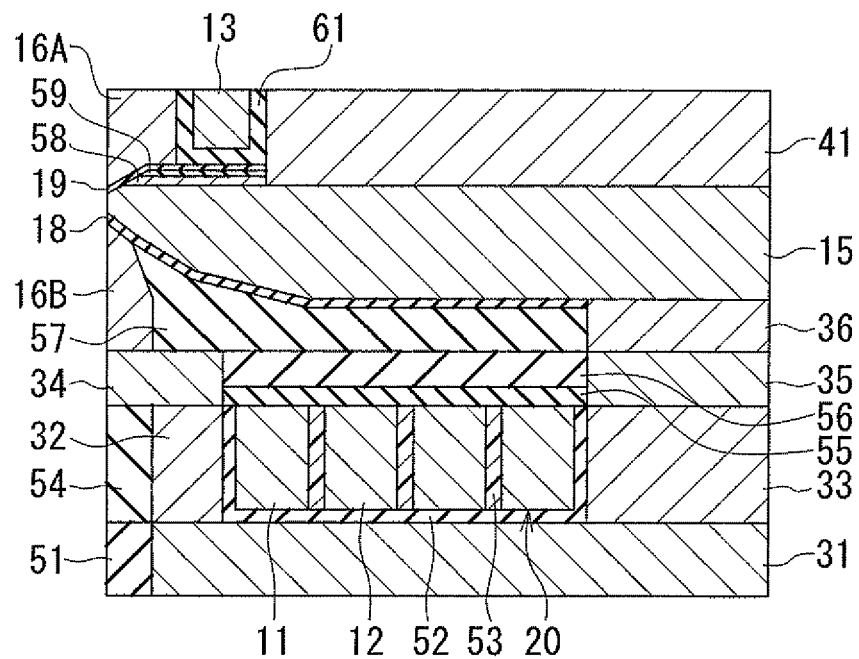
FIG. 11A and FIG. 11B are cross-sectional views showing a step that follows the step shown in FIG. 10A and FIG. 10B.
Figure 11B:
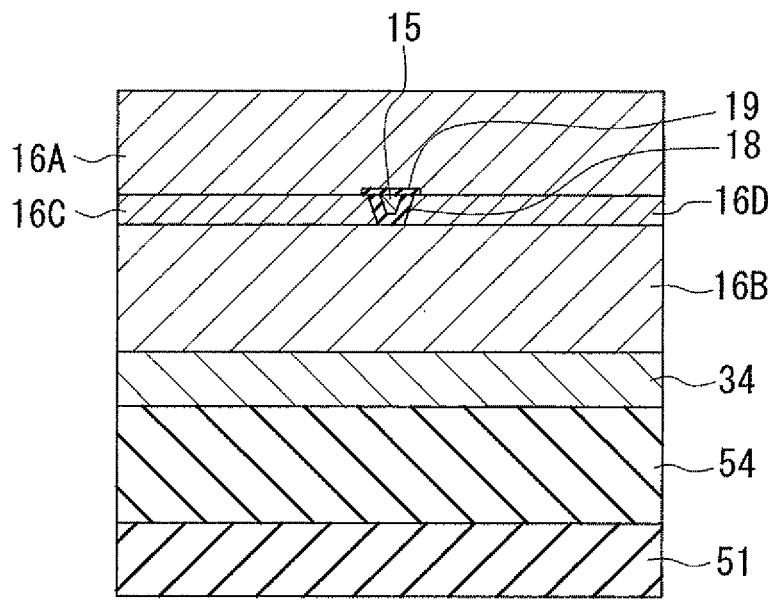

FIG. 11A and FIG. 11B show the next step. In this step, first, the non-illustrated second nonmagnetic layer is formed over the entire top surface of the stack. The second nonmagnetic layer, the conductive layer 13P, the insulating film 61, and the respective fourth portions of the third and fourth connecting portions 83 and 84 are then polished by, for example, CMP, until the first shield 16A and the magnetic layer 41 are exposed. This makes the conductive layer 13P into the line-shaped portion 13.

Figure 12A:
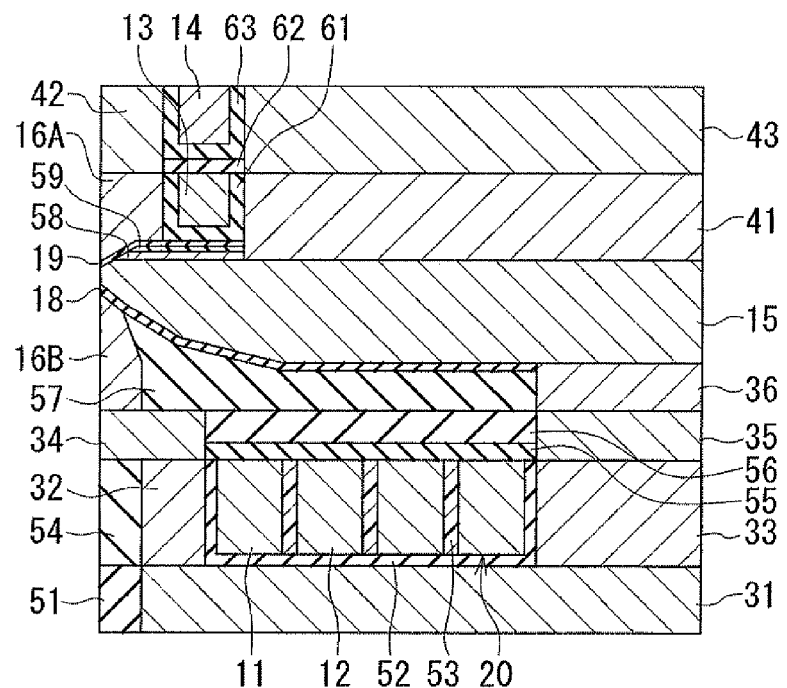
FIG. 12A and FIG. 12B are cross-sectional views showing a step that follows the step shown in FIG. 11A and FIG. 11B.
Figure 12B:
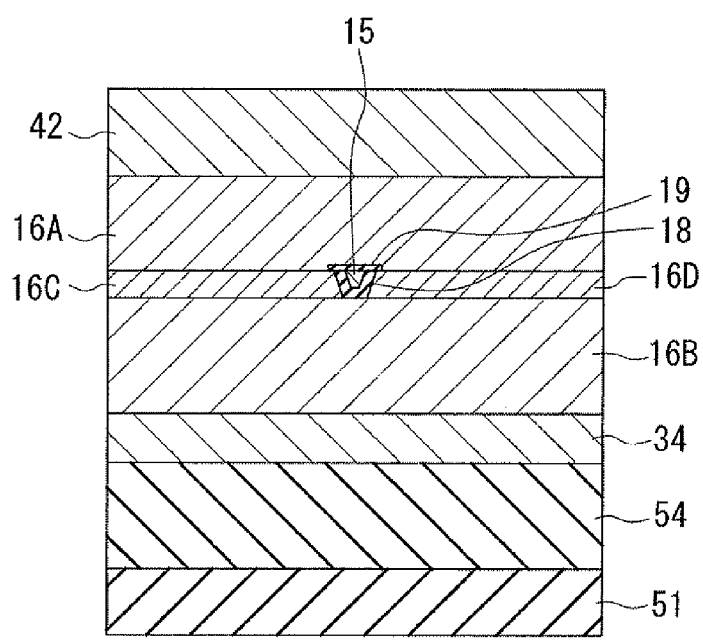

FIG. 12A and FIG. 12B show the next step. In this step, first, the insulating layer 62 is formed over the entire top surface of the stack. The insulating layer 62 is then selectively etched to form therein two openings for exposing the top surfaces of the first shield 16A and the magnetic layer 41, and two openings for exposing the top surfaces of the respective fourth portions of the third and fourth connecting portions 83 and 84. Next, the magnetic layer 42 is formed on the first shield 16A, and the magnetic layer 43 is formed on the magnetic layer 41. Then, the insulating film 63 is formed over the entire top surface of the stack. The insulating film 63 is then selectively etched to form therein two openings for exposing the top surfaces of the respective fourth portions of the third and fourth connecting portions 83 and 84. Next, the line-shaped portion 14 of the first coil 10 and the non-illustrated third nonmagnetic layer are formed. The line-shaped portion 14 and the third nonmagnetic layer are formed by the same method as the method of forming the line-shaped portion 13 and the second nonmagnetic layer.

Figure 13A:
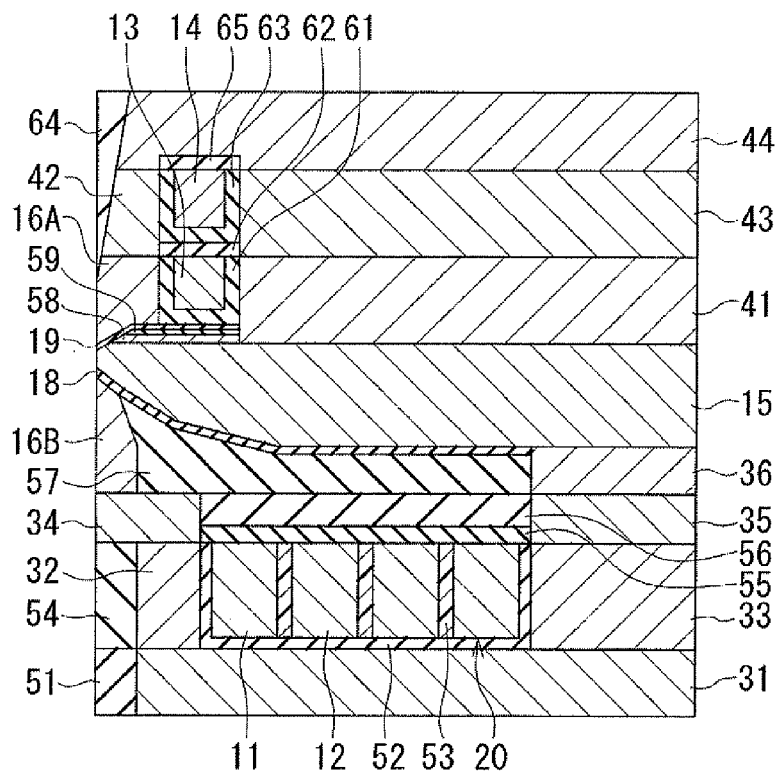
FIG. 13A and FIG. 13B are cross-sectional views showing a step that follows the step shown in FIG. 12A and FIG. 12B.
Figure 13B:
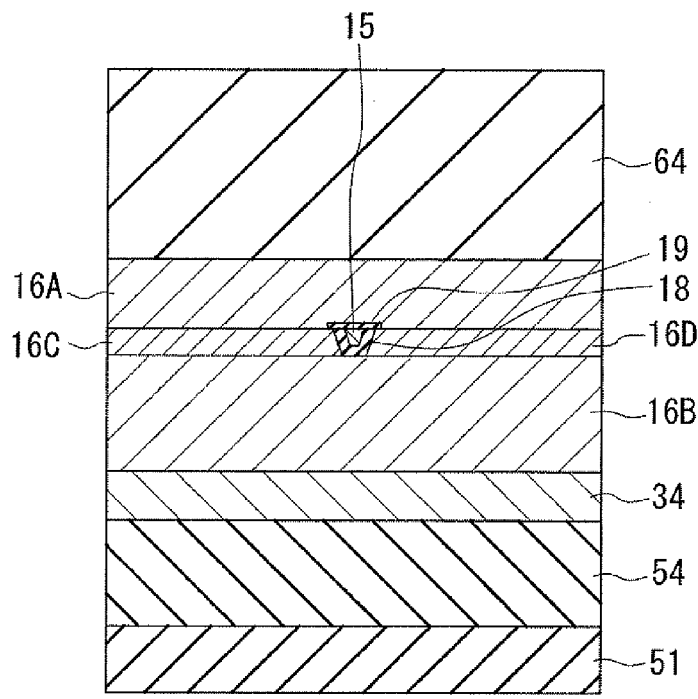

FIG. 13A and FIG. 13B show the next step. In this step, first, the insulating layer 65 is formed over the entire top surface of the stack. The insulating layer 65 is then selectively etched to form therein two openings for exposing the top surfaces of the magnetic layers 42 and 43. Next, the magnetic layer 44 is formed over the magnetic layers 42 and 43 and the insulating layer 65. The first shield 16A and the magnetic layers 42 and 44 are then etched by, for example, RIE or IBE so as to provide the first shield 16A with the connecting surface and provide the magnetic layers 42 and 44 with the respective end faces. Next, the nonmagnetic layer 64 is formed over the entire top surface of the stack. The nonmagnetic layer 64 is then polished by, for example, CMP, until the magnetic layer 44 is exposed.

Next, the protective layer 70 is formed to cover the entire top surface of the stack. Wiring, terminals and other components are then formed on the protective layer 70, the substrate is cut for individual sliders, and processing including polishing of the medium facing surface 80 and fabrication of flying rails is performed to complete the magnetic head.

Second Embodiment

Figure 14:
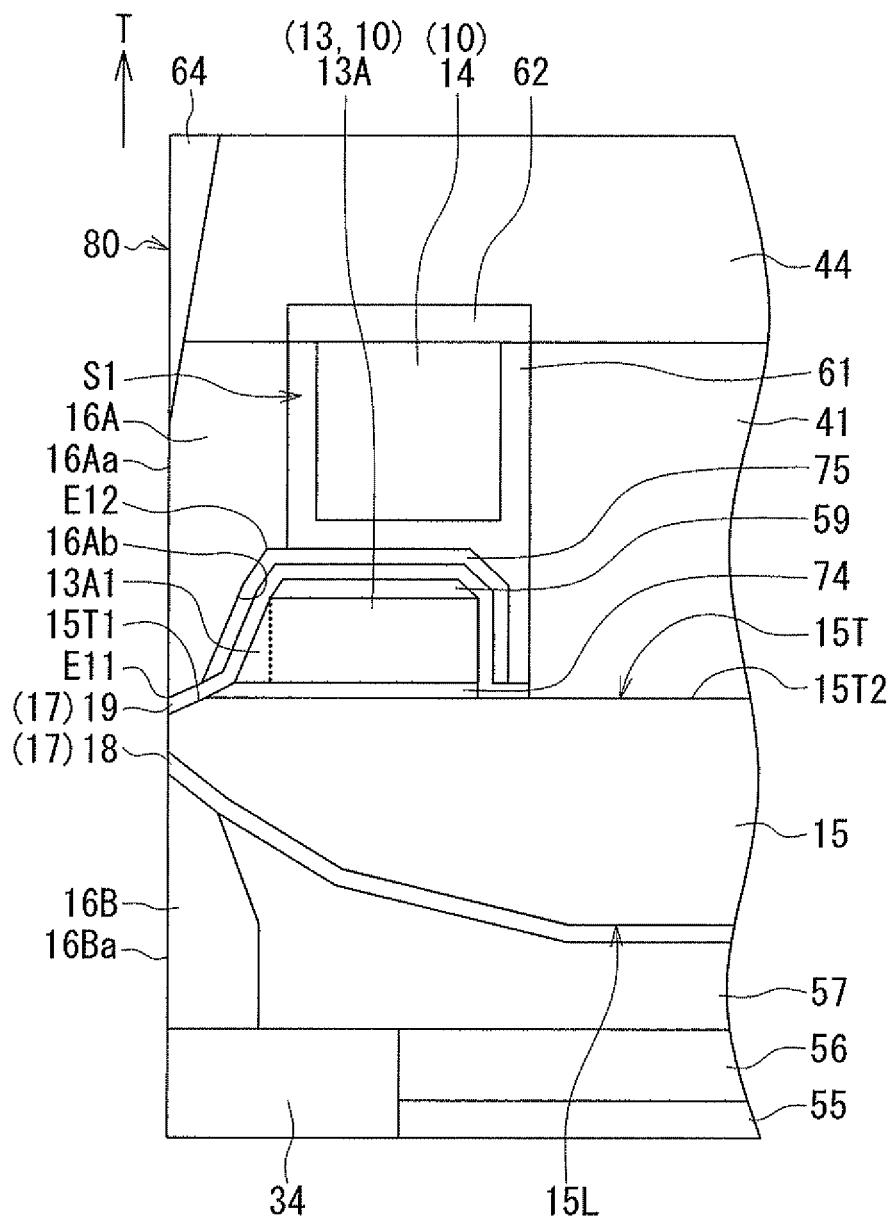
FIG. 14 is a cross-sectional view showing the main part of a magnetic head according to a second embodiment of the invention.
Figure 15:
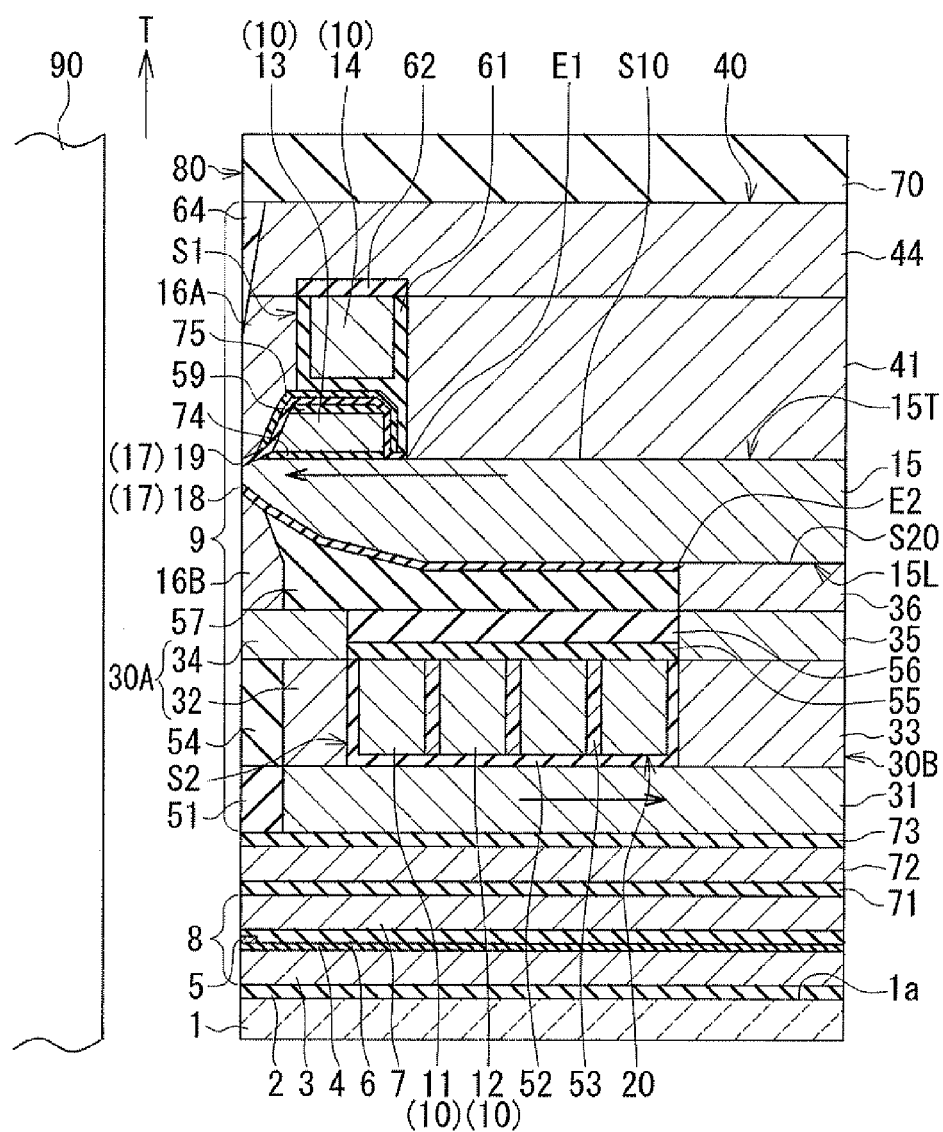
FIG. 15 is a cross-sectional view of the magnetic head according to the second embodiment of the invention.
Figure 16:
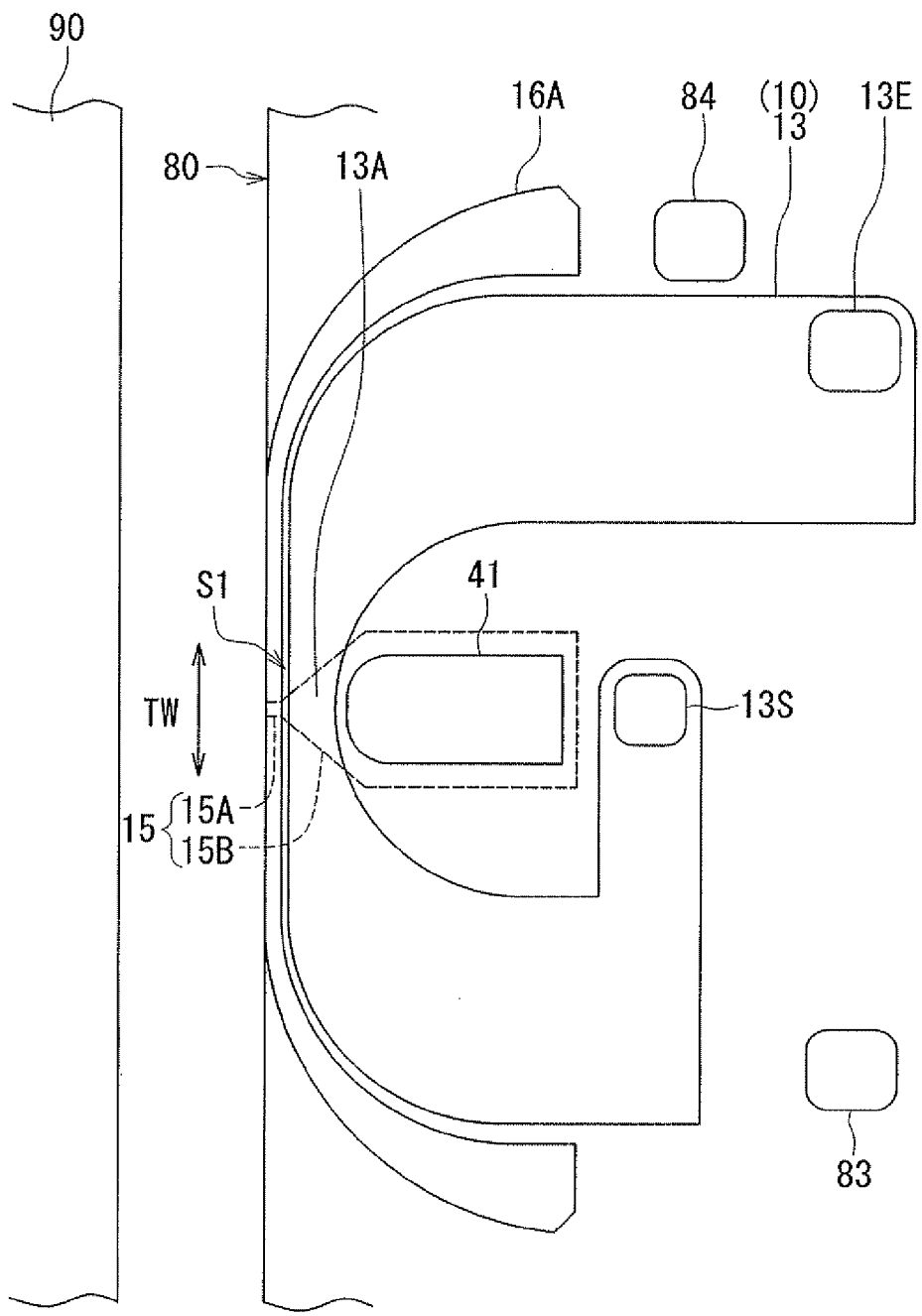
FIG. 16 is a plan view showing a coil portion of the magnetic head according to the second embodiment of the invention.
Figure 17:
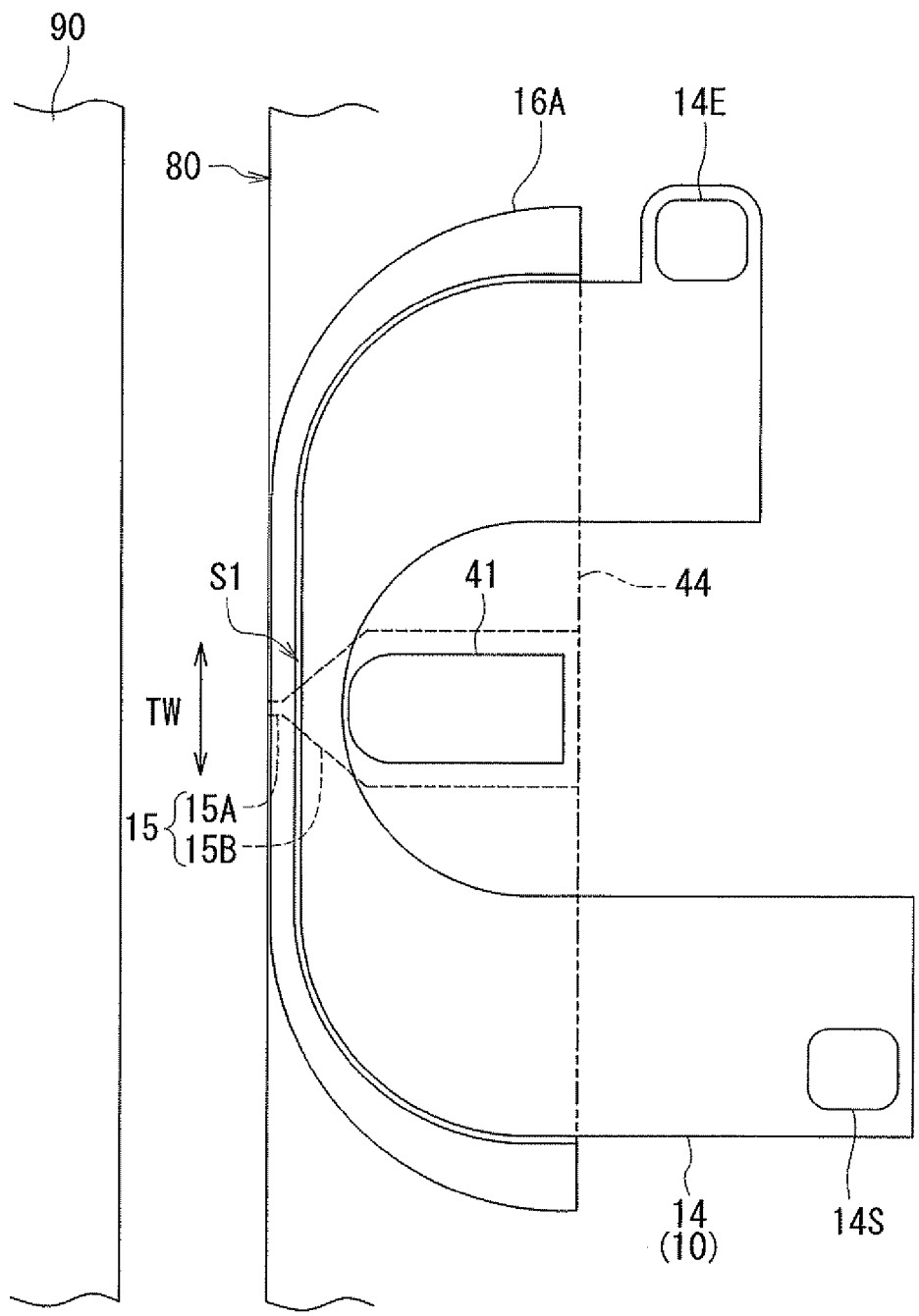
FIG. 17 is a plan view showing another coil portion of the magnetic head according to the second embodiment of the invention.

A magnetic head according to a second embodiment of the invention will now be described. First, the configuration of the magnetic head according to the present embodiment will be described with reference to FIG. 14 to FIG. 17. FIG. 14 is a cross-sectional view showing the main part of the magnetic head according to the present embodiment. FIG. 15 is a cross-sectional view of the magnetic head according to the present embodiment. FIG. 16 is a plan view showing a coil portion of the magnetic head according to the present embodiment. FIG. 17 is a plan view showing another coil portion of the magnetic head according to the present embodiment.

The configuration of the magnetic head according to the present embodiment differs from the first embodiment in the following ways. In the magnetic head according to the present embodiment, there are not provided the magnetic layers 42 and 43, the nonmagnetic metal layer 58, the insulating film 63, the insulating layer 65, and the non-illustrated third nonmagnetic layer described in the first embodiment section. The magnetic head according to the present embodiment includes an insulating layer 74 formed of an insulating material, located at a distance from the medium facing surface 80 and lying on part of the top surface 15T of the main pole 15. The insulating layer 74 is formed of alumina, for example. In the present embodiment, the line-shaped portion 13 of the first coil 10 is disposed on the insulating layer 74. The insulating layer 59 is disposed on the line-shaped portion 13. The first gap layer 19 is disposed to cover the line-shaped portion 13, the main pole 15 and the insulating layers 59 and 74. The insulating layer 59 may be omitted if the first gap layer 19 is formed of a nonmagnetic insulating material such as alumina. In such a case, the first gap layer 19 covers the top surface of the line-shaped portion 13.

The magnetic head further includes an insulating layer 75 formed of an insulating material, located at a distance from the medium facing surface 80 and extending along the first gap layer 19. The insulating layer 75 is formed of alumina, for example. The first shield 16A is disposed over the side shields 16C and 16D, the first gap layer 19 and the insulating layer 75.

In the present embodiment, as shown in FIG. 14 to FIG. 17, both the line-shaped portions 13 and 14 of the first coil 10 are located between the first shield 16A and the magnetic layer 41. The line-shaped portions 13 and 14 are arranged in this order in the direction perpendicular to the top surface $1a$ of the substrate 1, the line-shaped portion 13 being closer to the substrate 1. The insulating film 61 isolates the line-shaped portion 14 from the first shield 16A, the magnetic layer 41 and the insulating layer 75. The positional relationships of the line-shaped portion 14 with the first shield 16A, the magnetic layer 41, the insulating film 61, the insulating layer 62 and the non-illustrated second nonmagnetic layer are the same as those of the line-shaped portion 13 of the first embodiment. The magnetic layer 44 is disposed over the first shield 16A, the magnetic layer 41 and the insulating layer 62, and connects the first shield 16A and the magnetic layer 41 to each other.

The shapes of the line-shaped portion 13 of the first coil 10 and the first shield 16A of the present embodiment will now be described in detail with reference to FIG. 14 and FIG. 16. In FIG. 14, reference symbols 15T1 and 15T2 indicate the first inclined portion and the first flat portion, respectively, of the top surface 15T of the main pole 15 described in the first embodiment section.

As shown in FIG. 14, the first shield 16A has an inclined surface 16Ab facing toward the top surface 15T of the main pole 15. Since the first shield 16A is part of the write shield 16, the write shield 16 can be said to have the inclined surface 16Ab. The inclined surface 16Ab has a first end E11 located in the medium facing surface 80, and a second end E12 opposite to the first end E11. The second end E12 is located on the front side in the direction T of travel of the recording medium 90 relative to the first end E11.

The inclined surface 16Ab includes a first portion and a second portion, the first portion being located closer to the medium facing surface 80. The second portion forms a greater angle than does the first portion relative to an imaginary plane that is perpendicular to the medium facing surface 80 and to the direction T of travel of the recording medium 90. The first portion is in contact with the first gap layer 19 and opposed to the first inclined portion 15T1 of the top surface 15T of the main pole 15 with the first gap layer 19 interposed therebetween. The second portion is in contact with the insulating layer 75.

As shown in FIG. 16, the line-shaped portion 13 includes a coil element 13A that extends to pass between the first shield 16A and the magnetic layer 41, in particular, within the first space S1. Since the line-shaped portion 13 is part of the first coil 10, the first coil 10 can be said to include the coil element 13A. As shown in FIG. 14, the coil element 13A includes a portion 13A1 that is located closer to the medium facing surface 80 than is the second end E12 and that lies between the top surface 15T of the main pole 15 and the inclined surface 16Ab. In FIG. 14, the boundary between the portion 13A1 and the remainder of the coil element 13A is indicated by a dotted line. In the example shown in FIG. 14, the portion 13A1 lies between the first flat portion 15T2 of the top surface 15T of the main pole 15 and the second portion of the inclined surface 16Ab.

In the present embodiment, the portion 13A1 of the coil element 13A is located in the space between the top surface 15T of the main pole 15 and the inclined surface 16Ab. This allows for placement of the coil element 13A in the first space S1 with high space utilization efficiency. Consequently, the present embodiment allows for a reduction in length of the return path section 40.

A method of manufacturing the magnetic head according to the present embodiment will now be described with reference to FIG. 18 to FIG. 24. FIG. 18 to FIG. 24 each illustrate a stack of layers formed in the process of manufacturing the magnetic head. FIG. 18 to FIG. 24 show the main cross section. Portions that are closer to the substrate 1 relative to the yoke 31 and the insulating layer 51 are omitted from these figures.

Figure 18:
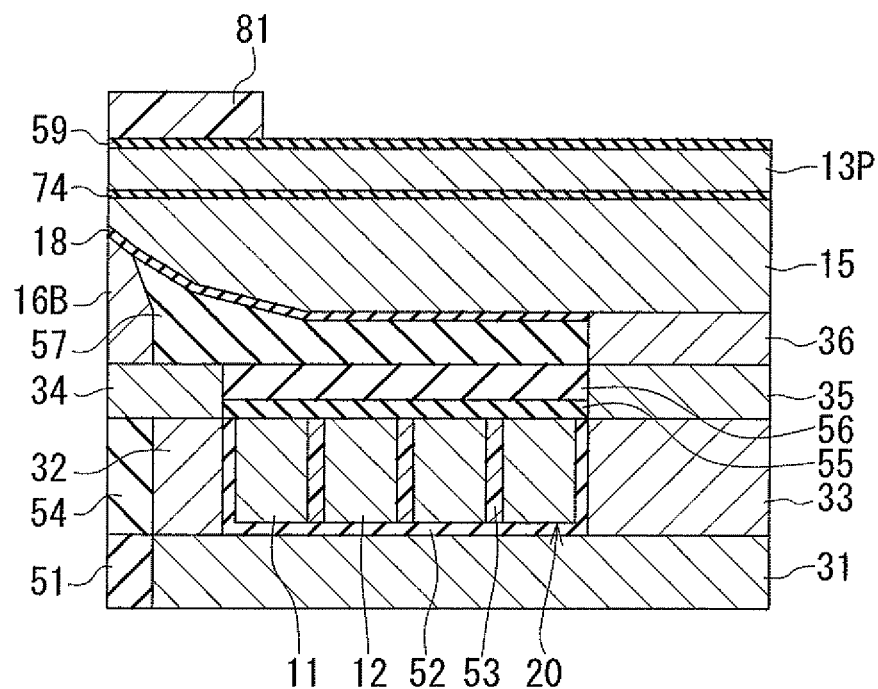
FIG. 18 is a cross-sectional view showing a step of a method of manufacturing the magnetic head according to the second embodiment of the invention.

The method of manufacturing the magnetic head according to the present embodiment is the same as the method according to the first embodiment up to the step of polishing the non-illustrated first nonmagnetic layer, the main pole 15 and the respective third portions of the first to fourth connecting portions. FIG. 18 shows a step subsequent thereto. In this step, first, the insulating layer 74 is formed over the entire top surface of the stack. The insulating layer 74 is then selectively etched to form therein four openings for exposing the top surfaces of the respective third portions of the first to fourth connecting portions. Next, a conductive layer 13P, which later becomes the line-shaped portion 13 of the first coil 10, is formed over the first and second connecting layers and the insulating layer 74. Further, the respective fourth portions of the third and fourth connecting portions 83 and 84 are formed on the respective third portions thereof. Next, the insulating layer 59 is formed on the conductive layer 13P. A photoresist mask 81 is then formed on the insulating layer 59. The planar shape (the shape in a plan view) of the photoresist mask 81 corresponds to the planar shape of the line-shaped portion 13. The photoresist mask 81 lies above a region of the conductive layer 13P that will be formed into the line-shaped portion 13.

Figure 19:
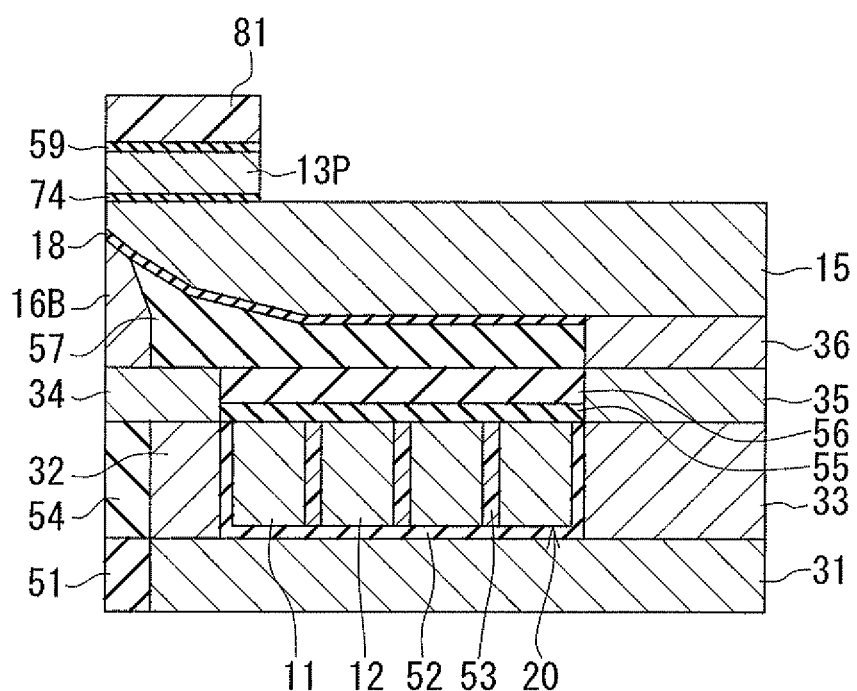
FIG. 19 is a cross-sectional view showing a step that follows the step shown in FIG. 18.

FIG. 19 shows the next step. In this step, first, the conductive layer 13P and the insulating layers 59 and 74 are etched in part by, for example, IBE, using the photoresist mask 81 as the etching mask. The photoresist mask 81 is then removed.

Figure 20:
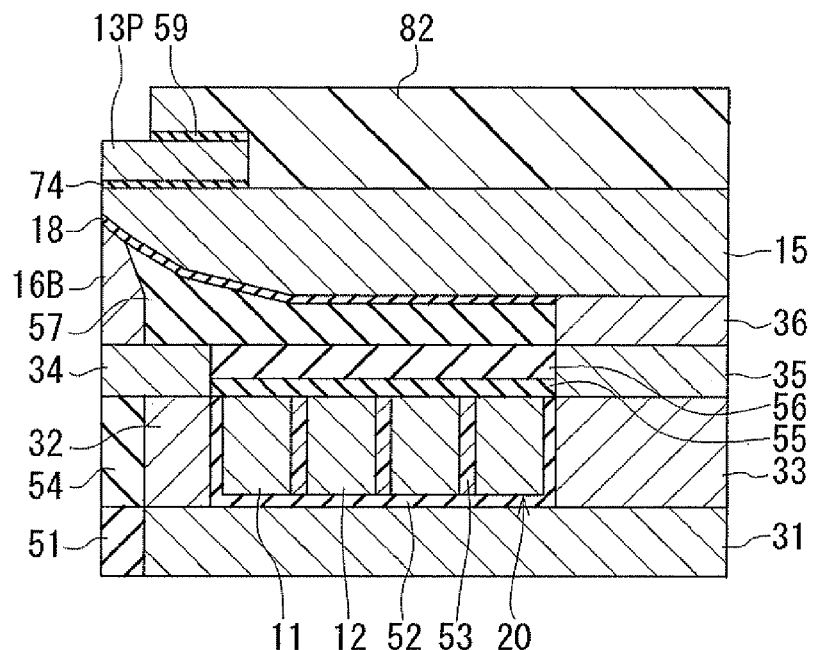
FIG. 20 is a cross-sectional view showing a step that follows the step shown in FIG. 19.

FIG. 20 shows the next step. In this step, a photoresist mask 82 is formed over the main pole 15, the conductive layer 13P and the insulating layers 59 and 74. The photoresist mask 82 does not cover a portion of the top surface of the stack located near the position at which the medium facing surface 80 is to be formed. Then, a portion of the insulating layer 59 is etched by, for example, RIE or IBE, using the photoresist mask 82 as the etching mask. The photoresist mask 82 is then removed.

Figure 21:
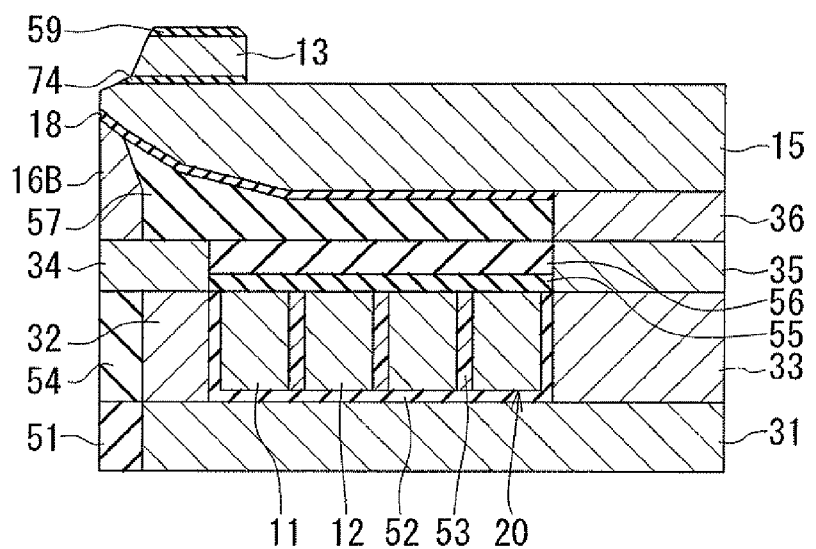
FIG. 21 is a cross-sectional view showing a step that follows the step shown in FIG. 20.

FIG. 21 shows the next step. In this step, the conductive layer 13P, the main pole 15, the side shields 16C and 16D, the gap layer 18 and the insulating layer 74 are etched in part by, for example, IBE, using the insulating layer 59 as the etching mask. This makes the conductive layer 13P into the line-shaped portion 13.

Figure 22:
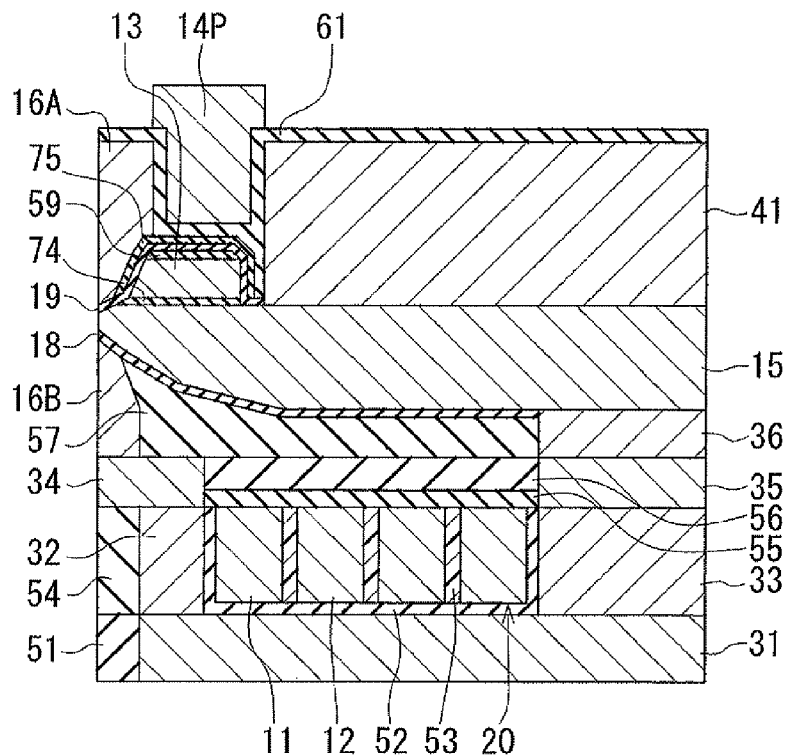
FIG. 22 is a cross-sectional view showing a step that follows the step shown in FIG. 21.

FIG. 22 shows the next step. In this step, first, the first gap layer 19 is formed over the entire top surface of the stack. The first gap layer 19 is then selectively etched by, for example, IBE, so that a portion of the top surface of the main pole 15, portions of the top surfaces of the side shields 16C and 16D, and the top surfaces of the respective fourth portions of the third and fourth connecting portions 83 and 84 are exposed. Next, the insulating layer 75 is formed on a portion of the first gap layer 19. Then, the first shield 16A is formed over the side shields 16C and 16D, the first gap layer 19 and the insulating layer 75, and the magnetic layer 41 is formed on the main pole 15. Next, the insulating film 61 is formed over the entire top surface of the stack. The insulating film 61 is then selectively etched to form therein two openings for exposing the top surfaces of the respective fourth portions of the third and fourth connecting portions 83 and 84. Next, a conductive layer 14P, which later becomes the line-shaped portion 14 of the first coil 10, is formed over the insulating film 61 and the respective fourth portions of the third and fourth connecting portions 83 and 84. The conductive layer 14P is formed such that its top surface is higher in level than the top surfaces of portions of the insulating film 61 lying on the first shield 16A and the magnetic layer 41.

Figure 23:
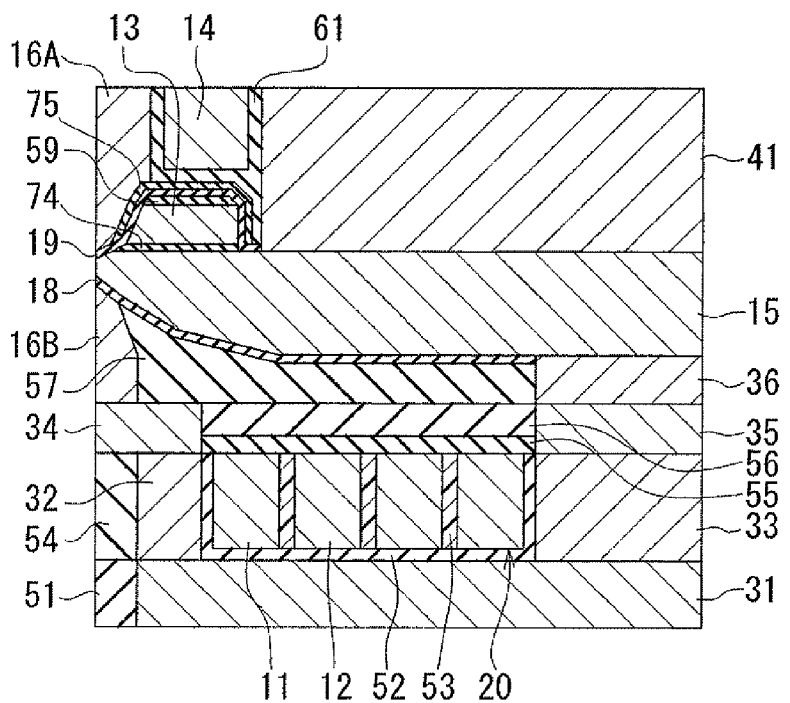
FIG. 23 is a cross-sectional view showing a step that follows the step shown in FIG. 22.

FIG. 23 shows the next step. In this step, first, the non-illustrated second nonmagnetic layer is formed over the entire top surface of the stack. The second nonmagnetic layer, the conductive layer 14P and the insulating film 61 are then polished by, for example, CMP, until the first shield 16A and the magnetic layer 41 are exposed. This makes the conductive layer 14P into the line-shaped portion 14.

Figure 24:
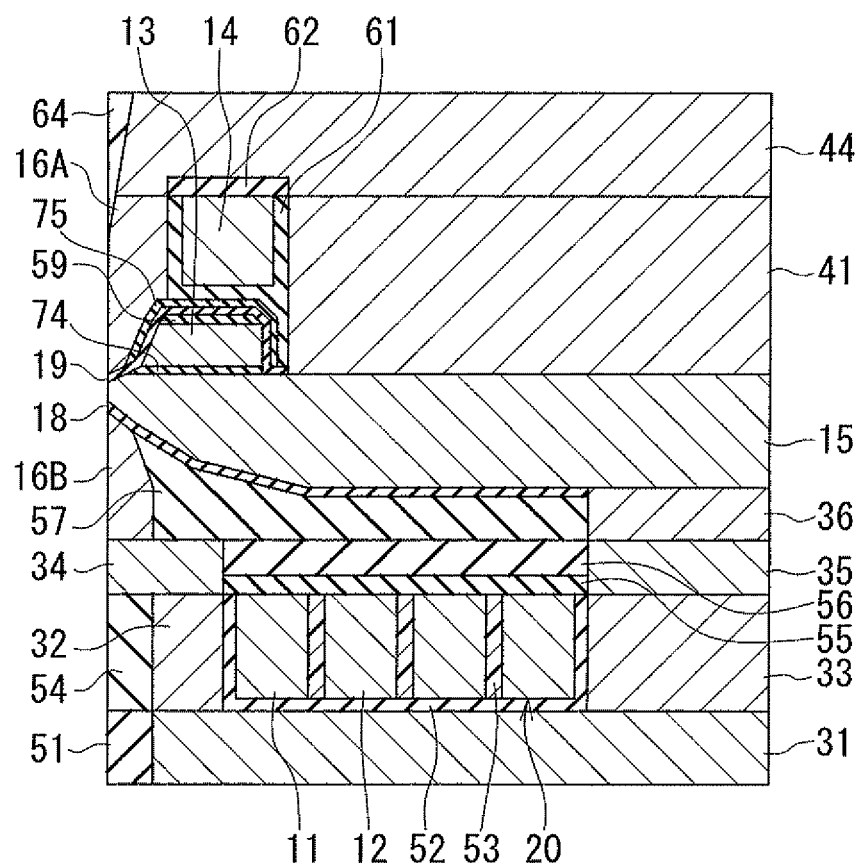
FIG. 24 is a cross-sectional view showing a step that follows the step shown in FIG. 23.

FIG. 24 shows the next step. In this step, first, the insulating layer 62 is formed over the entire top surface of the stack. The insulating layer 62 is then selectively etched to form therein two openings for exposing the top surfaces of the first shield 16A and the magnetic layer 41. Next, the magnetic layer 44 is formed over the first shield 16A, the magnetic layer 41 and the insulating layer 62. The first shield 16A and the magnetic layer 44 are then etched by, for example, RIE or IBE so as to provide the first shield 16A with the connecting surface described in the first embodiment section and provide the magnetic layer 44 with the end face described in the first embodiment section. Next, the nonmagnetic layer 64 is formed over the entire top surface of the stack. The nonmagnetic layer 64 is then polished by, for example, CMP, until the magnetic layer 44 is exposed. The subsequent steps are the same as those in the first embodiment.

The remainder of configuration, function and effects of the present embodiment are similar to those of the first embodiment.

Third Embodiment

Figure 25:
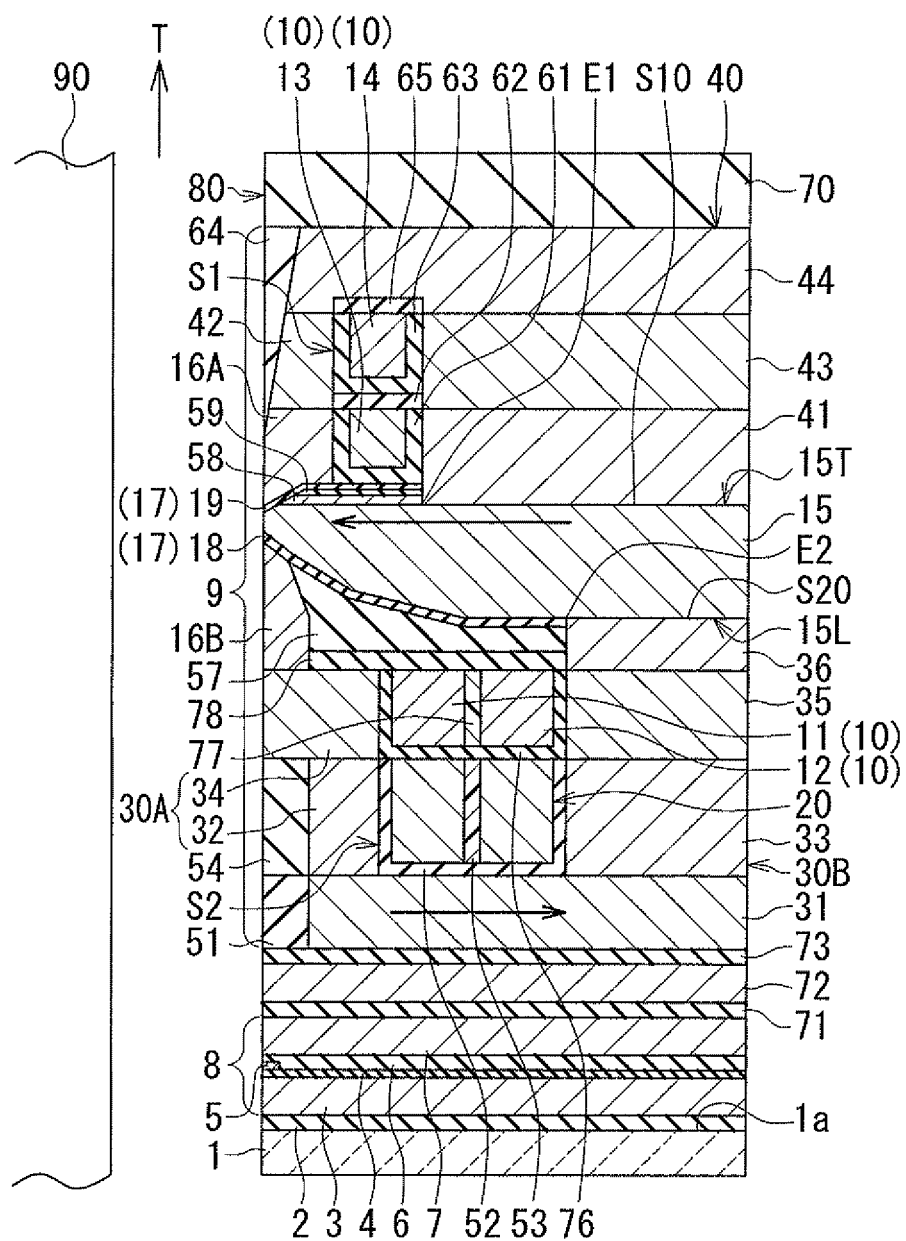
FIG. 25 is a cross-sectional view of a magnetic head according to a third embodiment of the invention.
Figure 26:
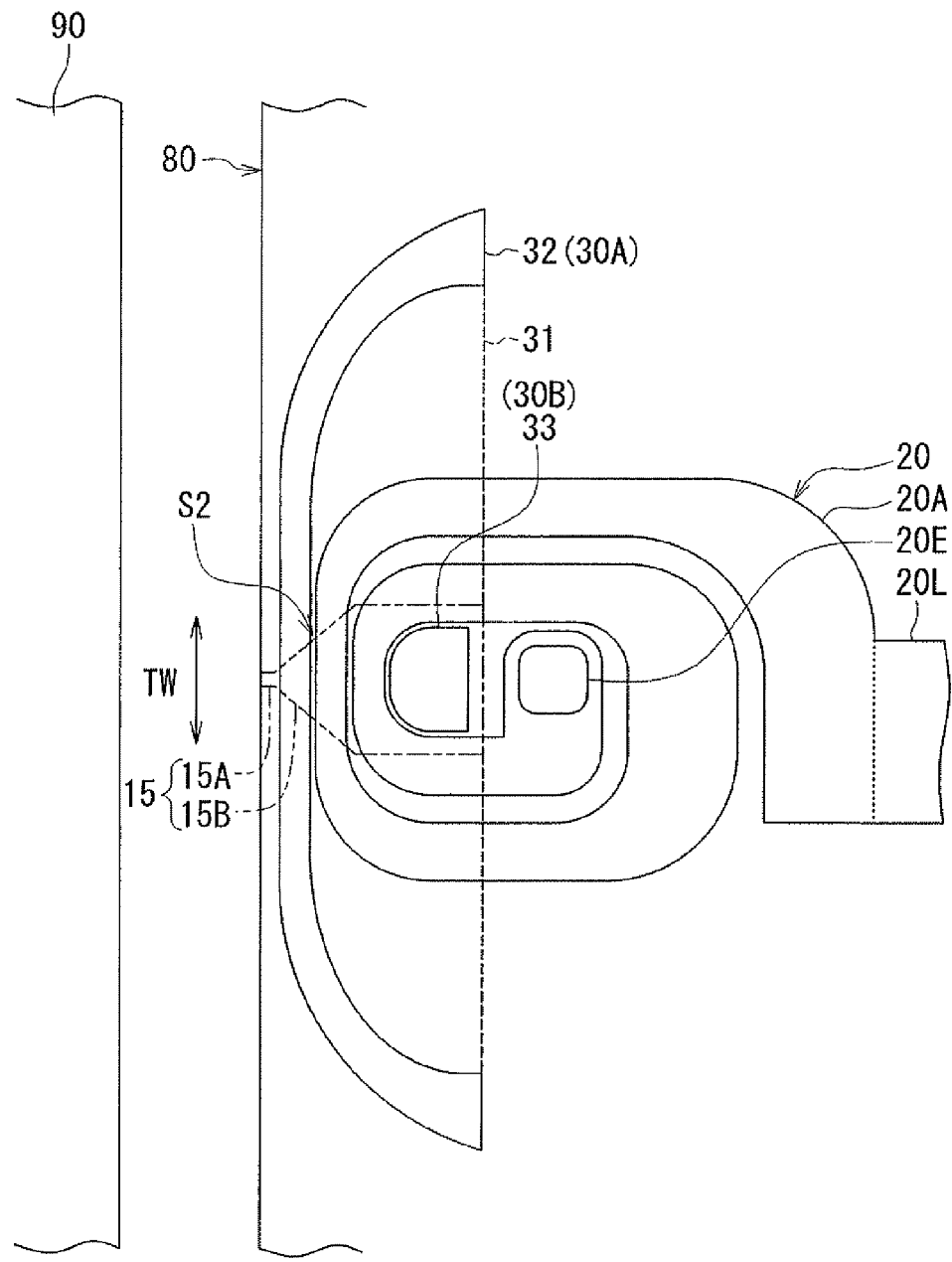
FIG. 26 is a plan view showing coil portions of the magnetic head according to the third embodiment of the invention.
Figure 27:
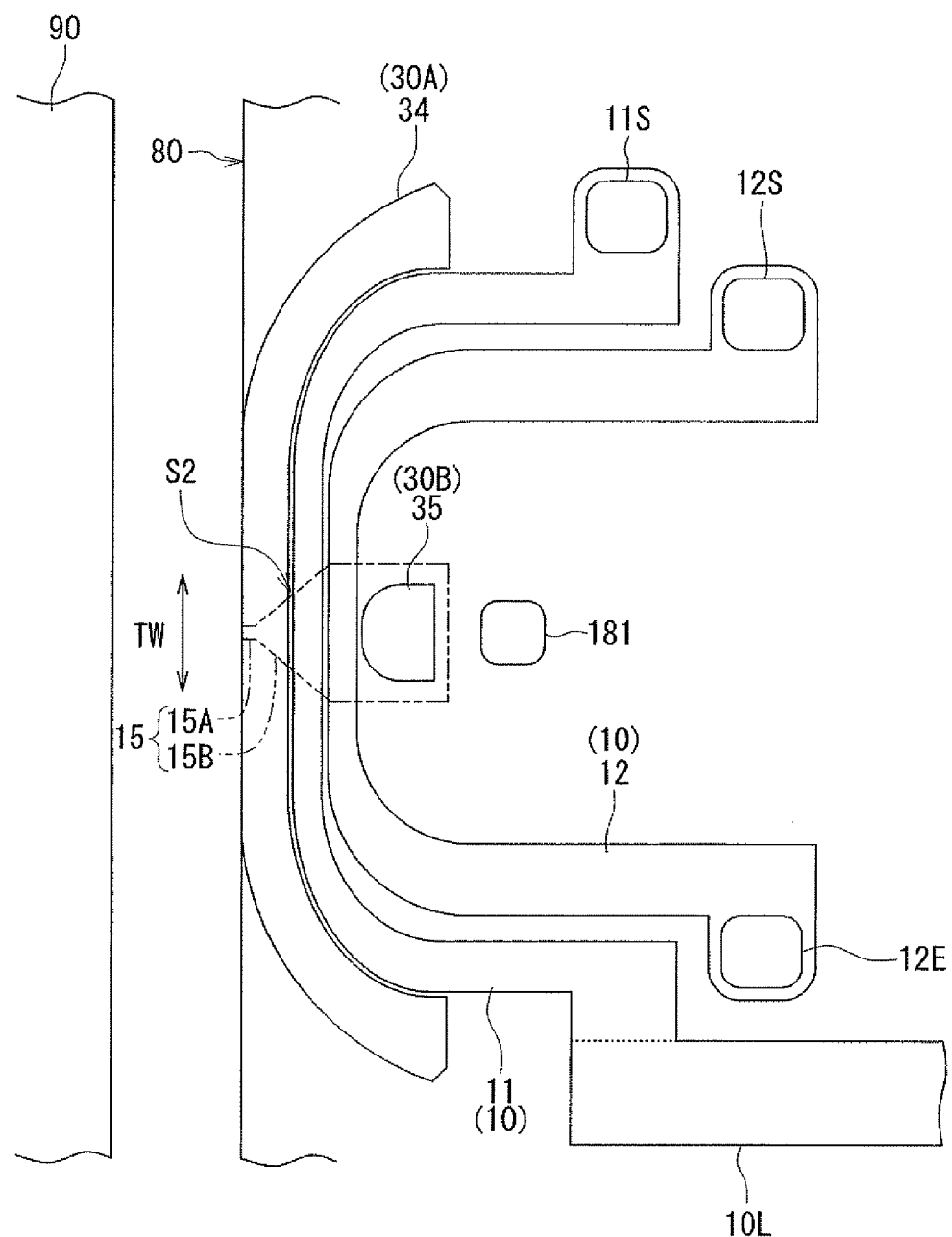
FIG. 27 is a plan view showing other coil portions of the magnetic head according to the third embodiment of the invention.

A magnetic head according to a third embodiment of the invention will now be described with reference to FIG. 25 to FIG. 27. FIG. 25 is a cross-sectional view of the magnetic head according to the present embodiment. FIG. 26 is a plan view showing coil portions of the magnetic head according to the present embodiment. FIG. 27 is a plan view showing other coil portions of the magnetic head according to the present embodiment. In FIG. 27, the reference numeral 181 indicates the first connecting portion that has been described but has not been illustrated in the first embodiment section.

The configuration of the magnetic head according to the present embodiment differs from the first embodiment in the following ways. In the present embodiment, as shown in FIG. 25 to FIG. 27, the line-shaped portions 11 and 12 of the first coil 10 are located between the magnetic layer 34 and the magnetic layer 35, not between the magnetic layer 32 and the second coil 20. The magnetic layer 34 corresponds to the coupling layer of the present invention. Specifically, the magnetic layer 34 is in contact with the write shield 16 (the second shield 16B). Further, the magnetic layer 34 has an end face located in the medium facing surface 80. The first coil 10 passes between the magnetic layer 34 or the coupling layer and the second coupling portion 30B (the magnetic layer 35).

In the present embodiment, as shown in FIG. 25 and FIG. 26, the second coil 20, the second coupling portion 30B (the magnetic layers 33, 35 and 36), the second interface S20 formed between the second coupling portion 30B (the magnetic layer 36) and the main pole 15, and the second end E2 of the second interface S20 are located closer to the medium facing surface 80 than in the example in the first embodiment illustrated in FIG. 1 and FIG. 3. In the second space S2, the first coil 10 passes between the second coil 20 and the main pole 15. In the present embodiment, in particular, the first coil 10 is thinner than the second coil 20 in the second space S2.

The magnetic head according to the present embodiment includes an insulating film 76 formed of an insulating material and isolating the line-shaped portions 11 and 12 from the second coil 20, the magnetic layers 34 and 35 and the insulating layer 53, and an insulating layer 77 formed of an insulating material and disposed between the line-shaped portion 11 and the line-shaped portion 12. The insulating layer 56 (see FIG. 1) is disposed around the line-shaped portions 11 and 12 and the magnetic layer 34. The top surfaces of the line-shaped portions 11 and 12, the magnetic layers 34 and 35, the insulating layers 56 and 77, and the insulating film 76 are even with each other. The insulating film 76 is formed of alumina, for example. The insulating layer 77 is formed of a photoresist, for example. The insulating layer 55 is not provided in the present embodiment.

The magnetic head further includes an insulating layer 78 formed of an insulating material. The insulating layer 78 is disposed over the top surfaces of the line-shaped portions 11 and 12, the insulating layers 56 and 77 and the insulating film 76 and part of the top surface of the magnetic layer 34, and surrounds the second shield 16B and the magnetic layer 36.

The insulating layer 78 is formed of alumina, for example. The nonmagnetic layer 57 lies on the insulating layer 78.

The effects of the present embodiment will now be described. A portion of a magnetic flux captured by the write shield 16 flows back to the main pole 15 through the return path section 40 (the magnetic layers 41 to 44), and another portion of the magnetic flux flows back to the main pole 15 through the second return path section (the yoke 31, the first coupling portion 30A and the second coupling portion 30B). If the second return path section is extremely longer than the return path section 40, changes in the direction of the magnetic flux passing through the second return path section may become unable to follow the write signals, so that it may become difficult to increase the frequency of write signals and/or it may become impossible to sufficiently control the occurrence of unwanted erasure.

In the present embodiment, the first coil 10 passes between the magnetic layer 34 or the coupling layer and the second coupling portion 30B (the magnetic layer 35). The present embodiment thus allows the portion of the first coil 10 passing through the second space S2 to be located closer to the main pole 15 than in the first embodiment. Further, in the present embodiment, the first coil 10 passes between the second coil 20 and the main pole 15 in the second space S2. In the second space S2, the first coil 10 is thinner than the second coil 20. The foregoing features of the present embodiment allows for making the second space S2 smaller and thereby making the second return path section shorter than in the first embodiment. The present embodiment thus makes it possible to effectively achieve higher frequencies of write signals and prevention of unwanted erasure without causing the second return path section to be extremely longer than the return path section 40.

In the present embodiment, the first coil 10 passes between the second coil 20 and the main pole 15 in the second space S2. However, since the first coil 10 is thinner than the second coil 20 in the second space S2, it is possible to prevent an excessive increase in the distance between the read head unit 8 and the main pole 15. When comparison is made for the same number of turns, the first coil 10 wound helically around the main pole 15 can be smaller in entire length than the second coil 20. It is thus possible to make the first coil 10 thinner than the second coil 20 without much increasing its resistance.

The remainder of configuration, function and effects of the present embodiment are similar to those of the first embodiment.

Fourth Embodiment

Figure 28:
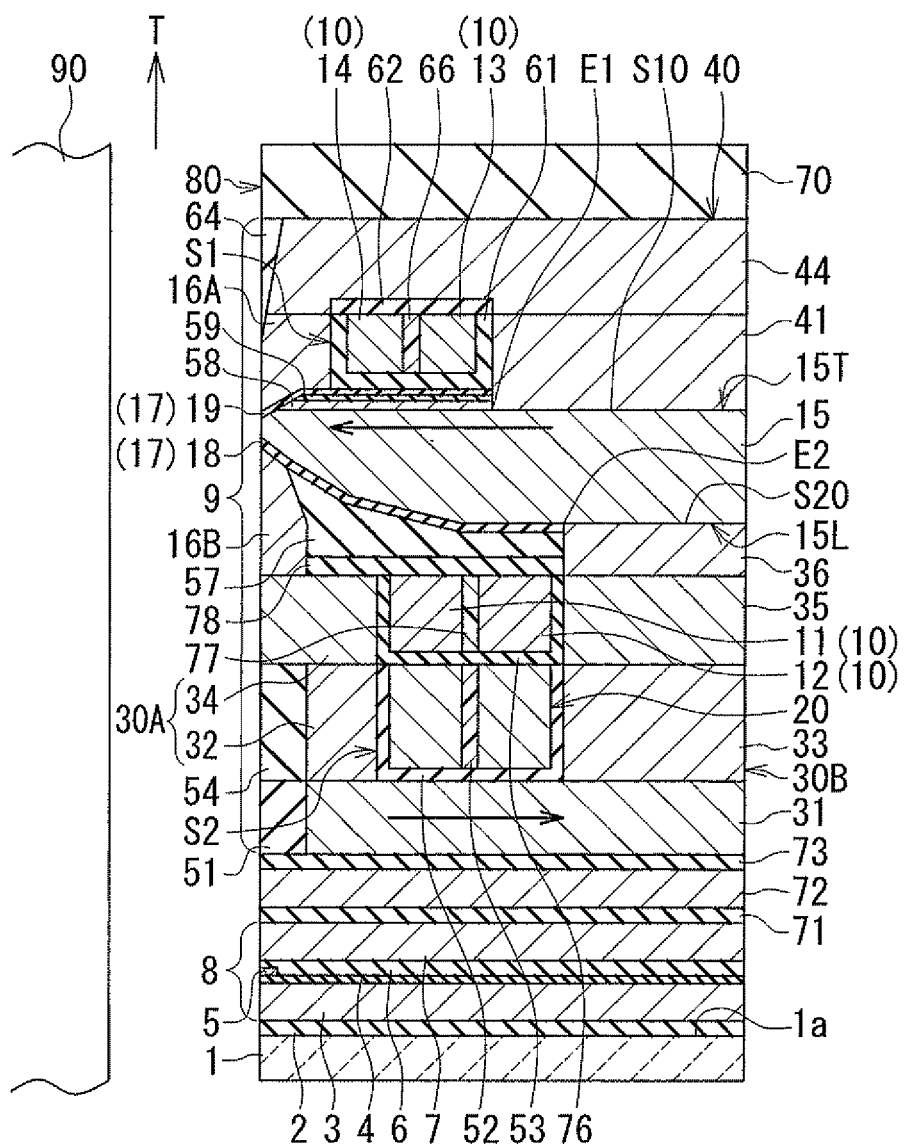
FIG. 28 is a cross-sectional view of a magnetic head according to a fourth embodiment of the invention.
Figure 29:
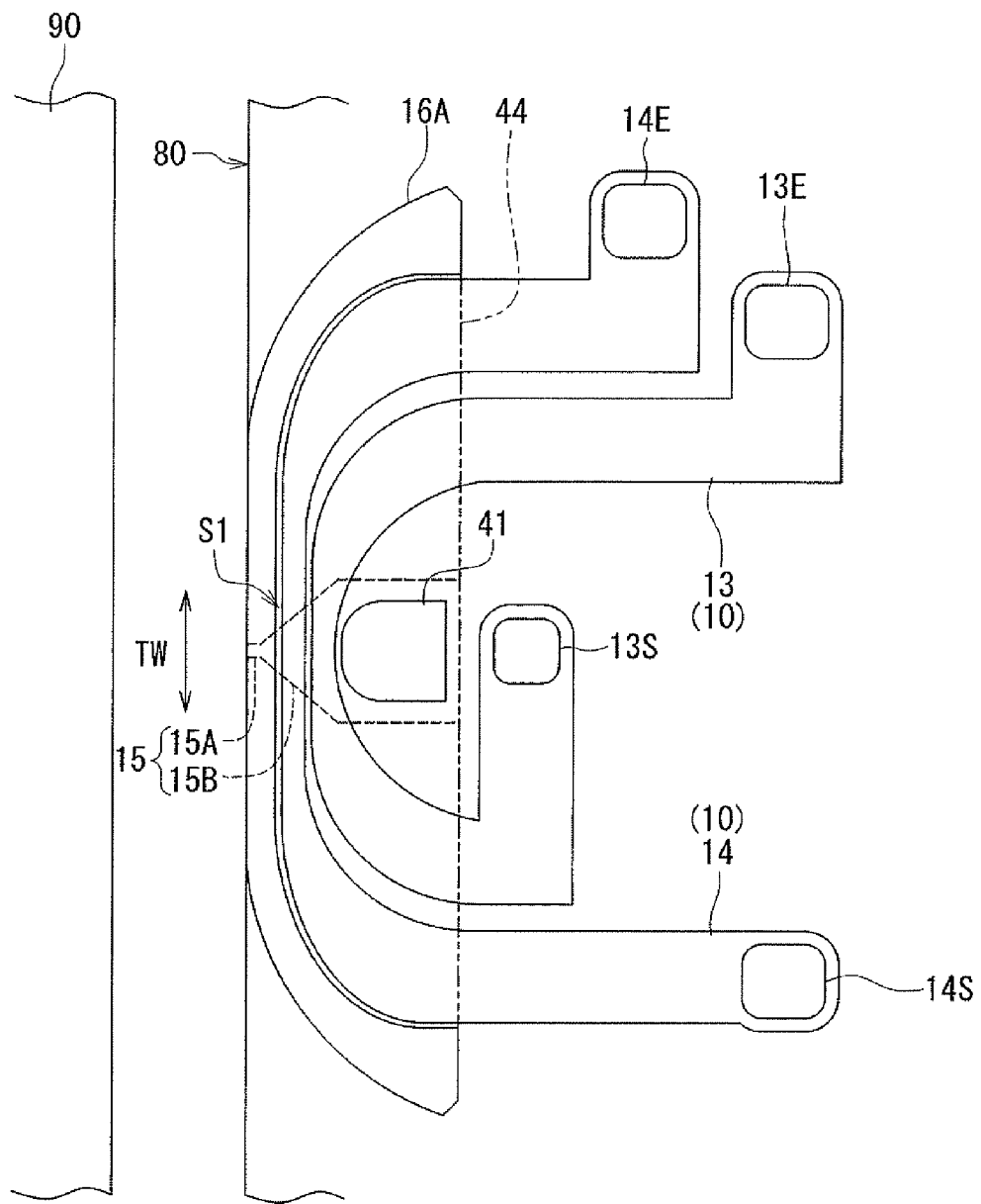
FIG. 29 is a plan view showing coil portions of the magnetic head according to the fourth embodiment of the invention.

Reference is now made to FIG. 28 and FIG. 29 to describe differences of a magnetic head according to a fourth embodiment of the invention from the magnetic head according to the third embodiment. FIG. 28 is a cross-sectional view of the magnetic head according to the present embodiment. FIG. 29 is a plan view showing coil portions of the magnetic head according to the present embodiment.

The configuration of the magnetic head according to the present embodiment differs from the third embodiment in the following ways. In the present embodiment, there are not provided the magnetic layers 42 and 43, the insulating film 63, the insulating layer 65, and the non-illustrated third nonmagnetic layer described in the first embodiment section. The magnetic layer 44 is disposed over the first shield 16A, the magnetic layer 41 and the insulating layer 62, and connects the first shield 16A and the magnetic layer 41 to each other. In the present embodiment, as shown in FIG. 28 and FIG. 29, both the line-shaped portions 13 and 14 of the first coil 10 are located between the first shield 16A and the magnetic layer 41. The line-shaped portions 13 and 14 are arranged in the direction perpendicular to the medium facing surface 80, the line-shaped portion 14 being closer to the medium facing surface 80 than the line-shaped portion 13. Each of the line-shaped portions 13 and 14 includes a portion that extends to pass between the first shield 16A and the magnetic layer 41, in particular, within the first space S1.

The magnetic head according to the present embodiment includes an insulating layer 66 formed of an insulating material and provided between the line-shaped portion 13 and the line-shaped portion 14. The insulating layer 66 is formed of a photoresist, for example. The positional relationships of the line-shaped portions 13 and 14 and the insulating layer 66 with the first shield 16A, the magnetic layer 41, the insulating film 61, the insulating layer 62, and the non-illustrated second nonmagnetic layer described in the first embodiment section are the same as those of the line-shaped portion 13 of the first embodiment.

The remainder of configuration, function and effects of the present embodiment are similar to those of the third embodiment.

Fifth Embodiment

Figure 30:
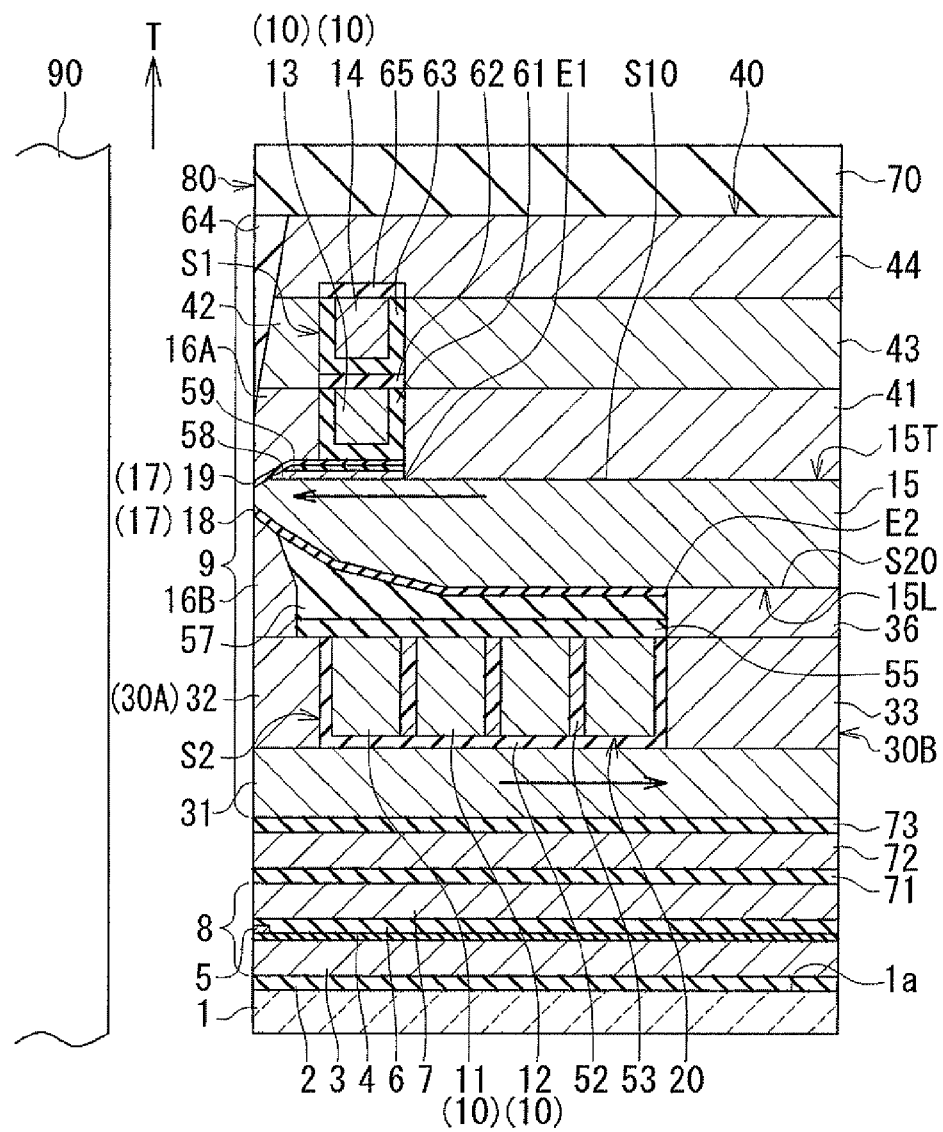
FIG. 30 is a cross-sectional view of a magnetic head according to a fifth embodiment of the invention.

Reference is now made to FIG. 30 to describe differences of a magnetic head according to a fifth embodiment of the invention from the magnetic head according to the first embodiment. FIG. 30 is a cross-sectional view of the magnetic head according to the present embodiment. In the present embodiment, there are not provided the magnetic layers 34 and 35 and the insulating layer 56. The second shield 16B lies on the magnetic layer 32. The magnetic layer 36 lies on the magnetic layer 33. The insulating layer 55 is disposed over the top surfaces of the line-shaped portions 11 and 12, the second coil 20, the insulating film 52 and the insulating layers 53 and 54 and part of the top surface of the magnetic layer 32, and surrounds the second shield 16B and the magnetic layer 36. The nonmagnetic layer 57 lies on the insulating layer 55.

In the present embodiment, the first coupling portion 30A for magnetically coupling the write shield 16 and the yoke 31 to each other is formed by the magnetic layer 32. The second coupling portion 30B for magnetically coupling the main pole 15 and the yoke 31 to each other is composed of the magnetic layers 33 and 36. The magnetic layer 32 corresponds to the coupling layer of the present invention. Specifically, the magnetic layer 32 is in contact with the write shield 16 (the second shield 16B). Further, the magnetic layer 32 has an end face located in the medium facing surface 80. The first coil 10 passes between the magnetic layer 32 or the coupling layer and the second coupling portion 30B (the magnetic layer 33).

In the present embodiment, the yoke 31 has an end face located in the medium facing surface 80. The present embodiment thus allows for more effective exertion of the function of the yoke 31, that is, the function of capturing a magnetic flux flowing in a direction opposite to the direction of a magnetic flux flowing through the main pole 15.

Further, the present embodiment allows the yoke 31 to be located closer to the main pole 15 than in the first embodiment. Consequently, like the third embodiment, the present embodiment allows for making the second space S2 smaller and thereby making the second return path section (the yoke 31, the first coupling portion 30A and the second coupling portion 30B) shorter than in the first embodiment.

The configuration of a portion of the magnetic head according to the present embodiment that is closer to the substrate 1 relative to the main pole 15 may be applied to the magnetic head according to the second embodiment. The remainder of configuration, function and effects of the present embodiment are similar to those of any of the first to third embodiments.

Sixth Embodiment

Figure 31:
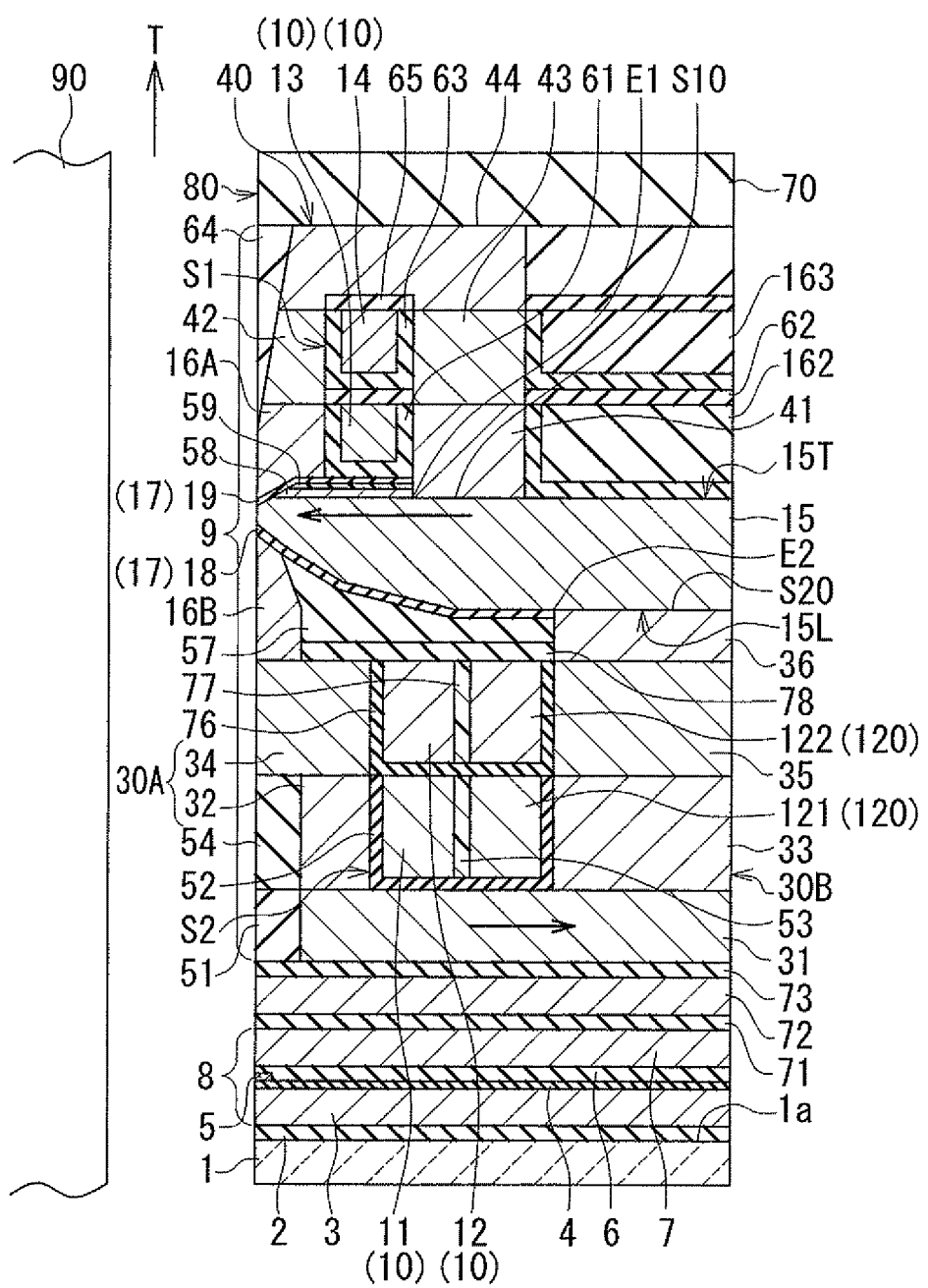
FIG. 31 is a cross-sectional view of a magnetic head according to a sixth embodiment of the invention.
Figure 32:
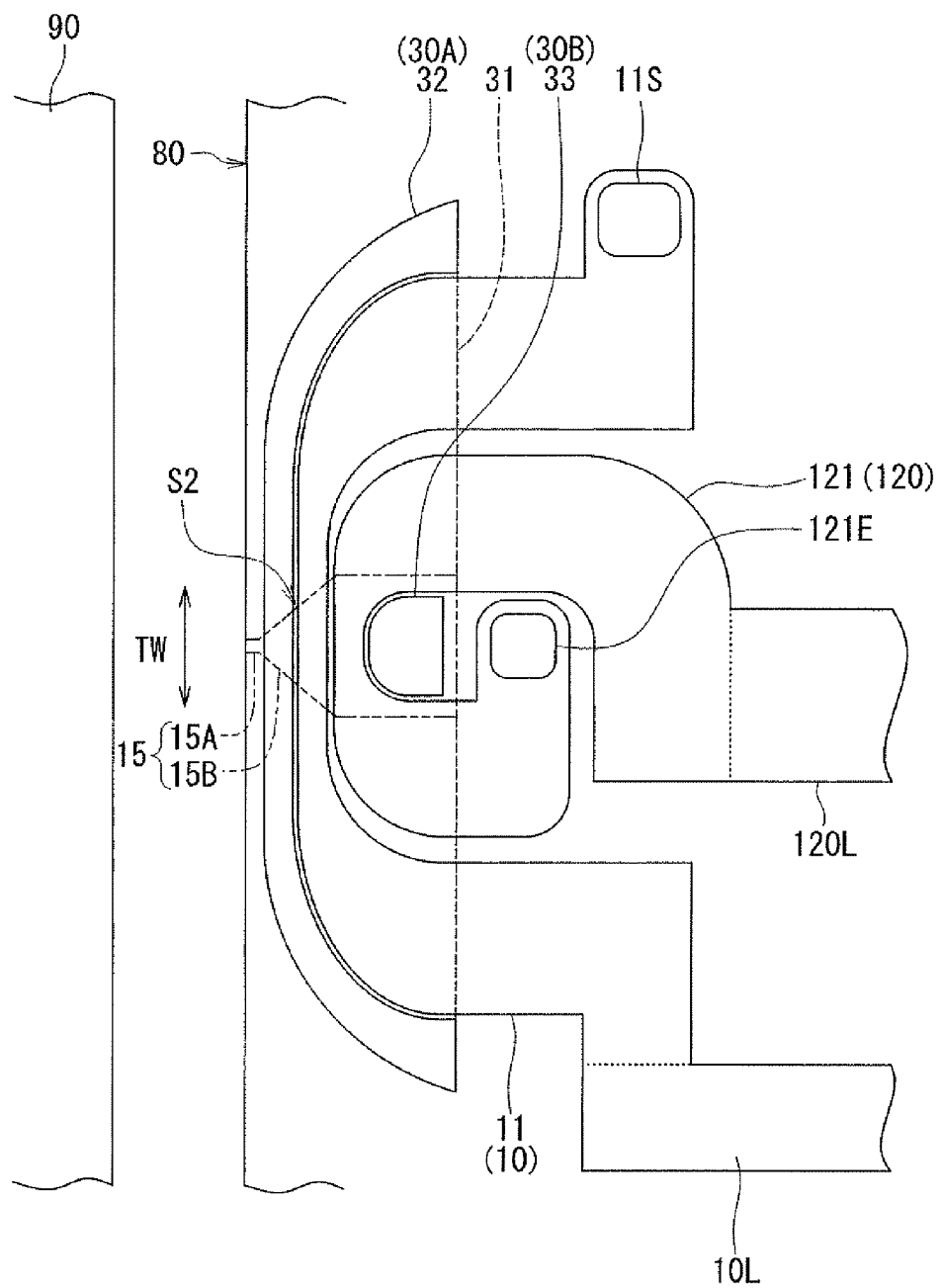
FIG. 32 is a plan view showing coil portions of the magnetic head according to the sixth embodiment of the invention.
Figure 33:
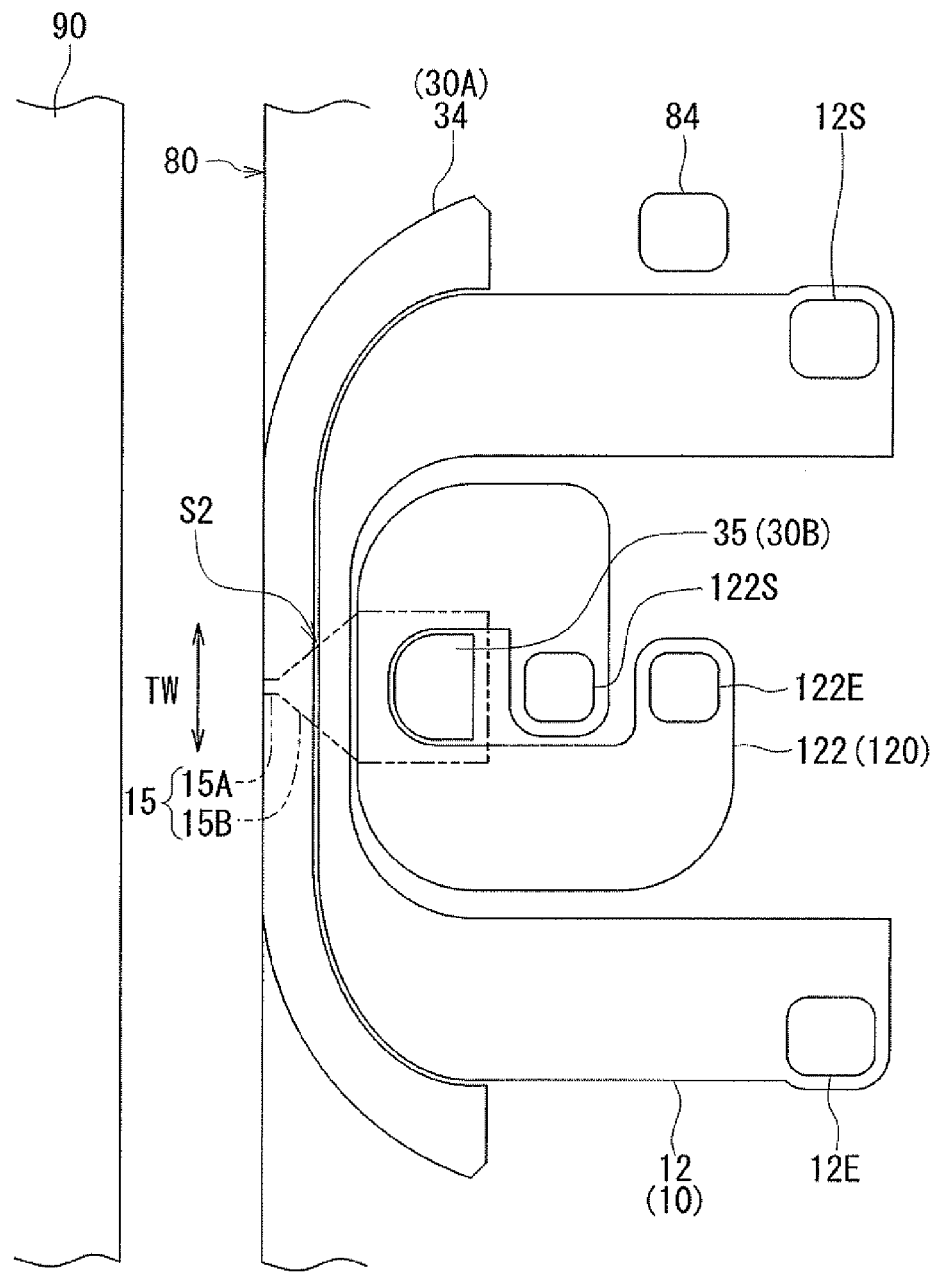
FIG. 33 is a plan view showing other coil portions of the magnetic head according to the sixth embodiment of the invention.

A magnetic head according to a sixth embodiment of the invention will now be described with reference to FIG. 31 to FIG. 33. FIG. 31 is a cross-sectional view of the magnetic head according to the present embodiment. FIG. 32 is a plan view showing coil portions of the magnetic head according to the present embodiment. FIG. 33 is a plan view showing other coil portions of the magnetic head according to the present embodiment.

The configuration of the magnetic head according to the present embodiment differs from the first embodiment in the following ways. As shown in FIG. 31, the magnetic layers 41, 43 and 44 are smaller in length in the direction perpendicular to the medium facing surface 80 when compared with the example in the first embodiment shown in FIG. 1. In FIG. 31, the reference numeral 162 indicates the second nonmagnetic layer described in the first embodiment section, and the reference numeral 163 indicates the third nonmagnetic layer described in the first embodiment section.

Further, the magnetic head according to the present embodiment has a second coil 120 in place of the second coil 20. The second coil 120 includes a first layer 121, a second layer 122, and a lead portion 120L. As shown in FIG. 32, the first layer 121 is wound around the magnetic layer 33 constituting part of the second coupling portion 30B. The line-shaped portion 11 of the first coil 10 is located between the magnetic layer 32 and the first layer 121. The insulating film 52 isolates the line-shaped portion 11 and the first layer 121 from the yoke 31 and the magnetic layers 32 and 33. The positional relationships of the line-shaped portion 11 and the first layer 121 with the magnetic layers 32 and 33, the insulating film 52 and the insulating layers 53 and 54 are the same as those of the line-shaped portions 11 and 12 of the first coil 10 and the second coil 20 of the first embodiment.

As shown in FIG. 33, the second layer 122 is wound around the magnetic layer 35 constituting part of the second coupling portion 30B. The line-shaped portion 12 of the first coil 10 is located between the magnetic layer 34 and the second layer 122. The magnetic head according to the present embodiment includes an insulating film 76 and an insulating layer 77 each formed of an insulating material. The insulating film 76 isolates the line-shaped portion 12 and the second layer 122 from the line-shaped portion 11, the first layer 121, the magnetic layers 34 and 35 and the insulating layer 53. The insulating layer 77 is located between the line-shaped portion 12 and the second layer 122. The insulating layer 56 (see FIG. 1) surrounds the magnetic layer 34, the line-shaped portion 12 and the second layer 122. The top surfaces of the line-shaped portion 12, the second layer 122, the magnetic layers 34 and 35, the insulating layers 56 and 77 and the insulating film 76 are even with each other. The insulating material used for each of the insulating film 76 and the insulating layer 77 is the same as that in the third embodiment. The insulating layer 55 is not provided in the present embodiment.

The magnetic head further includes an insulating layer 78 formed of an insulating material. The insulating layer 78 is disposed over the top surfaces of the line-shaped portion 12, the second layer 122, the insulating layers 56 and 57 and the insulating film 76 and part of the top surface of the magnetic layer 34, and surrounds the second shield 16B and the magnetic layer 36. The insulating material used for the insulating layer 78 is the same as that in the third embodiment. The nonmagnetic layer 57 lies on the insulating layer 78.

The first and second coils 10 and 120 will now be described in detail with reference to FIG. 32 and FIG. 33. FIG. 32 is a plan view showing the line-shaped portion 11 of the first coil 10 and the first layer 121 of the second coil 120. FIG. 33 is a plan view showing the line-shaped portion 12 of the first coil 10 and the second layer 122 of the second coil 120. As shown in FIG. 32, the line-shaped portion 11 includes a portion that extends to pass between the magnetic layer 32 and the magnetic layer 33, in particular, within the second space S2. As shown in FIG. 33, the line-shaped portion 12 includes a portion that extends to pass between the magnetic layer 34 and the magnetic layer 35, in particular, within the second space S2. The shapes and locations of the line-shaped portions 13 and 14 of the first coil 10 are the same as those in the example in the first embodiment illustrated in FIG. 4 and FIG. 5. As in the first embodiment, the first coil 10 is wound approximately two turns around the main pole 15 so as to pass through the first and second spaces S1 and S2. Further, as in the third embodiment, the first coil 10 passes between the magnetic layer 34 or the coupling layer and the second coupling portion 30B (the magnetic layer 35). When viewed from the medium facing surface 80, the first coil 10 is wound in a counterclockwise direction from the coil connection 13S (see FIG. 4) of the line-shaped portion 13 to the boundary between the line-shaped portion 11 and the lead portion 10L.

As shown in FIG. 32, the lead portion 120L of the second coil 120 is contiguous with the first layer 121. In FIG. 32 the boundary between the first layer 121 and the lead portion 120L is indicated by a dotted line. The first layer 121 is wound one turn around the magnetic layer 33. The first layer 121 has a coil connection 121E electrically connected to the second layer 122. When viewed from above, the first layer 121 is wound in a counterclockwise direction from the boundary between the first layer 121 and the lead portion 120L to the coil connection 121E.

As shown in FIG. 33, the second layer 122 is wound one turn around the magnetic layer 35. The second layer 122 has a coil connection 122S electrically connected to the coil connection 121E of the first layer 121, and a coil connection 122E electrically connected to the coil connection 13S of the line-shaped portion 13 of the first coil 10. When viewed from above, the second layer 122 is wound in a counterclockwise direction from the coil connection 122S to the coil connection 122E.

The coil connection 122S penetrates the insulating film 76 and is electrically connected to the coil connection 121E. The coil connection 122E is electrically connected to the coil connection 13S of the line-shaped portion 13 of the first coil 10 via the non-illustrated first connecting portion described in the first embodiment section. In the example shown in FIGS. 4, 5, 32 and 33, the first coil 10 and the second coil 120 are connected in series. The directions of magnetic fields produced by the first and second coils 10 and 120 are the same as the directions of magnetic fields produced by the first and second coils 10 and 20 described in the first embodiment section.

As in the fifth embodiment, each of the yoke 31 and the magnetic layer 32 may have an end face located in the medium facing surface 80. The remainder of configuration, function and effects of the present embodiment are similar to those of the first or fifth embodiment.

Seventh Embodiment

Figure 34:
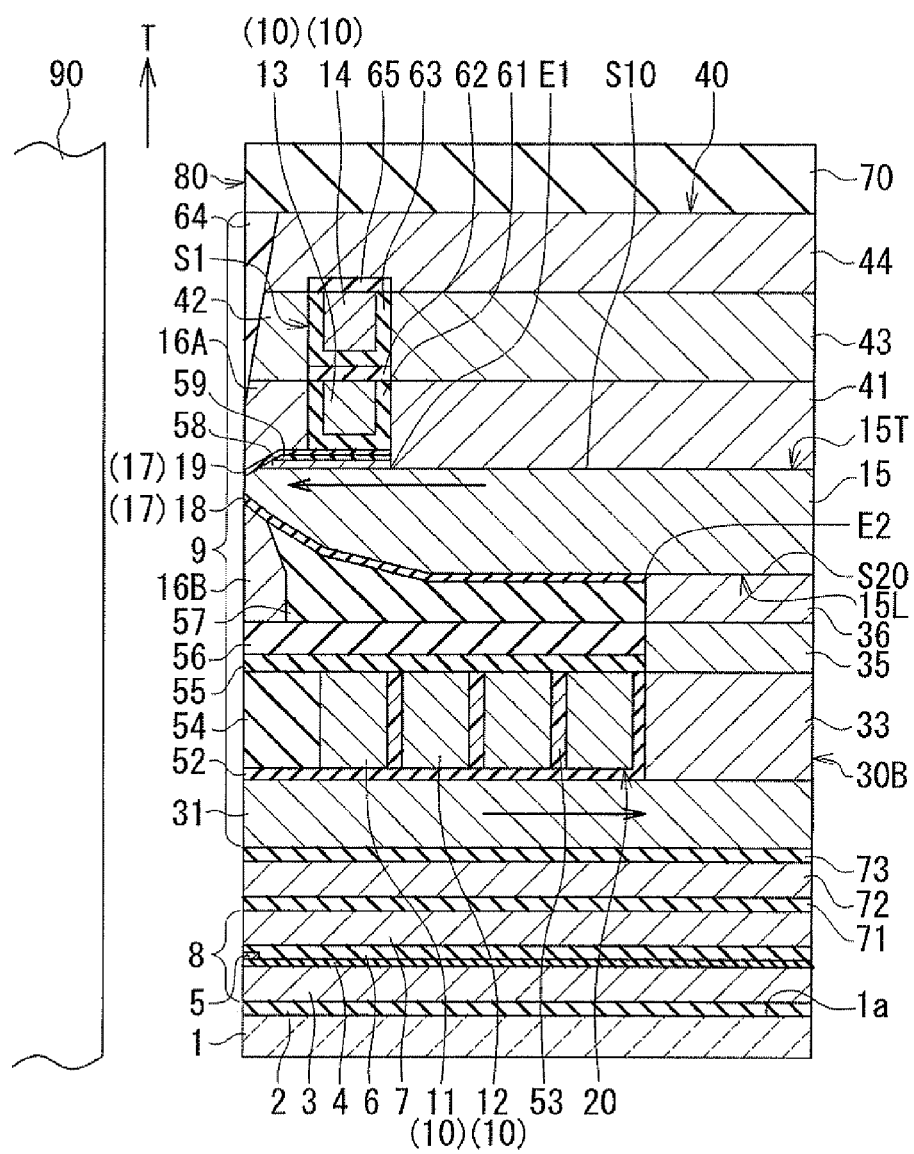
FIG. 34 is a cross-sectional view of a magnetic head according to a seventh embodiment of the invention.

Reference is now made to FIG. 34 to describe differences of a magnetic head according to a seventh embodiment of the invention from the magnetic head according to the first embodiment. FIG. 34 is a cross-sectional view of the magnetic head according to the present embodiment. In the present embodiment, there are not provided the magnetic layers 32 and 34, and thus there is not the first coupling portion 30A composed of the magnetic layers 32 and 34.

Further, in the present embodiment, the yoke 31 has an end face located in the medium facing surface 80. The present embodiment thus allows for more effective exertion of the function of the yoke 31, that is, the function of capturing a magnetic flux flowing in a direction opposite to the direction of a magnetic flux flowing through the main pole 15.

The remainder of configuration, function and effects of the present embodiment are similar to those of the first embodiment.

Eighth Embodiment

Figure 35:
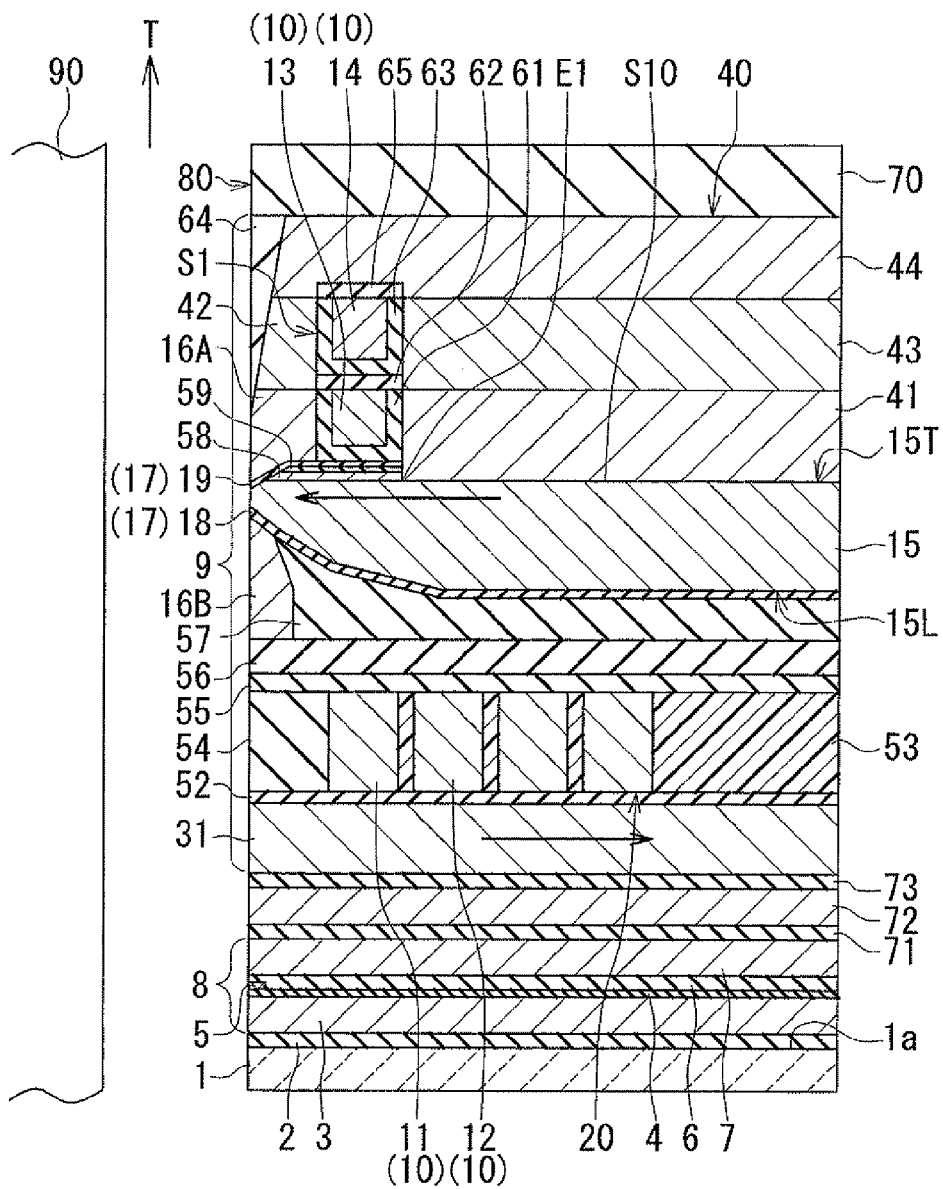
FIG. 35 is a cross-sectional view of a magnetic head according to an eighth embodiment of the invention.

Reference is now made to FIG. 35 to describe differences of a magnetic head according to an eighth embodiment of the invention from the magnetic head according to the seventh embodiment. FIG. 35 is a cross-sectional view of the magnetic head according to the present embodiment. In the present embodiment, there are not provided the magnetic layers 33, 35 and 36, and thus there is not the second coupling portion 30B composed of the magnetic layers 33, 35 and 36. The remainder of configuration, function and effects of the present embodiment are similar to those of the seventh embodiment.

Ninth Embodiment

Figure 36:
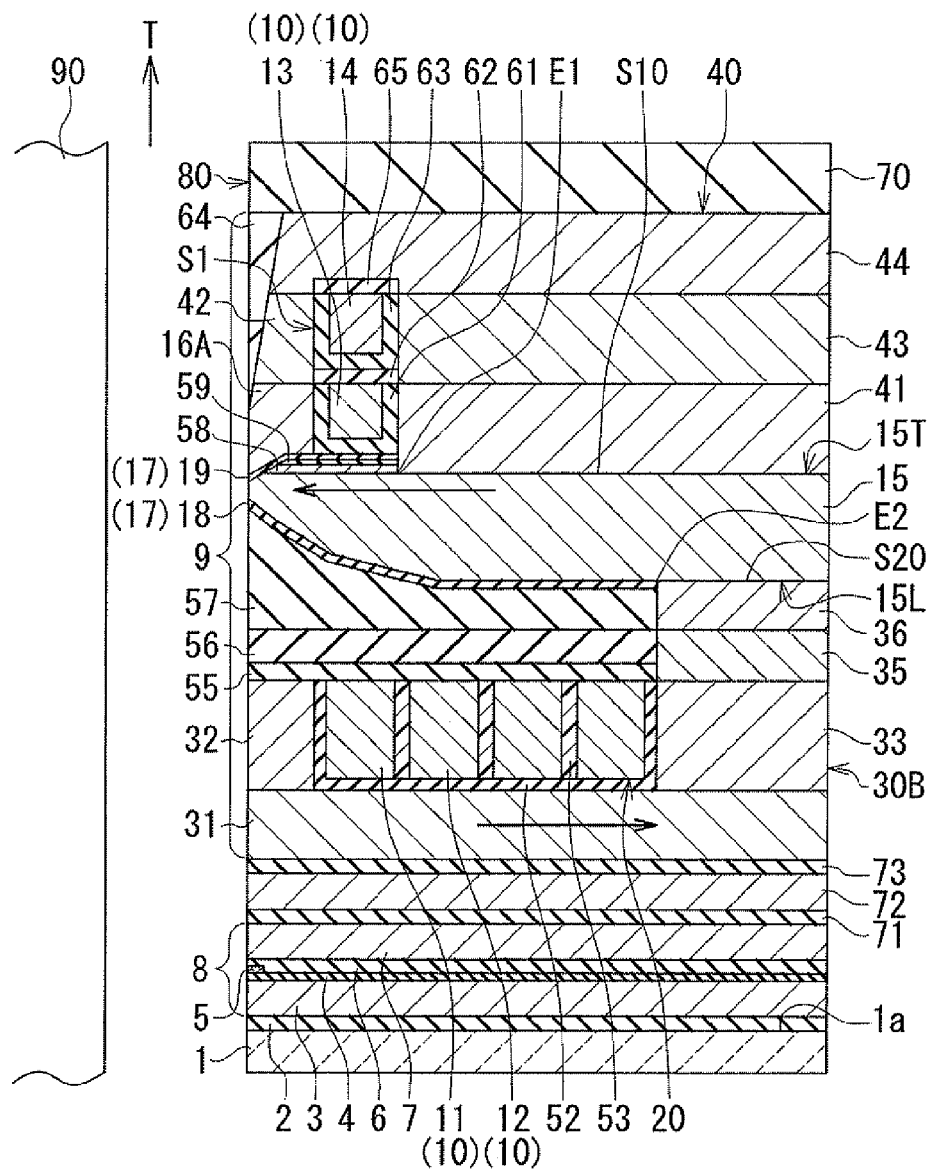
FIG. 36 is a cross-sectional view of a magnetic head according to a ninth embodiment of the invention.

Reference is now made to FIG. 36 to describe differences of a magnetic head according to a ninth embodiment of the invention from the magnetic head according to the first embodiment. FIG. 36 is a cross-sectional view of the magnetic head according to the present embodiment. In the present embodiment, there are not provided the second shield 16B and the magnetic layer 34, and there is not the first coupling portion 30A composed of the magnetic layers 32 and 34.

Further, in the present embodiment, the yoke 31 has an end face located in the medium facing surface 80. The present embodiment thus allows for more effective exertion of the function of the yoke 31, that is, the function of capturing a magnetic flux flowing in a direction opposite to the direction of a magnetic flux flowing through the main pole 15. Further, the magnetic layer 32 has an end face located in the medium facing surface 80. The end face of the magnetic layer 32 is located on the rear side in the direction T of travel of the recording medium 90 relative to the end face of the main pole 15. The yoke 31 is magnetically connected to the magnetic layer 32. In the present embodiment, the magnetic layer 32 allows for more effective exertion of the above-described function of the yoke 31.

The remainder of configuration, function and effects of the present embodiment are similar to those of the first embodiment.

Tenth Embodiment

Figure 37:
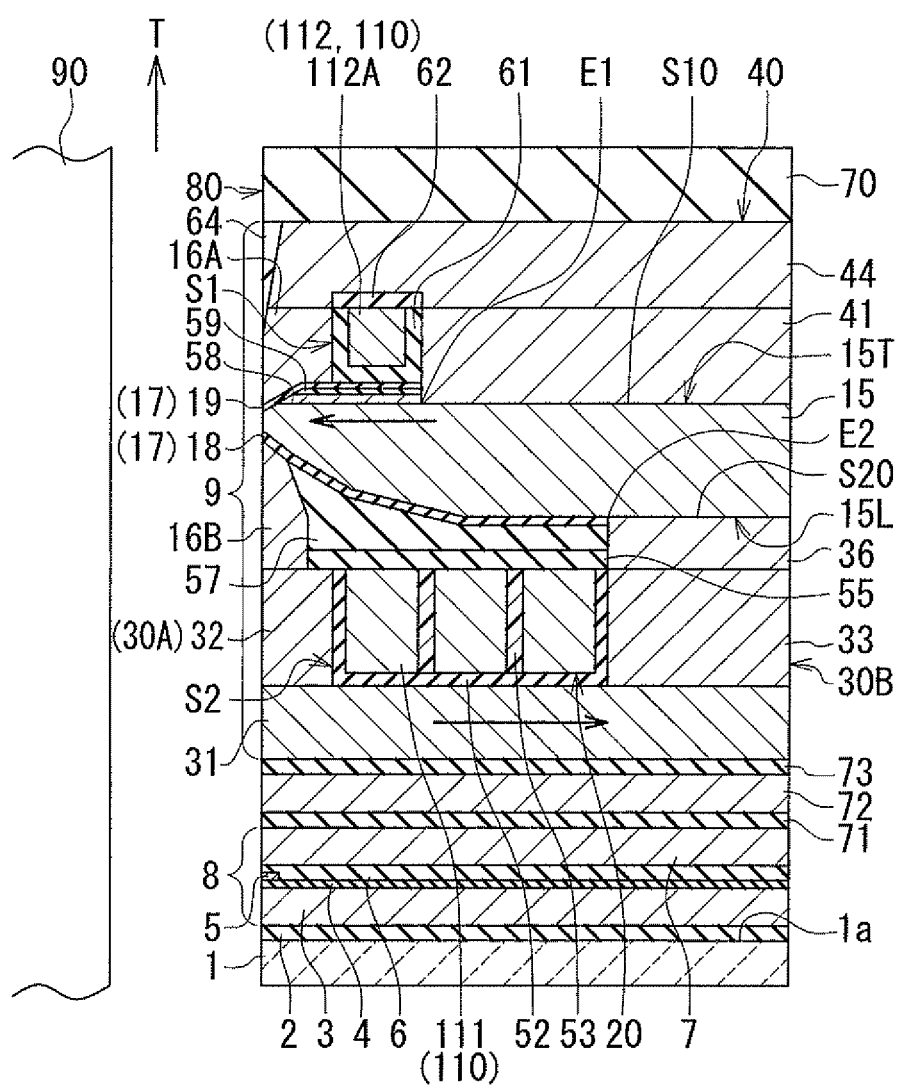
FIG. 37 is a cross-sectional view of a magnetic head according to a tenth embodiment of the invention.
Figure 38:
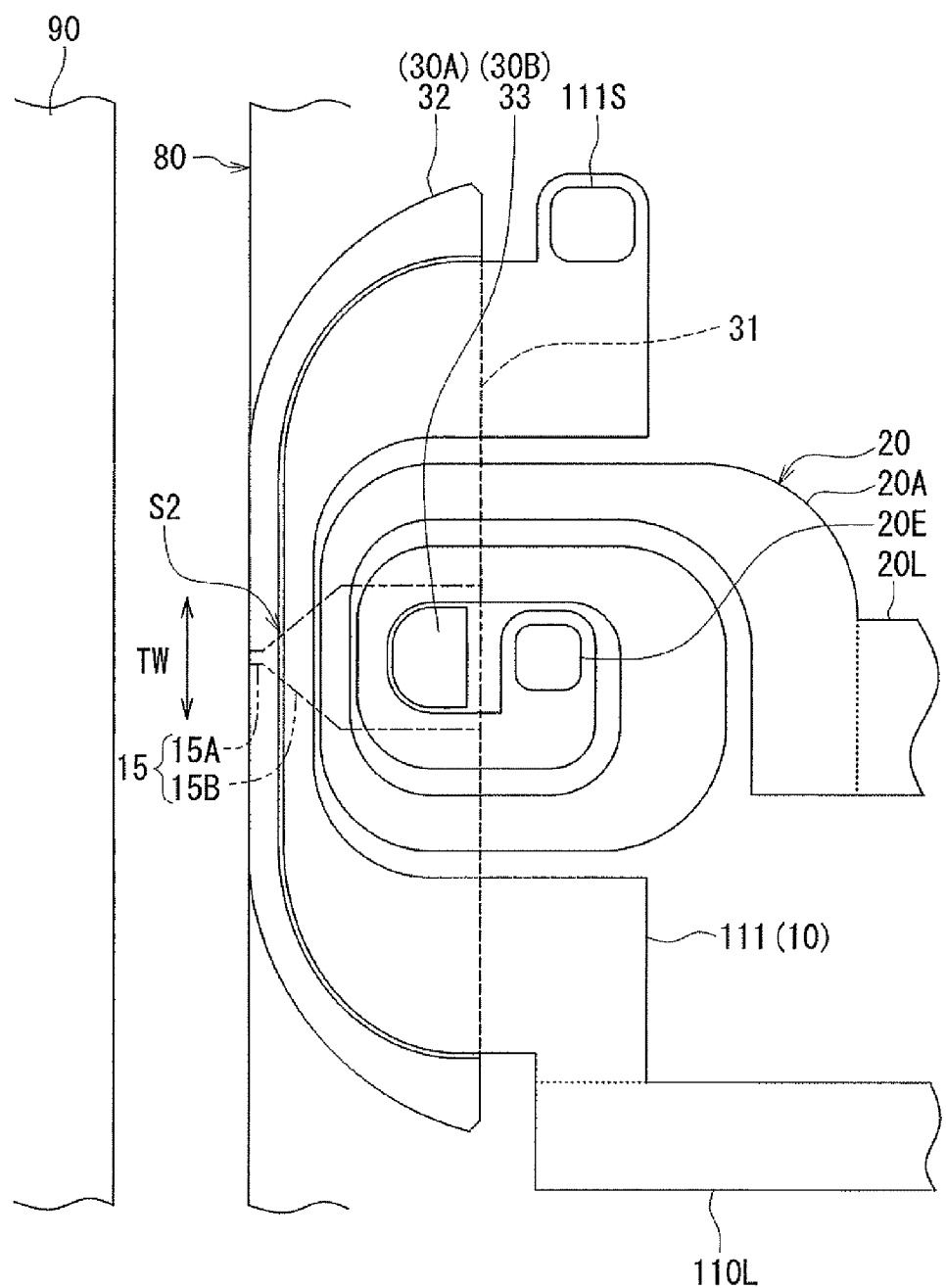
FIG. 38 is a plan view showing coil portions of the magnetic head according to the tenth embodiment of the invention.
Figure 39:
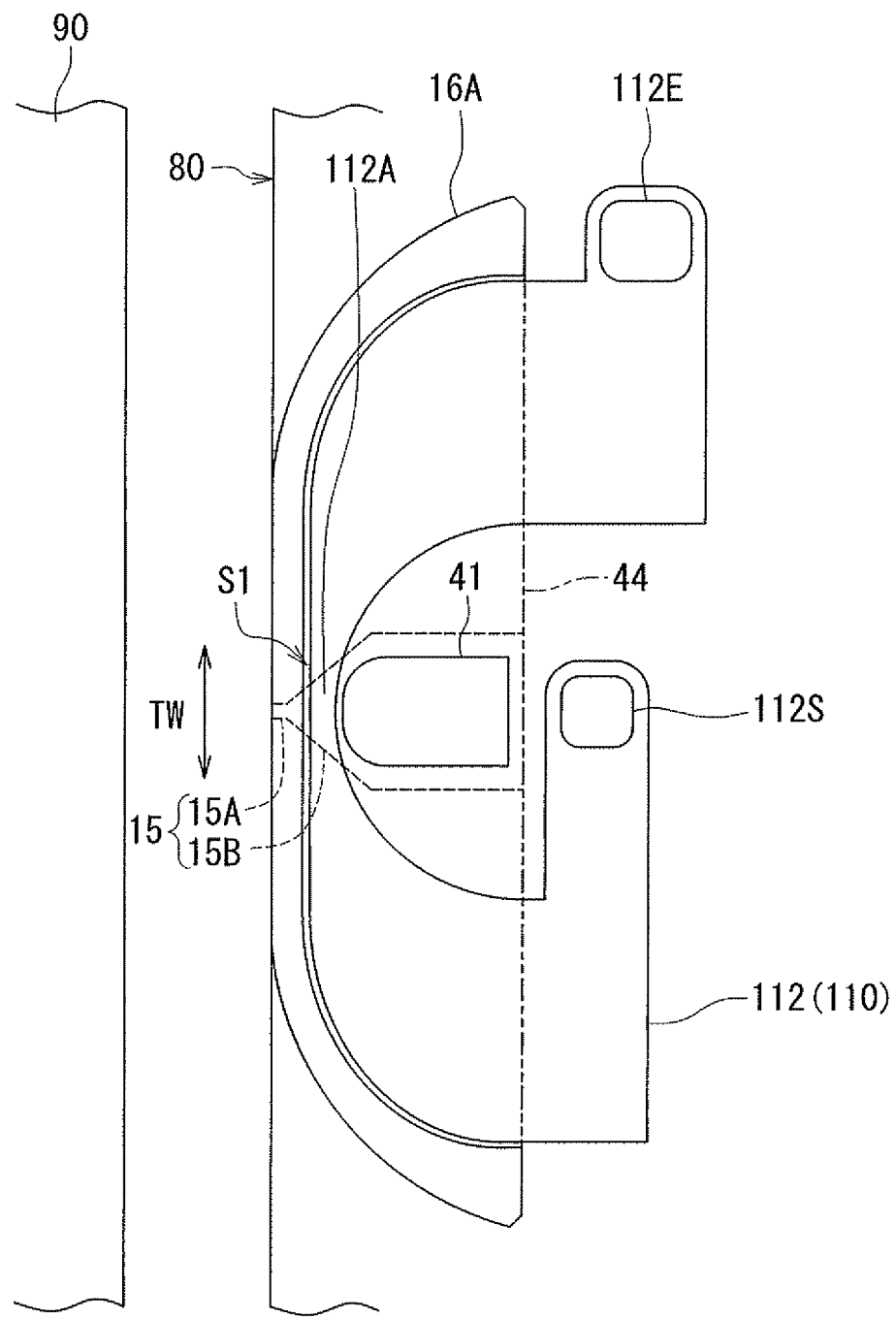
FIG. 39 is a plan view showing another coil portion of the magnetic head according to the tenth embodiment of the invention.

A magnetic head according to a tenth embodiment of the invention will now be described with reference to FIG. 37 to FIG. 39. FIG. 37 is a cross-sectional view of the magnetic head according to the present embodiment. FIG. 38 is a plan view showing coil portions of the magnetic head according to the present embodiment. FIG. 39 is a plan view showing another coil portion of the magnetic head according to the present embodiment.

The configuration of the magnetic head according to the present embodiment differs from the fifth embodiment in the following ways. The magnetic head according to the present embodiment has a first coil 110 in place of the first coil 10. The first coil 110 is wound approximately one turn around the main pole 15 so as to pass through the first and second spaces S1 and S2. As in the fifth embodiment, the first coil 110 passes between the magnetic layer 32 or the coupling layer and the second coupling portion 30B (the magnetic layer 33).

The first coil 110 includes line-shaped portions 111 and 112, first and second connecting portions (not illustrated), and a lead portion 110L. As shown in FIG. 38, the line-shaped portion 111 is located between the magnetic layer 32 and the second coil 20. The positional relationships of the line-shaped portion 111 with the second coil 20, the magnetic layers 32 and 33, the insulating film 52, the insulating layers 53 and 55, and the insulating layer 54 (see FIG. 1) described in the first embodiment section are the same as those of the line-shaped portions 11 and 12 of the fifth embodiment.

As shown in FIG. 37 and FIG. 39, the line-shaped portion 112 is located between the first shield 16A and the magnetic layer 41. The positional relationships of the line-shaped portion 112 with the first shield 16A, the magnetic layer 41, the insulating film 61, the insulating layer 62, and the non-illustrated second nonmagnetic layer described in the first embodiment section are the same as those of the line-shaped portion 13 of the fifth embodiment (the first embodiment).

In the present embodiment, there are not provided the magnetic layers 42 and 43, the insulating film 63, the insulating layer 65 and the non-illustrated third nonmagnetic layer. The magnetic layer 44 is disposed over the first shield 16A, the magnetic layer 41 and the insulating layer 62, and connects the first shield 16A and the magnetic layer 41 to each other.

The first coil 110 will now be described in detail with reference to FIG. 37 to FIG. 39. FIG. 38 is a plan view showing the line-shaped portion 111 of the first coil 110 and the second coil 20. FIG. 39 is a plan view showing the line-shaped portion 112 of the first coil 110. As shown in FIG. 37, the line-shaped portion 111 is located on the rear side in the direction T of travel of the recording medium 90 relative to the main pole 15. The line-shaped portion 112 is located on the front side in the direction T of travel of the recording medium 90 relative to the main pole 15. As shown in FIG. 38, the line-shaped portion 111 includes a portion that extends to pass between the magnetic layer 32 and the magnetic layer 33, in particular, within the second space S2. As shown in FIG. 39, the line-shaped portion 112 includes a coil element 112A that extends to pass between the first shield 16A and the magnetic layer 41, in particular, within the first space S1. Since the line-shaped portion 112 is part of the first coil 110, the first coil 110 can be said to include the coil element 112A. No portion of the first coil 110 other than the coil element 112A is present in the first space S1.

As shown in FIG. 38, the lead portion 110L of the first coil 110 is contiguous with the line-shaped portion 111. In FIG. 38, the boundary between the line-shaped portion 111 and the lead portion 110L is indicated by a dotted line. The line-shaped portion 111 has a coil connection 111S located near an end of the line-shaped portion 111 opposite from the boundary between the line-shaped portion 111 and the lead portion 110L. As shown in FIG. 39, the line-shaped portion 112 has two coil connections 112S and 112E located near two ends of the line-shaped portion 112 that are opposite in the longitudinal direction.

The non-illustrated second connecting portion penetrates a plurality of layers interposed between the line-shaped portion 111 and the line-shaped portion 112. The second connecting portion electrically connects the line-shaped portions 111 and 112 so as to form the first coil 110 wound helically around the main pole 15. More specifically, the second connecting portion electrically connects the coil connection 112E of the line-shaped portion 112 and the coil connection 111S of the line-shaped portion 111. When viewed from the medium facing surface 80, the first coil 110 is wound in a counterclockwise direction from the coil connection 112S of the line-shaped portion 112 to the boundary between the line-shaped portion 111 and the lead portion 110L.

The non-illustrated first connecting portion penetrates a plurality of layers interposed between the second coil 20 and the line-shaped portion 112, and electrically connects the coil connection 20E of the winding portion 20A of the second coil 20 and the coil connection 112S of the line-shaped portion 112. In the example shown in FIG. 38 and FIG. 39, the first coil 110 and the second coil 20 are connected in series. The directions of magnetic fields produced by the first and second coils 110 and 20 are the same as the directions of magnetic fields produced by the first and second coils 10 and 20 described in the first embodiment section.

In the present embodiment, the first coil 110 is wound approximately one turn, which is less than the number of turns of the first coil 10 of the first embodiment. The present embodiment thus allows for making the return path section 40 smaller in length than in the first embodiment. Further, in the present embodiment, the number of turns of the second coil 20 is approximately two, being greater than the number of turns of the first coil 10. Consequently, the present embodiment makes it possible to make full use of the function of the write shield 16 while reducing the length of the return path section 40.

In the present embodiment, no portion of the first coil 110 other than the coil element 112A is present in the first space S1. This feature of the present embodiment also serves to reduce the length of the return path section 40.

The remainder of configuration, function and effects of the present embodiment are similar to those of the fifth embodiment.

Eleventh Embodiment

Figure 40:
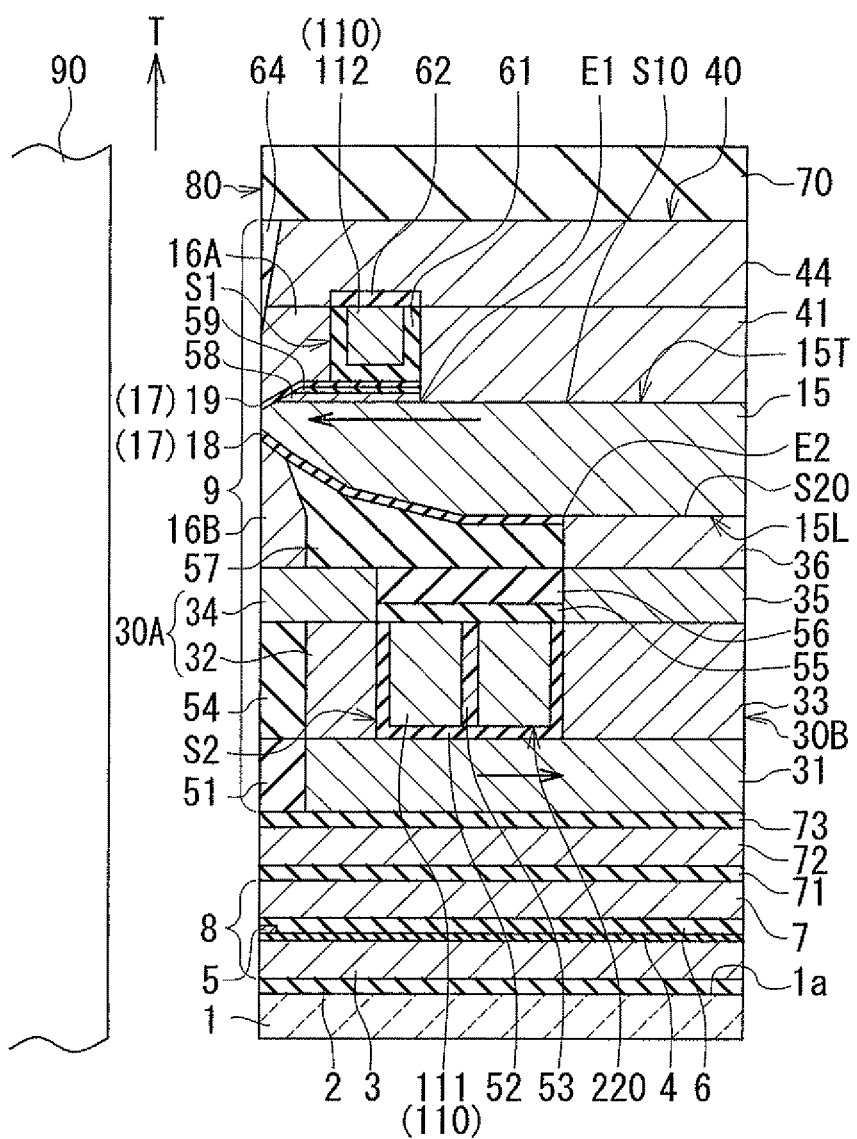
FIG. 40 is a cross-sectional view of a magnetic head according to an eleventh embodiment of the invention.
Figure 41:
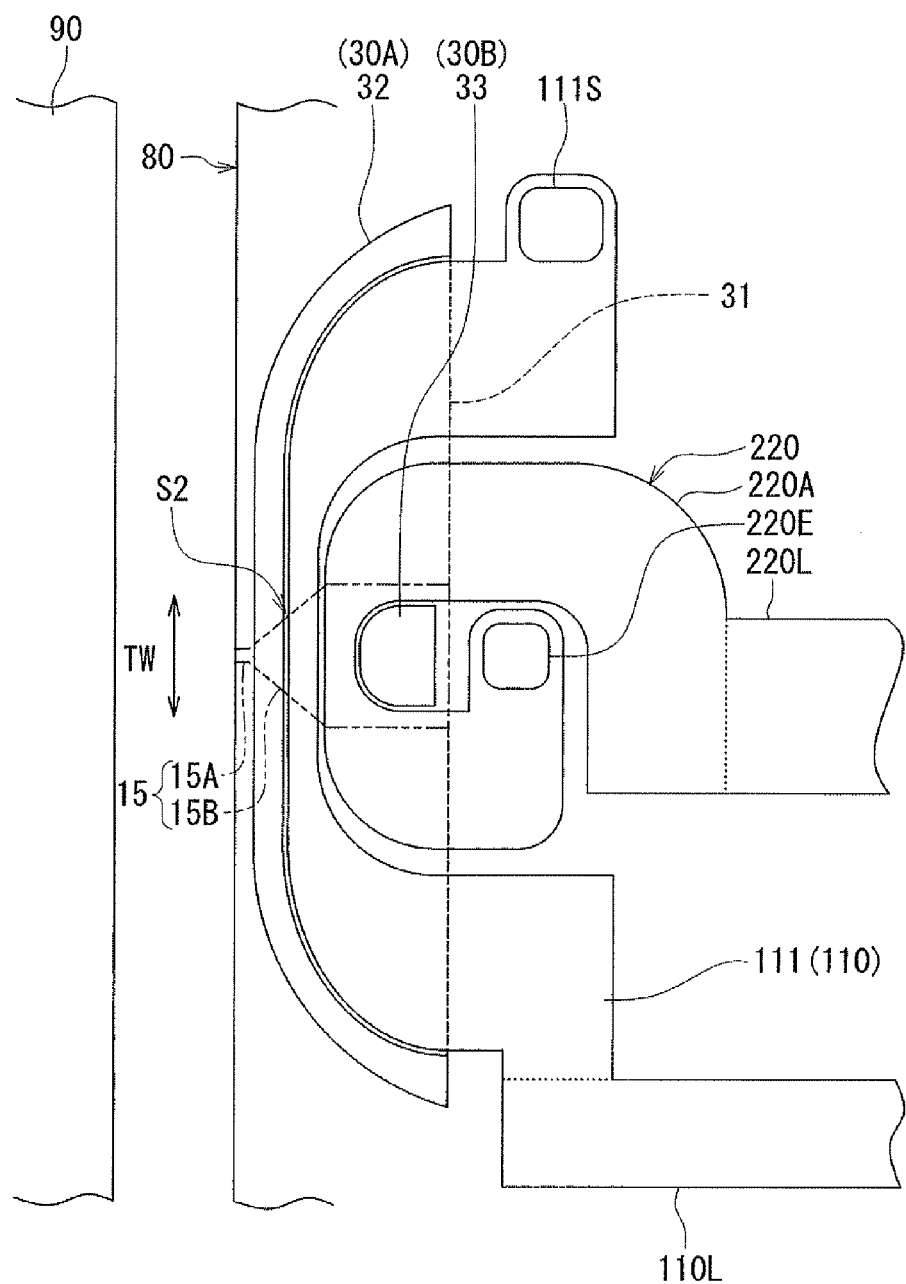
FIG. 41 is a plan view showing coil portions of the magnetic head according to the eleventh embodiment of the invention.

A magnetic head according to an eleventh embodiment of the invention will now be described with reference to FIG. 40 and FIG. 41. FIG. 40 is a cross-sectional view of the magnetic head according to the present embodiment. FIG. 41 is a plan view showing coil portions of the magnetic head according to the present embodiment.

The configuration of the magnetic head according to the present embodiment differs from the first embodiment in the following ways. The magnetic head according to the present embodiment has the first coil 110 described in the tenth embodiment section, in place of the first coil 10. The magnetic head further has a second coil 220 in place of the second coil 20. As shown in FIG. 41, the second coil 220 is wound around the magnetic layer 33. The positional relationships of the second coil 220 with the line-shaped portion 111 of the first coil 110, the magnetic layers 32 and 33, the insulating film 52 and the insulating layers 53, 54 and 55 are the same as those of the second coil 20 of the tenth embodiment.

The second coil 220 will now be described in detail with reference to FIG. 41. FIG. 41 is a plan view showing the line-shaped portion 111 of the first coil 110 and the second coil 220. As shown in FIG. 41, the second coil 220 includes a lead portion 220L, and a winding portion 220A contiguous with the lead portion 220L and wound around the magnetic layer 33 constituting part of the second coupling portion 30B. In FIG. 41, the boundary between the winding portion 220A and the lead portion 220L is indicated by a dotted line. The winding portion 220A is wound one turn around the magnetic layer 33. The winding portion 220A has a coil connection 220E electrically connected to the first coil 110. When viewed from above, the winding portion 220A is wound in a counterclockwise direction from the boundary between the winding portion 220A and the lead portion 220L to the coil connection 220E.

The coil connection 220E is electrically connected to the coil connection 112S (see FIG. 39) of the line-shaped portion 112 of the first coil 110 via the non-illustrated first connecting portion described in the tenth embodiment section. In the example shown in FIG. 39 and FIG. 41, the first coil 110 and the second coil 220 are connected in series. The directions of magnetic fields produced by the first and second coils 110 and 220 are the same as the directions of magnetic fields produced by the first and second coils 10 and 20 described in the first embodiment section.

The remainder of configuration, function and effects of the present embodiment are similar to those of the first or tenth embodiment.

Twelfth Embodiment

Figure 42:
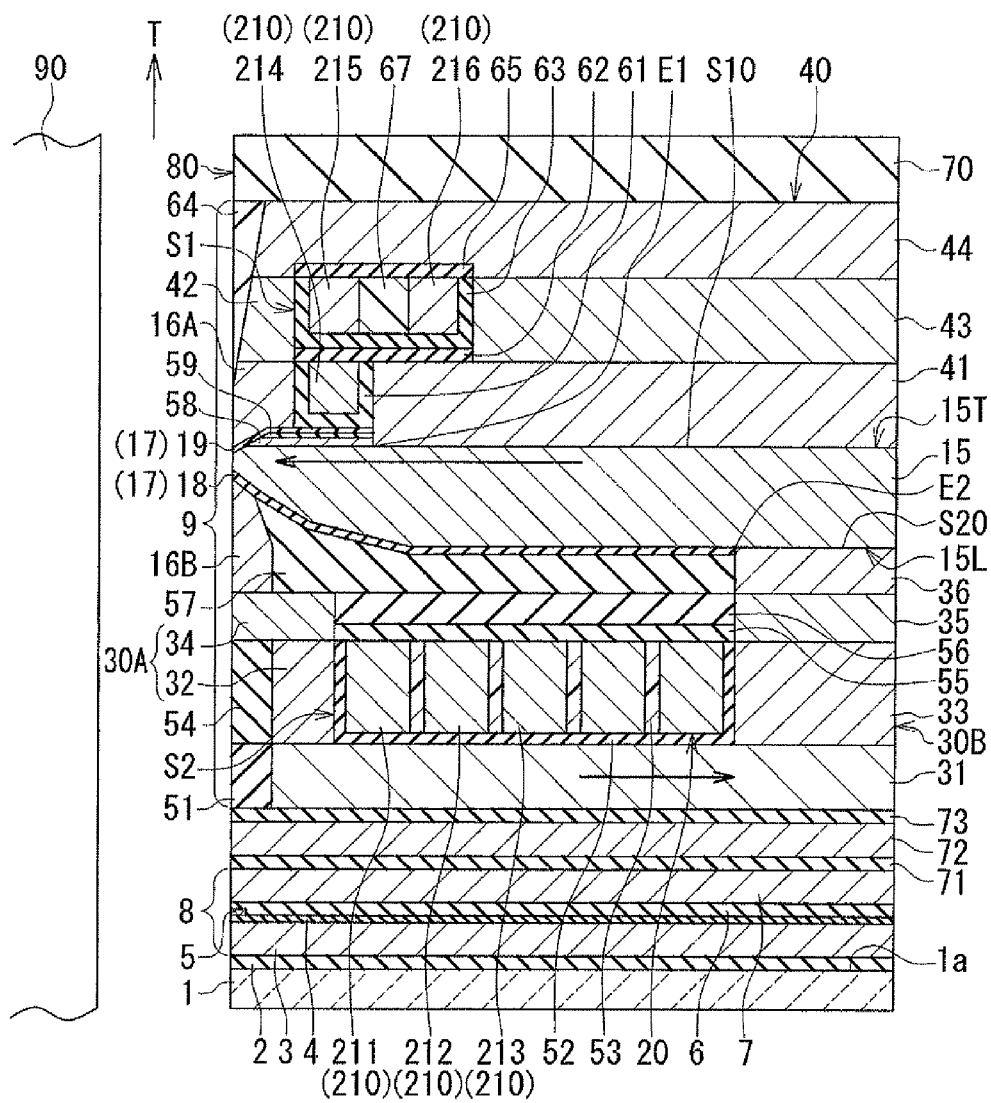
FIG. 42 is a cross-sectional view of a magnetic head according to a twelfth embodiment of the invention.
Figure 43:
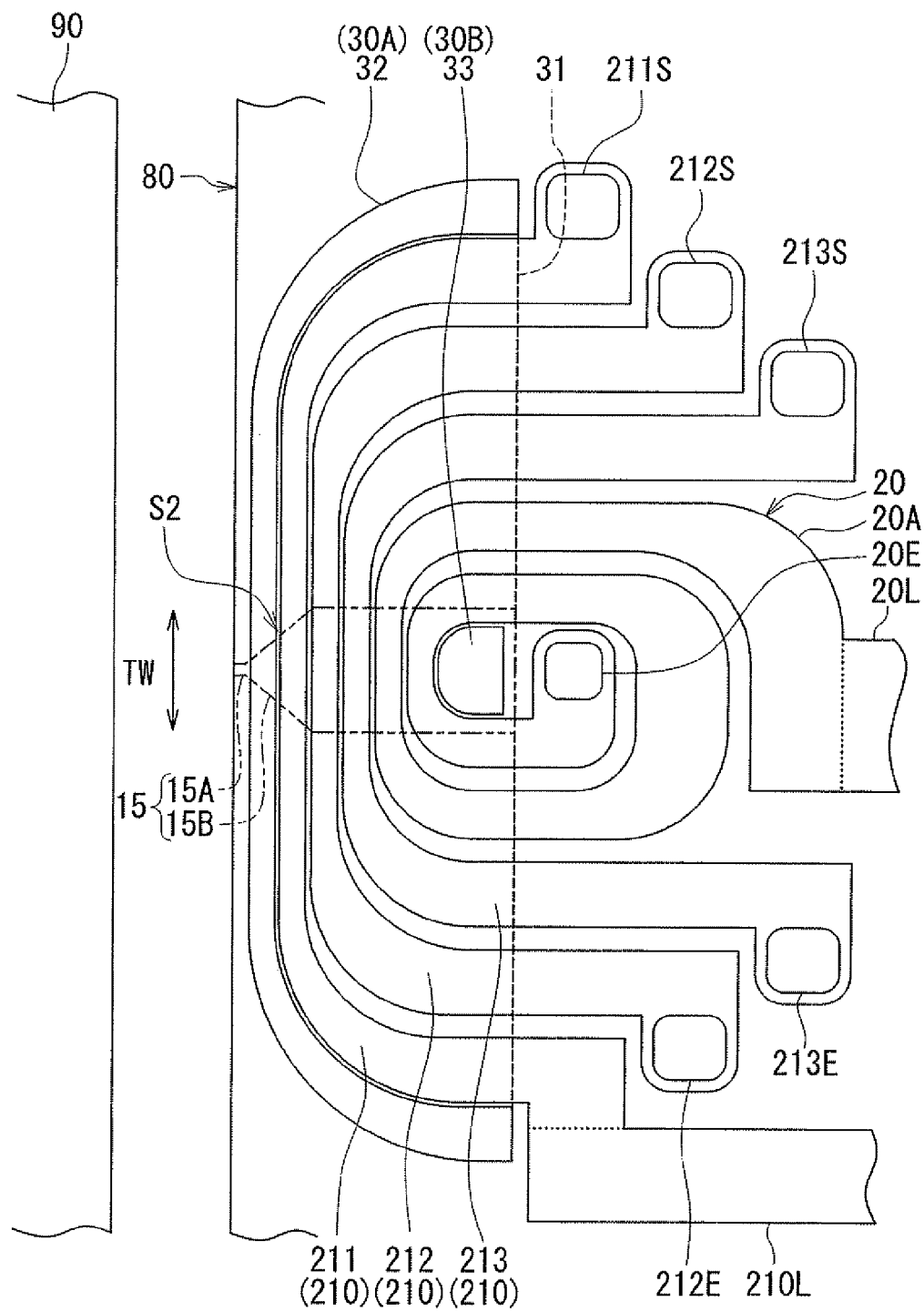
FIG. 43 is a plan view showing coil portions of the magnetic head according to the twelfth embodiment of the invention.
Figure 44:
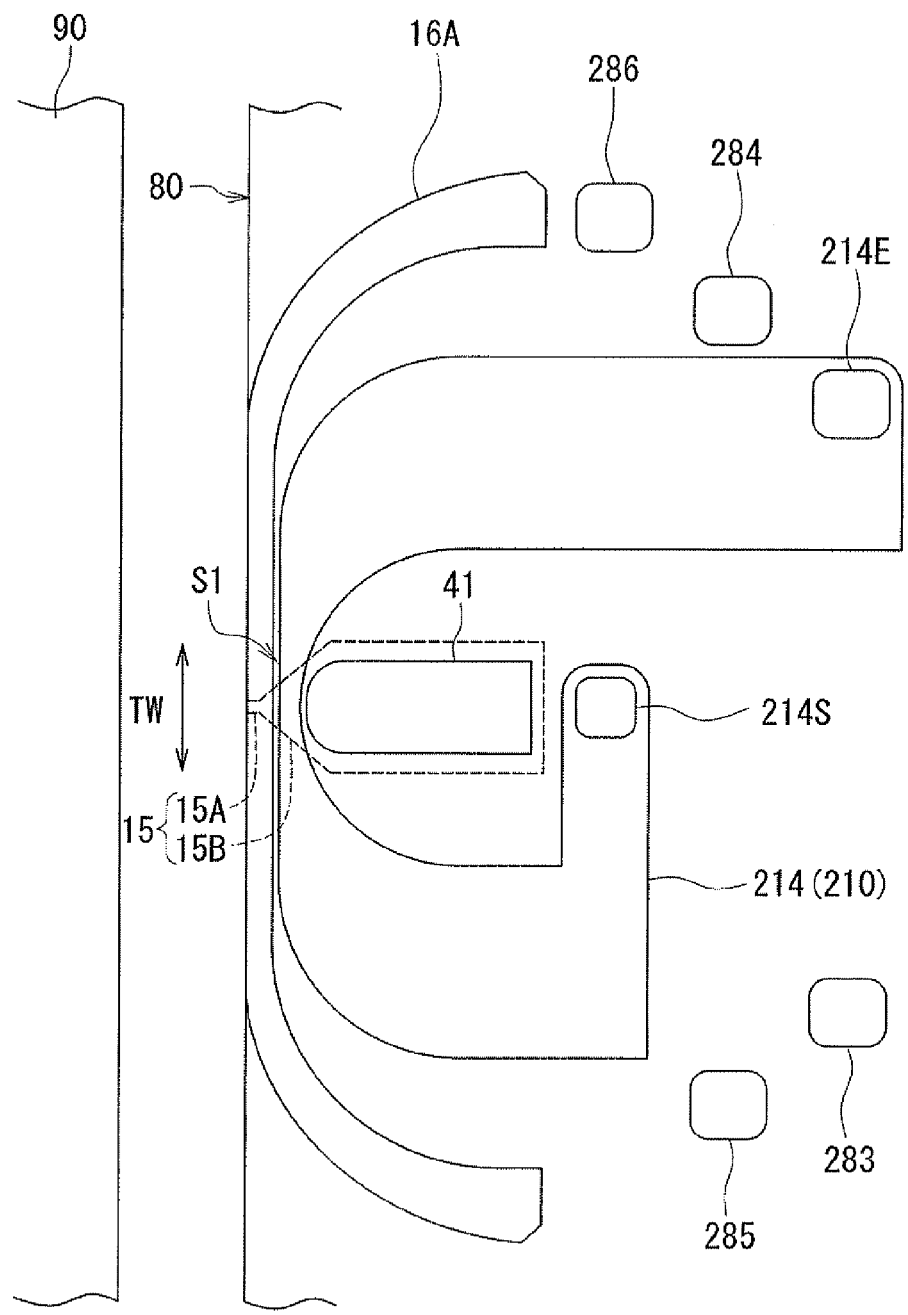
FIG. 44 is a plan view showing other coil portions of the magnetic head according to the twelfth embodiment of the invention.
Figure 45:
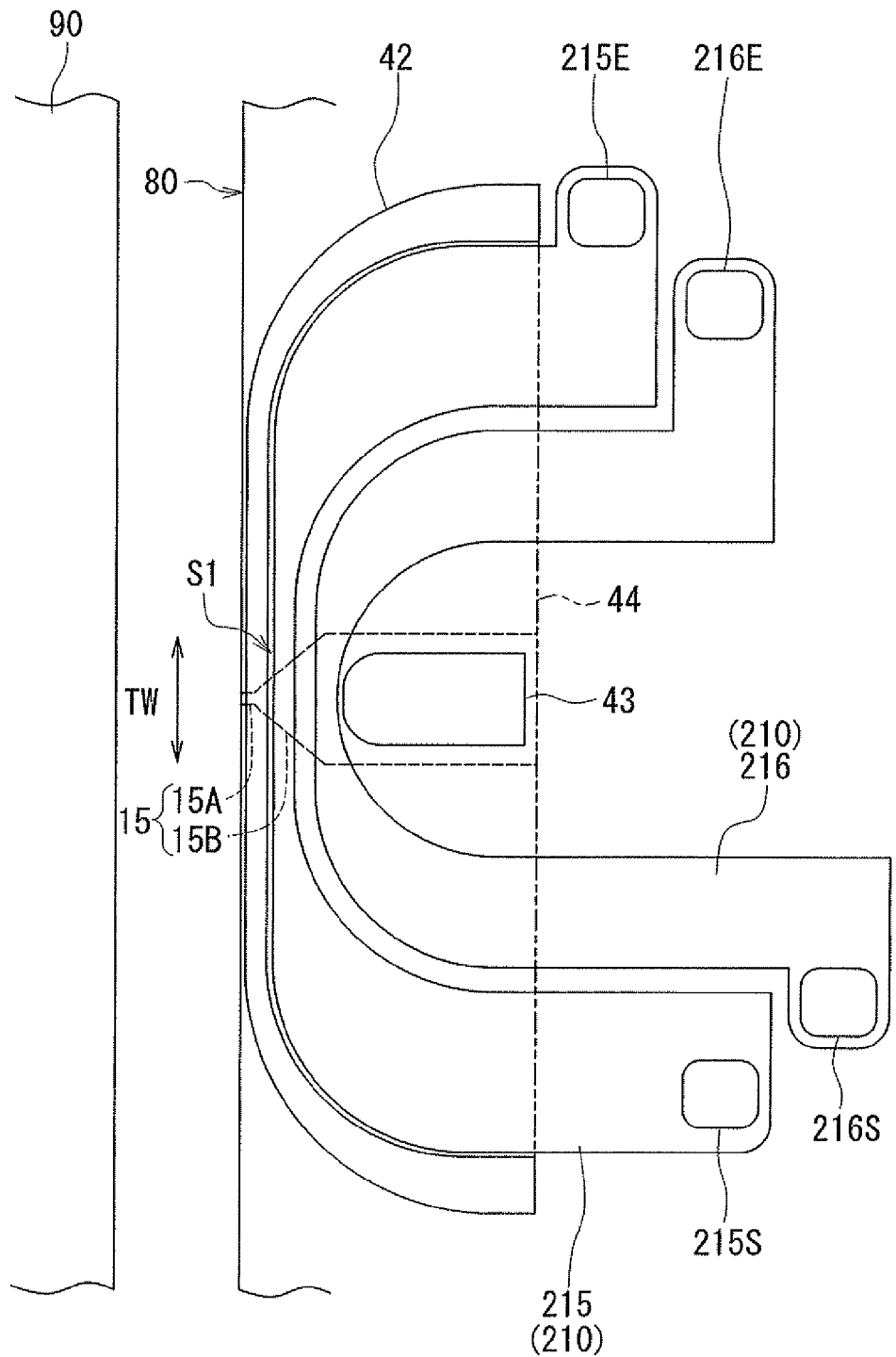
FIG. 45 is a plan view showing still other coil portions of the magnetic head according to the twelfth embodiment of the invention.

A magnetic head according to a twelfth embodiment of the invention will now be described with reference to FIG. 42 to FIG. 45. FIG. 42 is a cross-sectional view of the magnetic head according to the present embodiment. FIG. 43 is a plan view showing coil portions of the magnetic head according to the present embodiment. FIG. 44 is a plan view showing other coil portions of the magnetic head according to the present embodiment. FIG. 45 is a plan view showing still other coil portions of the magnetic head according to the present embodiment.

The configuration of the magnetic head according to the present embodiment differs from the first embodiment in the following ways. The magnetic head according to the present embodiment has a first coil 210 in place of the first coil 10. The first coil 210 is wound approximately three turns around the main pole 15 so as to pass through the first and second spaces S1 and S2. Further, the first coil 210 includes line-shaped portions 211, 212, 213, 214, 215 and 216, a lead portion 210L, first and second connecting portions (not illustrated), and third to sixth connecting portions 283, 284, 285 and 286. As shown in FIG. 43, the line-shaped portions 211, 212 and 213 are located between the magnetic layer 32 and the second coil 20. The line-shaped portions 211, 212 and 213 are arranged in this order in the direction perpendicular to the medium facing surface 80, the line-shaped portion 211 being closest to the medium facing surface 80. The positional relationships of the line-shaped portions 211 to 213 with the second coil 20, the magnetic layers 32 and 33, the insulating film 52 and the insulating layers 53, 54 and 55 are the same as those of the line-shaped portions 11 and 12 of the first coil 10 of the first embodiment.

As shown in FIG. 44, the line-shaped portion 214 is located between the first shield 16A and the magnetic layer 41. The positional relationships of the line-shaped portion 214 with the first shield 16A, the magnetic layer 41, the insulating film 61, the insulating layer 62, and the non-illustrated second nonmagnetic layer described in the first embodiment section are the same as those of the line-shaped portion 13 of the first coil 10 of the first embodiment.

As shown in FIG. 45, the line-shaped portions 215 and 216 are located between the magnetic layer 42 and the magnetic layer 43. The line-shaped portions 215 and 216 are arranged in this order in the direction perpendicular to the medium facing surface 80, the line-shaped portion 215 being closer to the medium facing surface 80. The magnetic head according to the present embodiment includes an insulating layer 67 formed of an insulating material and located between the line-shaped portion 215 and the line-shaped portion 216. The insulating layer 67 is formed of a photoresist, for example. The positional relationships of the line-shaped portions 215 and 216 and the insulating layer 67 with the magnetic layers 42 and 43, the insulating film 63, the insulating layer 65, and the non-illustrated third nonmagnetic layer described in the first embodiment section are the same as those of the line-shaped portion 14 of the first coil 10 of the first embodiment.

The first coil 210 will now be described in detail with reference to FIG. 42 to FIG. 45. FIG. 43 is a plan view showing the line-shaped portions 211, 212 and 213 of the first coil 210 and the second coil 20. FIG. 44 is a plan view showing the line-shaped portion 214 of the first coil 210. FIG. 45 is a plan view showing the line-shaped portions 215 and 216 of the first coil 210. As shown in FIG. 42, the three line-shaped portions 211 to 213 are located on the rear side in the direction T of travel of the recording medium 90 relative to the main pole 15. The three line-shaped portions 214 to 216 are located on the front side in the direction T of travel of the recording medium 90 relative to the main pole 15. As shown in FIG. 43, each of the line-shaped portions 211 to 213 includes a portion that extends to pass between the magnetic layer 32 and the magnetic layer 33, in particular, within the second space S2. As shown in FIG. 44, the line-shaped portion 214 includes a portion that extends to pass between the first shield 16A and the magnetic layer 41, in particular, within the first space S1. As shown in FIG. 45, each of the line-shaped portions 215 and 216 includes a portion that extends to pass between the magnetic layer 42 and the magnetic layer 43, in particular, within the first space S1.

As shown in FIG. 43, the lead portion 210L of the first coil 210 is contiguous with the line-shaped portion 211. In FIG. 43, the boundary between the line-shaped portion 211 and the lead portion 210L is indicated by a dotted line. The line-shaped portion 211 has a coil connection 211S located near an end of the line-shaped portion 211 opposite from the boundary between the line-shaped portion 211 and the lead portion 210L. The line-shaped portion 212 has two coil connections 212S and 212E located near two ends of the line-shaped portion 212 that are opposite in the longitudinal direction. The line-shaped portion 213 has two coil connections 213S and 213E located near two ends of the line-shaped portion 213 that are opposite in the longitudinal direction. As shown in FIG. 44, the line-shaped portion 214 has two coil connections 214S and 214E located near two ends of the line-shaped portion 214 that are opposite in the longitudinal direction. As shown in FIG. 45, the line-shaped portion 215 has two coil connections 215S and 215E located near two ends of the line-shaped portion 215 that are opposite in the longitudinal direction. The line-shaped portion 216 has two coil connections 216S and 216E located near two ends of the line-shaped portion 216 that are opposite in the longitudinal direction.

The non-illustrated second connecting portion penetrates a plurality of layers interposed between the line-shaped portion 213 and the line-shaped portion 214. The third to sixth connecting portions 83 to 86 shown in FIG. 44 penetrate a plurality of layers interposed between a set of line-shaped portions 211-213 and a set of line-shaped portions 215, 216. The second to sixth connecting portions electrically connect the line-shaped portions 211-216 so as to form the first coil 210 wound helically around the main pole 15. More specifically, the second connecting portion electrically connects the coil connection 214E of the line-shaped portion 214 and the coil connection 213S of the line-shaped portion 213. The third connecting portion 283 electrically connects the coil connection 213E of the line-shaped portion 213 and the coil connection 216S of the line-shaped portion 216. The fourth connecting portion 284 electrically connects the coil connection 216E of the line-shaped portion 216 and the coil connection 212S of the line-shaped portion 212. The fifth connecting portion 285 electrically connects the coil connection 212E of the line-shaped portion 212 and the coil connection 215S of the line-shaped portion 215. The sixth connecting portion 286 electrically connects the coil connection 215E of the line-shaped portion 215 and the coil connection 211S of the line-shaped portion 211. When viewed from the medium facing surface 80, the first coil 210 is wound in a counterclockwise direction from the coil connection 214S of the line-shaped portion 214 to the boundary between the line-shaped portion 211 and the lead portion 210L.

The non-illustrated first connecting portion penetrates a plurality of layers interposed between the second coil 20 and the line-shaped portion 214, and electrically connects the coil connection 20E of the winding portion 20A of the second coil 20 and the coil connection 214S of the line-shaped portion 214. In the example shown in FIG. 43 to FIG. 45, the first coil 210 and the second coil 20 are connected in series. The directions of magnetic fields produced by the first and second coils 210 and 20 are the same as the directions of magnetic fields produced by the first and second coils 10 and 20 described in the first embodiment section.

In the present embodiment, the number of turns of the first coil 210 is approximately three, and is thus greater than the number of turns of the first coil 10 of the first embodiment. The present embodiment thus allows the main pole 15 to produce a write magnetic field of greater magnitude when compared with the first embodiment.

The remainder of configuration, function and effects of the present embodiment are similar to those of the first embodiment.

Thirteenth Embodiment

Figure 46:
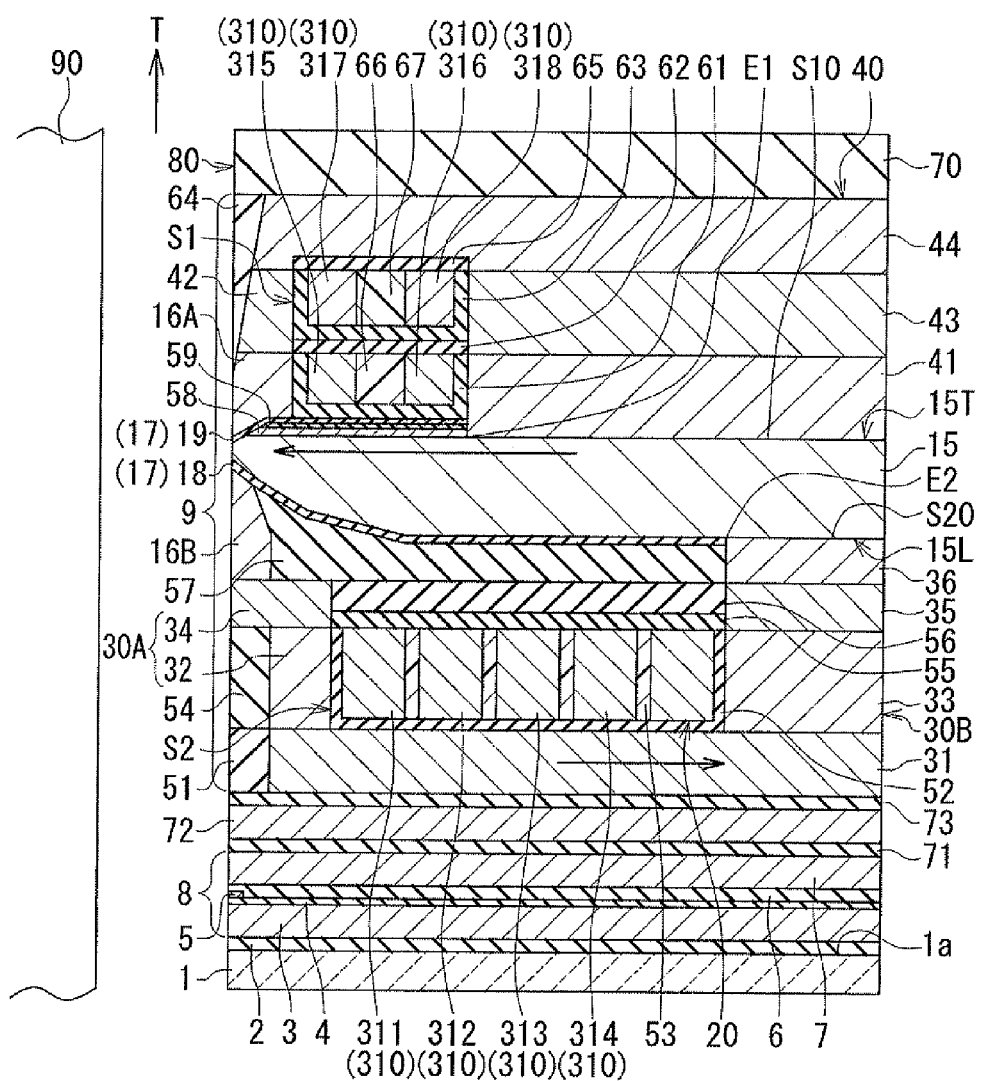
FIG. 46 is a cross-sectional view of a magnetic head according to a thirteenth embodiment of the invention.
Figure 47:
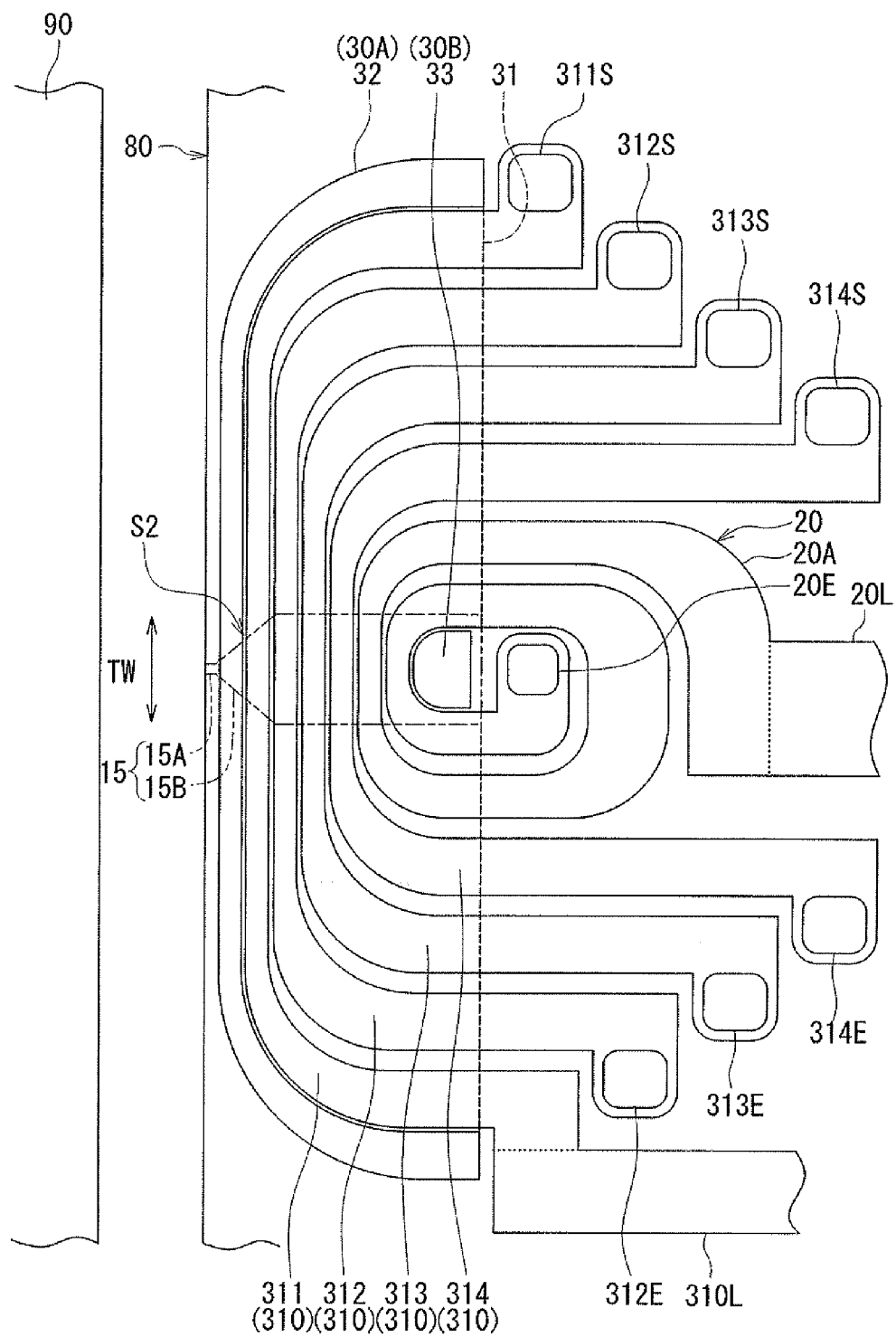
FIG. 47 is a plan view showing coil portions of the magnetic head according to the thirteenth embodiment of the invention.
Figure 48:
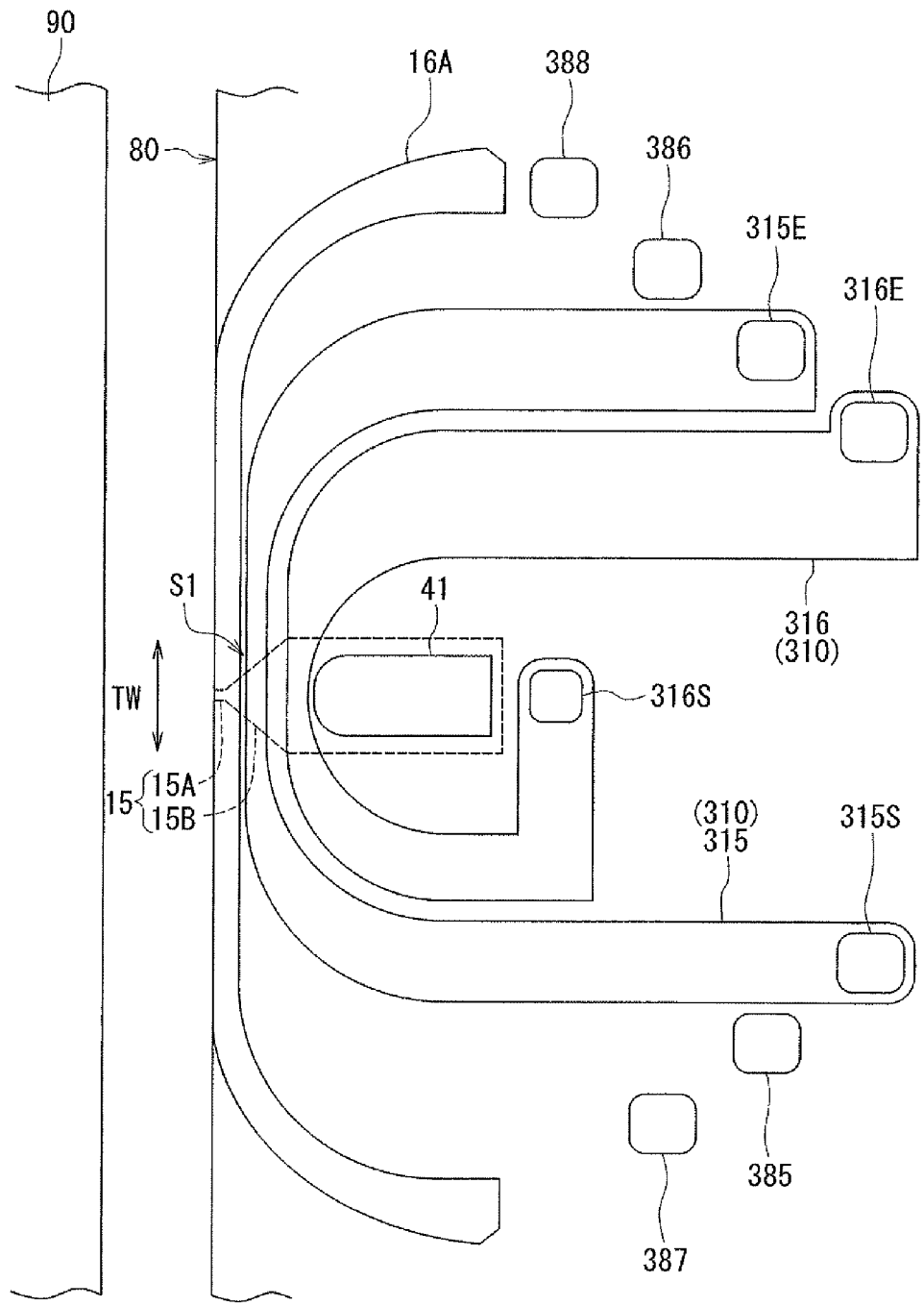
FIG. 48 is a plan view showing other coil portions of the magnetic head according to the thirteenth embodiment of the invention.
Figure 49:
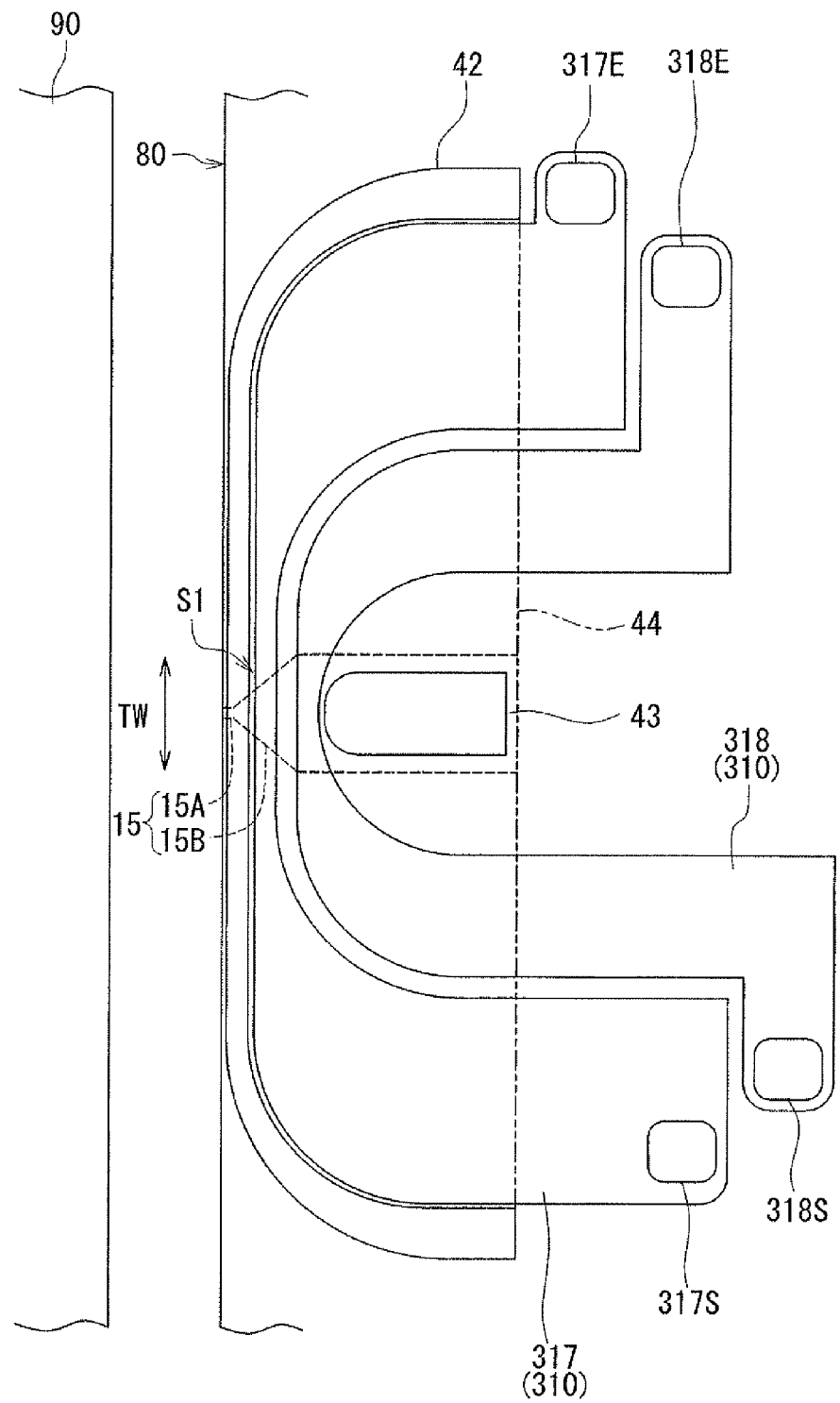
FIG. 49 is a plan view showing still other coil portions of the magnetic head according to the thirteenth embodiment of the invention.

A magnetic head according to a thirteenth embodiment of the invention will now be described with reference to FIG. 46 to FIG. 49. FIG. 46 is a cross-sectional view of the magnetic head according to the present embodiment. FIG. 47 is a plan view showing coil portions of the magnetic head according to the present embodiment. FIG. 48 is a plan view showing other coil portions of the magnetic head according to the present embodiment. FIG. 49 is a plan view showing still other coil portions of the magnetic head according to the present embodiment.

The configuration of the magnetic head according to the present embodiment differs from the twelfth embodiment in the following ways. The magnetic head according to the present embodiment has a first coil 310 in place of the first coil 210. The first coil 310 is wound approximately four turns around the main pole 15 so as to pass through the first and second spaces S1 and S2. Further, the first coil 310 includes line-shaped portions 311, 312, 313, 314, 315, 316, 317 and 318, a lead portion 310L, first to fourth connecting portions (not illustrated), and fifth to eighth connecting portions 385, 386, 387 and 388. As shown in FIG. 47, the line-shaped portions 311, 312, 313 and 314 are located between the magnetic layer 32 and the second coil 20. The line-shaped portions 311, 312, 313 and 314 are arranged in this order in the direction perpendicular to the medium facing surface 80, the line-shaped portion 311 being closest to the medium facing surface 80. The positional relationships of the line-shaped portions 311 to 314 with the second coil 20, the magnetic layers 32 and 33, the insulating film 52 and the insulating layers 53, 54 and 55 are the same as those of the line-shaped portions 211 to 213 of the first coil 210 of the twelfth embodiment.

As shown in FIG. 48, the line-shaped portions 315 and 316 are located between the first shield 16A and the magnetic layer 41. The line-shaped portions 315 and 316 are arranged in this order in the direction perpendicular to the medium facing surface 80, the line-shaped portion 315 being closer to the medium facing surface 80. The magnetic head according to the present embodiment includes an insulating layer 66 formed of an insulating material. The positional relationships of the line-shaped portions 315 and 316 with the first shield 16A, the magnetic layer 41, the insulating film 61, the insulating layers 62 and 66, and the non-illustrated second nonmagnetic layer described in the twelfth embodiment (the first embodiment) section are the same as those of the line-shaped portions 13 and 14 of the first coil 10 of the fourth embodiment. The insulating material used for the insulating layer 66 is the same as that used in the fourth embodiment.

As shown in FIG. 49, the line-shaped portions 317 and 318 are located between the magnetic layer 42 and the magnetic layer 43. The line-shaped portions 317 and 318 are arranged in this order in the direction perpendicular to the medium facing surface 80, the line-shaped portion 317 being closer to the medium facing surface 80. The positional relationships of the line-shaped portions 317 and 318 with the magnetic layers 42 and 43, the insulating film 63, the insulating layers 65 and 67, and the non-illustrated third nonmagnetic layer described in the twelfth embodiment (the first embodiment) section are the same as those of the line-shaped portions 215 and 216 of the first coil 210 of the twelfth embodiment.

The first coil 310 will now be described in detail with reference to FIG. 46 to FIG. 49. FIG. 47 is a plan view showing the line-shaped portions 311, 312, 313 and 314 of the first coil 310 and the second coil 20. FIG. 48 is a plan view showing the line-shaped portions 315 and 316 of the first coil 310. FIG. 49 is a plan view showing the line-shaped portions 317 and 318 of the first coil 310. As shown in FIG. 46, the four line-shaped portions 311 to 314 are located on the rear side in the direction T of travel of the recording medium 90 relative to the main pole 15. The four line-shaped portions 315 to 318 are located on the front side in the direction T of travel of the recording medium 90 relative to the main pole 15. As shown in FIG. 47, each of the line-shaped portions 311 to 314 includes a portion that extends to pass between the magnetic layer 32 and the magnetic layer 33, in particular, within the second space S2. As shown in FIG. 48, each of the line-shaped portions 315 and 316 includes a portion that extends to pass between the first shield 16A and the magnetic layer 41, in particular, within the first space S1. As shown in FIG. 49, each of the line-shaped portions 317 and 318 includes a portion that extends to pass between the magnetic layer 42 and the magnetic layer 43, in particular, within the first space S1.

As shown in FIG. 47, the lead portion 310L of the first coil 310 is contiguous with the line-shaped portion 311. In FIG. 47, the boundary between the line-shaped portion 311 and the lead portion 310L is indicated by a dotted line. The line-shaped portion 311 has a coil connection 311S located near an end of the line-shaped portion 311 opposite from the boundary between the line-shaped portion 311 and the lead portion 310L. The line-shaped portion 312 has two coil connections 312S and 312E located near two ends of the line-shaped portion 312 that are opposite in the longitudinal direction. The line-shaped portion 313 has two coil connections 313S and 313E located near two ends of the line-shaped portion 313 that are opposite in the longitudinal direction. The line-shaped portion 314 has two coil connections 314S and 314E located near two ends of the line-shaped portion 314 that are opposite in the longitudinal direction. As shown in FIG. 48, the line-shaped portion 315 has two coil connections 315S and 315E located near two ends of the line-shaped portion 315 that are opposite in the longitudinal direction. The line-shaped portion 316 has two coil connections 316S and 316E located near two ends of the line-shaped portion 316 that are opposite in the longitudinal direction. As shown in FIG. 49, the line-shaped portion 317 has two coil connections 317S and 317E located near two ends of the line-shaped portion 317 that are opposite in the longitudinal direction. The line-shaped portion 318 has two coil connections 318S and 318E located near two ends of the line-shaped portion 318 that are opposite in the longitudinal direction.

The non-illustrated second to fourth connecting portions penetrate a plurality of layers interposed between a set of line-shaped portions 313, 314 and a set of line-shaped portions 315, 316. The fifth to eighth connecting portions 385 to 388 shown in FIG. 48 penetrate a plurality of layers interposed between a set of line-shaped portions 311-313 and a set of line-shaped portions 317, 318. The second to eighth connecting portions electrically connect the line-shaped portions 311-318 so as to form the first coil 310 wound helically around the main pole 15. More specifically, the second connecting portion electrically connects the coil connection 316E of the line-shaped portion 316 and the coil connection 314S of the line-shaped portion 314. The third connecting portion electrically connects the coil connection 314E of the line-shaped portion 314 and the coil connection 315S of the line-shaped portion 315. The fourth connecting portion electrically connects the coil connection 315E of the line-shaped portion 315 and the coil connection 313S of the line-shaped portion 313.

The fifth connecting portion 385 electrically connects the coil connection 313E of the line-shaped portion 313 and the coil connection 318S of the line-shaped portion 318. The sixth connecting portion 386 electrically connects the coil connection 318E of the line-shaped portion 318 and the coil connection 312S of the line-shaped portion 312. The seventh connecting portion 387 electrically connects the coil connection 312E of the line-shaped portion 312 and the coil connection 317S of the line-shaped portion 317. The eighth connecting portion 388 electrically connects the coil connection 317E of the line-shaped portion 317 and the coil connection 311S of the line-shaped portion 311. When viewed from the medium facing surface 80, the first coil 310 is wound in a counterclockwise direction from the coil connection 316S of the line-shaped portion 316 to the boundary between the line-shaped portion 311 and the lead portion 310L.

The non-illustrated first connecting portion penetrates a plurality of layers interposed between the second coil 20 and the line-shaped portion 316, and electrically connects the coil connection 20E of the winding portion 20A of the second coil 20 and the coil connection 316S of the line-shaped portion 316. In the example shown in FIG. 47 to FIG. 49, the first coil 310 and the second coil 20 are connected in series. The directions of magnetic fields produced by the first and second coils 310 and 20 are the same as the directions of magnetic fields produced by the first and second coils 10 and 20 described in the first embodiment section.

In the present embodiment, the number of turns of the first coil 310 is approximately four, and is thus greater than the number of turns of the first coil 210 of the twelfth embodiment. The present embodiment thus allows the main pole 15 to produce a write magnetic field of greater magnitude when compared with the twelfth embodiment.

The remainder of configuration, function and effects of the present embodiment are similar to those of the twelfth embodiment.

Fourteenth Embodiment

Figure 50:
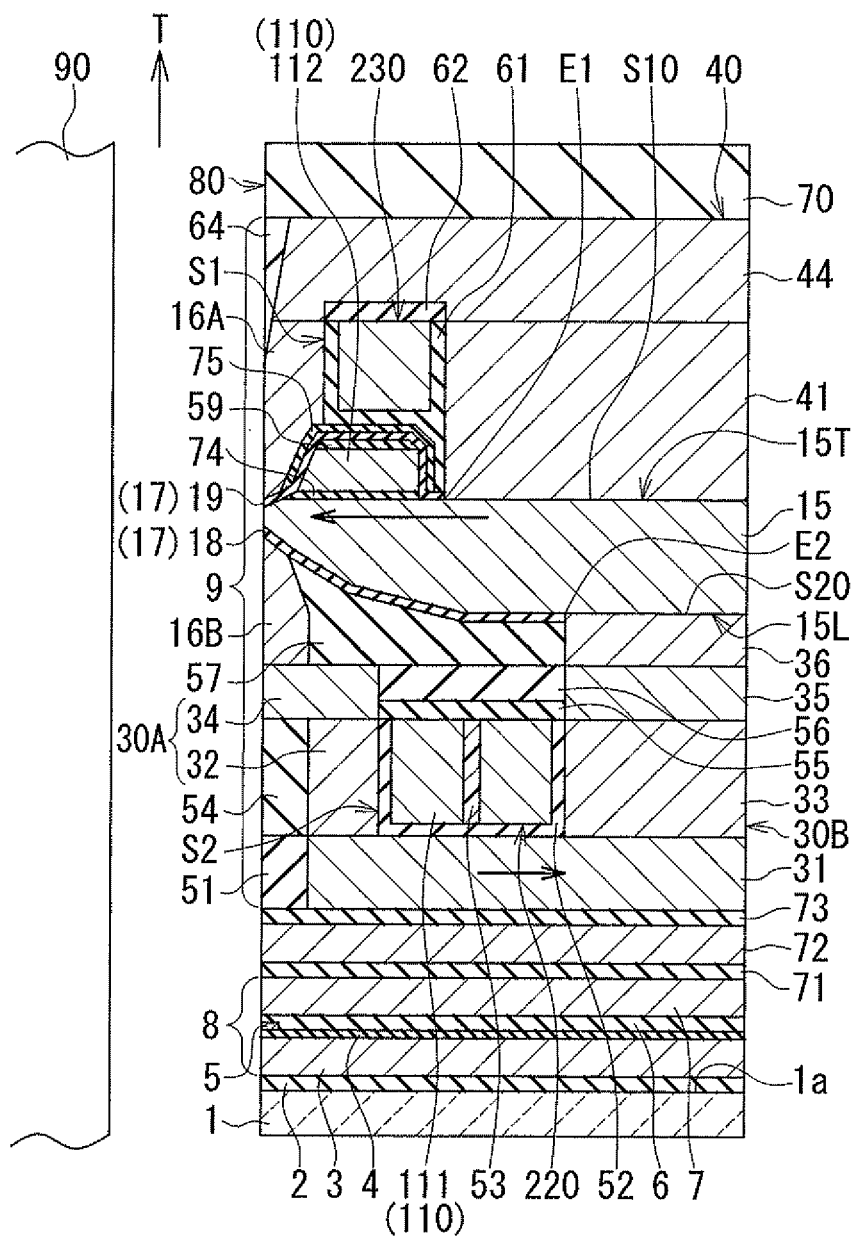
FIG. 50 is a cross-sectional view of a magnetic head according to a fourteenth embodiment of the invention.
Figure 51:
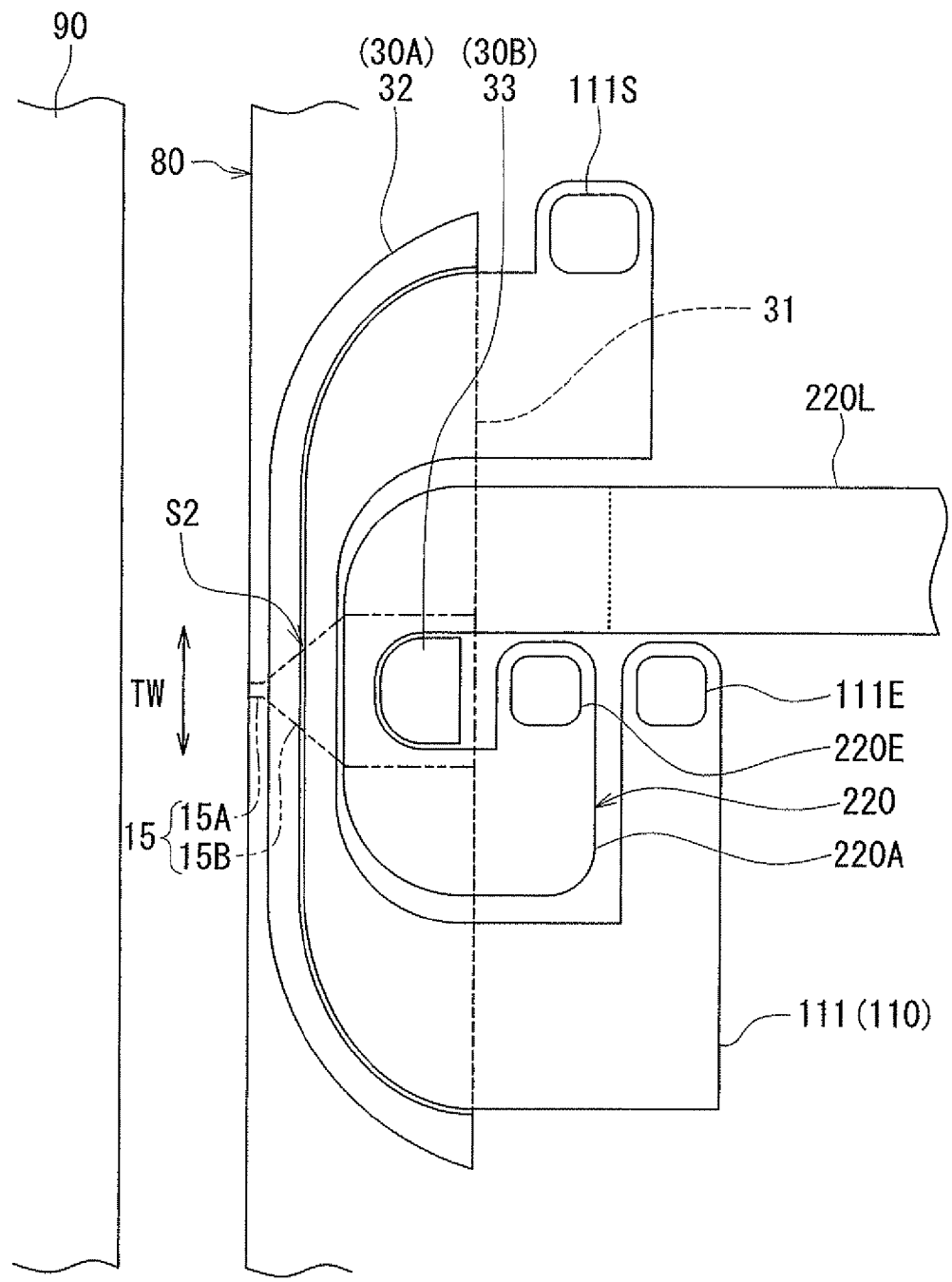
FIG. 51 is a plan view showing coil portions of the magnetic head according to the fourteenth embodiment of the invention.
Figure 52:
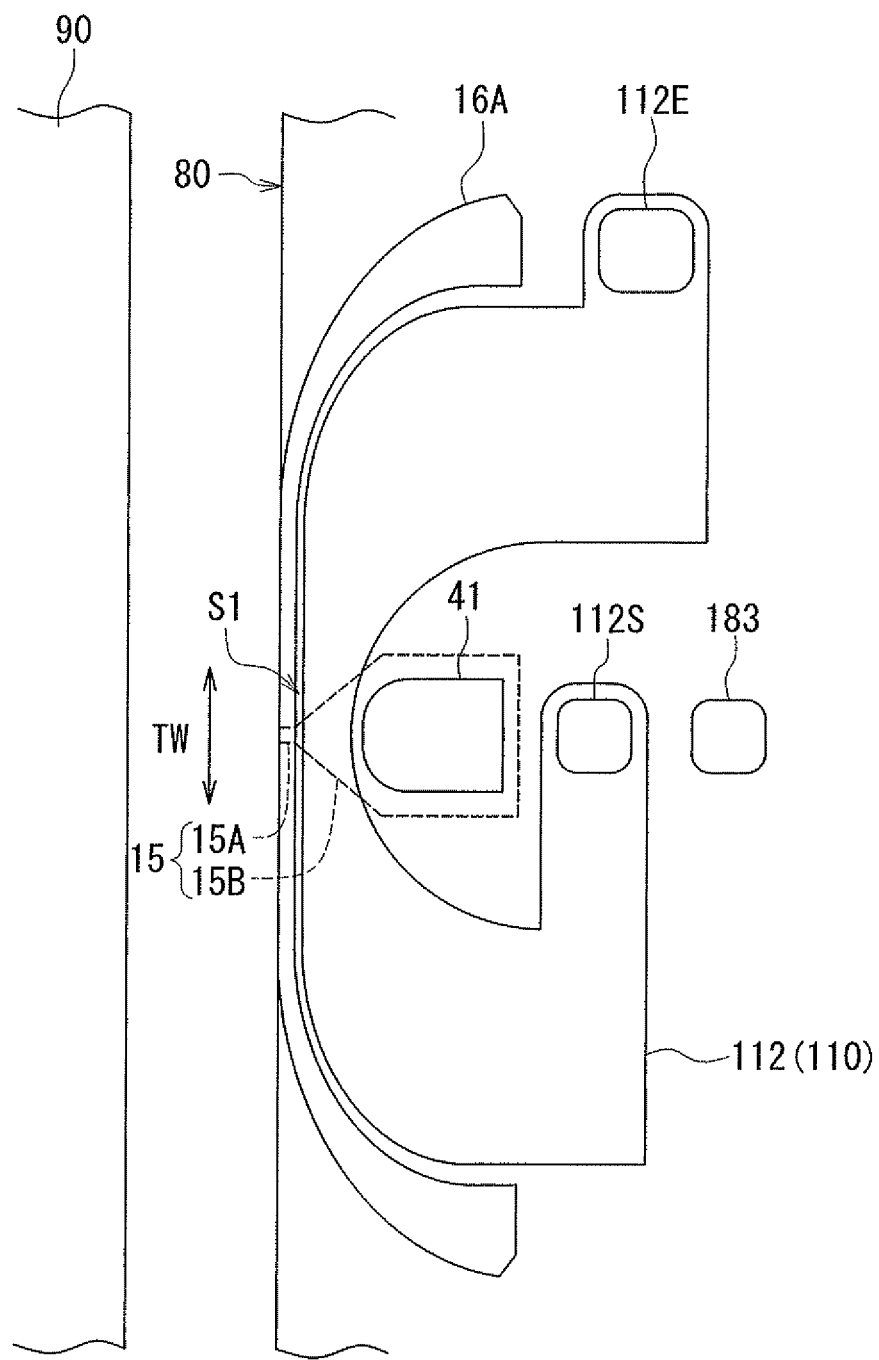
FIG. 52 is a plan view showing other coil portions of the magnetic head according to the fourteenth embodiment of the invention.
Figure 53:
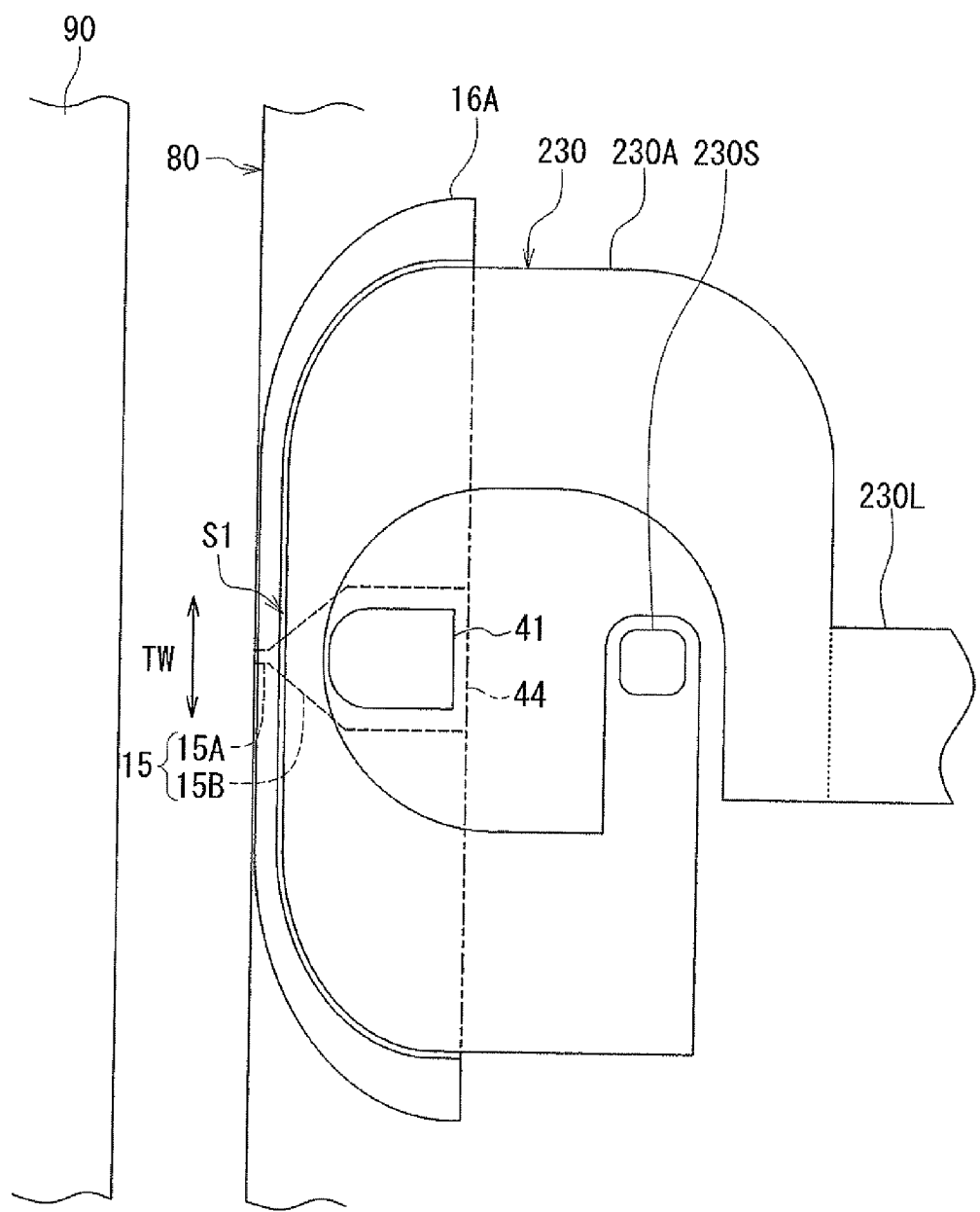
FIG. 53 is a plan view showing still other coil portions of the magnetic head according to the fourteenth embodiment of the invention.

A magnetic head according to a fourteenth embodiment of the invention will now be described with reference to FIG. 50 to FIG. 53. FIG. 50 is a cross-sectional view of the magnetic head according to the present embodiment. FIG. 51 is a plan view showing coil portions of the magnetic head according to the present embodiment. FIG. 52 is a plan view showing other coil portions of the magnetic head according to the present embodiment. FIG. 53 is a plan view showing still other coil portions of the magnetic head according to the present embodiment.

The configuration of the magnetic head according to the present embodiment differs from the second embodiment in the following ways. The magnetic head according to the present embodiment has the first coil 110 described in the tenth and eleventh embodiment sections and the second coil 220 described in the eleventh embodiment section, in place of the first and second coils 10 and 20. In the present embodiment, the line-shaped portion 111 of the first coil 110 has a coil connection 111E in addition to the coil connection 111S. The coil connections 111S and 111E are located near two ends of the line-shaped portion 111 that are opposite in the longitudinal direction. The locations of the line-shaped portion 111 and the second coil 220 are the same as those in the eleventh embodiment. The shape and location of the line-shaped portion 112 of the first coil 110 are the same as those of the line-shaped portion 13 of the first coil 10 of the second embodiment. In the present embodiment, the first coil 110 does not include the lead portion 110L.

Further, in the present embodiment, the magnetic head has a third coil 230 in addition to the first and second coils 110 and 220. The third coil 230 is located on the front side in the direction T of travel of the recording medium 90 relative to the main pole 15. The third coil 230 is wound one turn around the magnetic layer 41, which is part of the return path section 40, so as to pass through the first space S1. The positional relationships of the third coil 230 with the first shield 16A, the magnetic layer 41, the insulating film 61, the insulating layer 62, and the non-illustrated second nonmagnetic layer are the same as those of the line-shaped portion 14 of the first coil 10 of the second embodiment.

Now, the third coil 230 will be described in more detail. As shown in FIG. 53, the third coil 230 includes a lead portion 230L, and a winding portion 230A contiguous with the lead portion 230L and wound around the magnetic layer 41. In FIG. 53, the boundary between the winding portion 230A and the lead portion 230L is indicated by a dotted line. The winding portion 230A is wound one turn around the magnetic layer 41. The winding portion 230A has a coil connection 230S electrically connected to the first coil 110. When viewed from above, the winding portion 230A is wound in a clockwise direction from the coil connection 230S to the boundary between the winding portion 230A and the lead portion 230L.

As shown in FIG. 52, the third coil 230 further includes a third connecting portion 183. The third connecting portion 183 penetrates a plurality of layers interposed between the line-shaped portion 111 of the first coil 110 and the third coil 230, and electrically connects the coil connection 111E of the line-shaped portion 111 and the coil connection 230S of the winding portion 230A of the third coil 230. In the example shown in FIG. 51 to FIG. 53, the first to third coils 110, 220 and 230 are connected in series in the order of the coil 220, the coil 110, and the coil 230.

In the present embodiment, the first and third coils 110 and 230 are connected such that a magnetic flux corresponding to the magnetic field produced by the first coil 110 and a magnetic flux corresponding to the magnetic field produced by the third coil 230 flow in the same direction through the main pole 15. Where the direction of electric current flowing through the first coil 110 is counterclockwise when viewed from the medium facing surface 80, the magnetic field produced in the main pole 15 by the first coil 110 is in the direction of the arrow drawn within the main pole 15 in FIG. 50, that is, the first direction toward the medium facing surface 80. In this case, the direction of electric current flowing through the third coil 230 is clockwise when viewed from above, and the magnetic field produced in the main pole 15 by the third coil 230 is in the same direction as the direction of the magnetic field produced in the main pole 15 by the first coil 110, that is, the first direction. Where the direction of electric current flowing through the first coil 110 is clockwise when viewed from the medium facing surface 80 and the direction of electric current flowing through the third coil 230 is counterclockwise when viewed from above, the directions of the magnetic fields are opposite to the above-described directions.

The effects of the present embodiment will now be described. In the second embodiment, the number of the portions of the first and second coils 10 and 20 that extend to pass through the second space S2 is four (see FIG. 15). In contrast, in the present embodiment, the number of the portions of the first and second coils 110 and 220 that extend to pass through the second space S2 is two, thus being less than that in the second embodiment. The present embodiment thus allows for making the second space S2 smaller and thereby making the second return path section (the yoke 31, the first coupling portion 30A and the second coupling portion 30B) shorter than in the second embodiment. Further, in the present embodiment, the number of the portions of the first and third coils 110 and 230 that extend to pass through the first space S1 is also two. This makes the difference between the lengths of the return path section and the second return path section 40 smaller than that in the case where the third coil 230 is not provided. Consequently, the present embodiment makes it possible to effectively achieve higher frequencies of write signals and prevention of unwanted erasure without causing the second return path section to be extremely longer than the return path section 40.

As in the third embodiment, the first coil 110 may pass between the magnetic layer 34 or the coupling layer and the second coupling portion 30B (the magnetic layer 35). The remainder of configuration, function and effects of the present embodiment are similar to those of any of the second, third, tenth and eleventh embodiments.

The present invention is not limited to the foregoing embodiments, and various modifications may be made thereto. For example, the first to third coils described in the foregoing embodiments may be combined as desired. Further, as far as the requirements of the appended claims are met, the number of turns of each of the first to third coils is not limited to the examples illustrated in the foregoing embodiments, and can be chosen as desired.

Further, the configuration of the return path section 40 (the magnetic layers 41 to 44) and the configuration of the second return path section (the yoke 31, the first coupling portion 30A and the second coupling portion 30B) described in each of the foregoing embodiments may be combined as desired. Further, the yoke 31, at least part of the first coupling portion 30A and at least part of the second coupling portion 30B may be formed of a single magnetic layer.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:

a medium facing surface facing a recording medium;

first and second coils producing magnetic fields corresponding to data to be written on the recording medium;

a main pole having an end face located in the medium facing surface, the main pole allowing magnetic fluxes that correspond to the magnetic fields produced by the first and second coils to pass, and producing a write magnetic field for writing the data on the recording medium by means of a perpendicular magnetic recording system;

a write shield formed of a magnetic material and having an end face located in the medium facing surface;

a gap part formed of a nonmagnetic material and located between the main pole and the write shield;

a return path section formed of a magnetic material and located on a front side in a direction of travel of the recording medium relative to the main pole; and a yoke formed of a magnetic material and located on a rear side in the direction of travel of the recording medium relative to the main pole, wherein the end face of the write shield includes a first end face portion located on the front side in the direction of travel of the recording medium relative to the end face of the main pole, the return path section connects the write shield and part of the main pole located away from the medium facing surface to each other so as to define a first space enclosed by the main pole, the gap part, the write shield, and the return path section, the first coil is wound around the main pole so as to pass through the first space, the second coil is located on the rear side in the direction of travel of the recording medium relative to the main pole so as to pass between the main pole and the yoke, and a magnetic field that is produced in the main pole by the second coil and a magnetic field that is produced in the yoke by the second coil are in directions opposite to each other.

2. The magnetic head for perpendicular magnetic recording according to claim 1, further comprising a coupling portion located away from the medium facing surface and coupling the main pole and the yoke to each other magnetically, wherein the second coil is wound around the coupling portion.

3. The magnetic head for perpendicular magnetic recording according to claim 1, wherein the end face of the write shield further includes a second end face portion located on the rear side in the direction of travel of the recording medium relative to the end face of the main pole, and the yoke is magnetically connected to the write shield.

4. The magnetic head for perpendicular magnetic recording according to claim 1, wherein the yoke has an end face located in the medium facing surface.

5. The magnetic head for perpendicular magnetic recording according to claim 1, further comprising a magnetic layer formed of a magnetic material and having an end face located on the rear side in the direction of travel of the recording medium relative to the end face of the main pole, wherein the yoke is magnetically connected to the magnetic layer.

6. The magnetic head for perpendicular magnetic recording according to claim 1, wherein the main pole has a top surface lying at a front end in the direction of travel of the recording medium, the write shield has an inclined surface facing toward the top surface of the main pole, the inclined surface has a first end located in the medium facing surface and a second end opposite to the first end, the second end being located on the front side in the direction of travel of the recording medium relative to the first end, the first coil includes a coil element extending to pass through the first space, and the coil element includes a portion that is located closer to the medium facing surface than is the second end and that lies between the top surface of the main pole and the inclined surface.

7. The magnetic head for perpendicular magnetic recording according to claim 1, wherein the first coil includes a coil element extending to pass through the first space, and no portion of the first coil other than the coil element is present in the first space.

8. The magnetic head for perpendicular magnetic recording according to claim 1, wherein the end face of the write shield further includes a second end face portion located on the rear side in the direction of travel of the recording medium relative to the end face of the main pole, the magnetic head further comprises a first coupling portion coupling the write shield and the yoke to each other magnetically, and a second coupling portion located away from the medium facing surface and coupling the main pole and the yoke to each other magnetically, the main pole, the gap part, the write shield, the yoke, the first coupling portion, and the second coupling portion define a second space enclosed by these components, the first coil passes through the second space, and the second coil is wound around the second coupling portion so as to pass through the second space.

9. The magnetic head for perpendicular magnetic recording according to claim 8, wherein the first coupling portion includes a coupling layer in contact with the write shield, the coupling layer has an end face located in the medium facing surface, and the first coil passes between the coupling layer and the second coupling portion.

10. The magnetic head for perpendicular magnetic recording according to claim 8, wherein the first coil passes between the second coil and the main pole in the second space.

11. The magnetic head for perpendicular magnetic recording according to claim 10, wherein the first coil is thinner than the second coil in the second space.

12. The magnetic head for perpendicular magnetic recording according to claim 8, wherein a first interface is formed between the return path section and the main pole, a second interface is formed between the second coupling portion and the main pole, the first interface has a first end closest to the medium facing surface, the second interface has a second end closest to the medium facing surface, and the first end is located closer to the medium facing surface than is the second end.

13. The magnetic head for perpendicular magnetic recording according to claim 8, wherein the end face of the write shield further includes third and fourth end face portions, the third and fourth end face portions being located on opposite sides of the end face of the main pole in a track width direction.

* * * * *